Figure 1B:
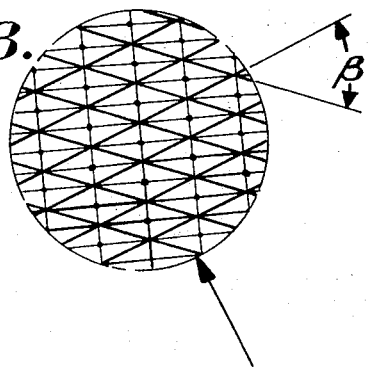

United States Patent [19]
Goodstal et al.

[11] 3,843,875
[45] Oct. 22, 1974

[54] NUMERICAL CONTROL CHECKERING SYSTEM

[75] Inventors: Laurence K. Goodstal, Ilion; Wayne E. Leek, Mohawk; Robert J. Sanzo, Ilion, all of N.Y.; Robert L. Turner, Newark, Del.; Clark B. Workman, Mohawk, N.Y.; Edward W. Yetter, West Chester, Pa.

[73] Assignee: Remington Arms Company, Bridgeport, Conn.

[22] Filed: Mar. 7, 1973

[21] Appl. No.: 338,690

[52] U.S. Cl.................. 235/151.11, 90/13 C, 444/1
[51] Int. Cl..... G05b 19/02, G05b 19/18, B23d 5/28
[58] Field of Search................. 235/151.11; 90/13 C

[56] References Cited
UNITED STATES PATENTS
3,559,529  2/1971  Vertin..................................... 90/17
3,605,909  9/1971  Lemelson.................. 235/151.11 X FOREIGN PATENTS OR APPLICATIONS
248,825  8/1966  Austria............................. 90/13 C Primary Examiner—Eugene G. Botz

[57] ABSTRACT

This invention comprises a system for automatically inscribing a preselected design in a work piece utilizing a power-driven inscribing tool, preprogrammed control means incorporating a pattern of movement of the power-driven inscribing tool relative to the work piece along a multiplicity of independent axes including two preselected axes lying in a common plane conforming generally to incremental portions of the work surface of the work piece, positioning means responsive to the preprogrammed control means locating the power-driven inscribing tool in work-effecting relationship with respect to the work piece, and feedback means biased against the work surface of the work piece positioning the power-driven inscribing tool along the depth-establishing axis and the tilt axis of the pattern in conformity with preselected criteria for depth and tilt embodied in the pattern of movement incorporated in the preprogrammed control means.

13 Claims, 32 Drawing Figures

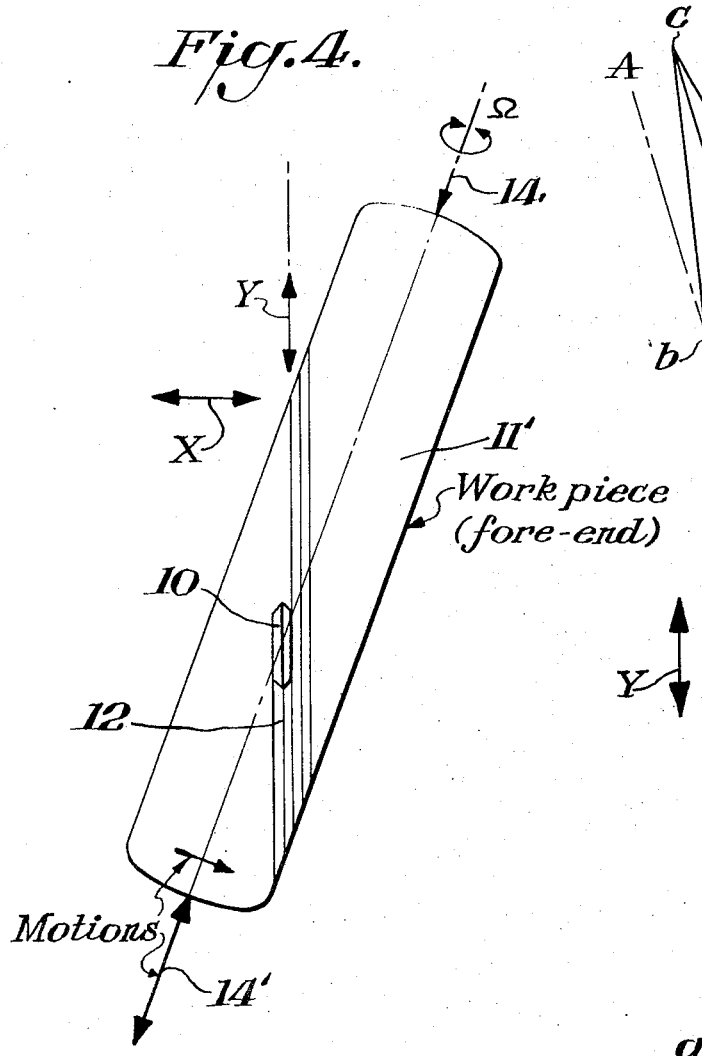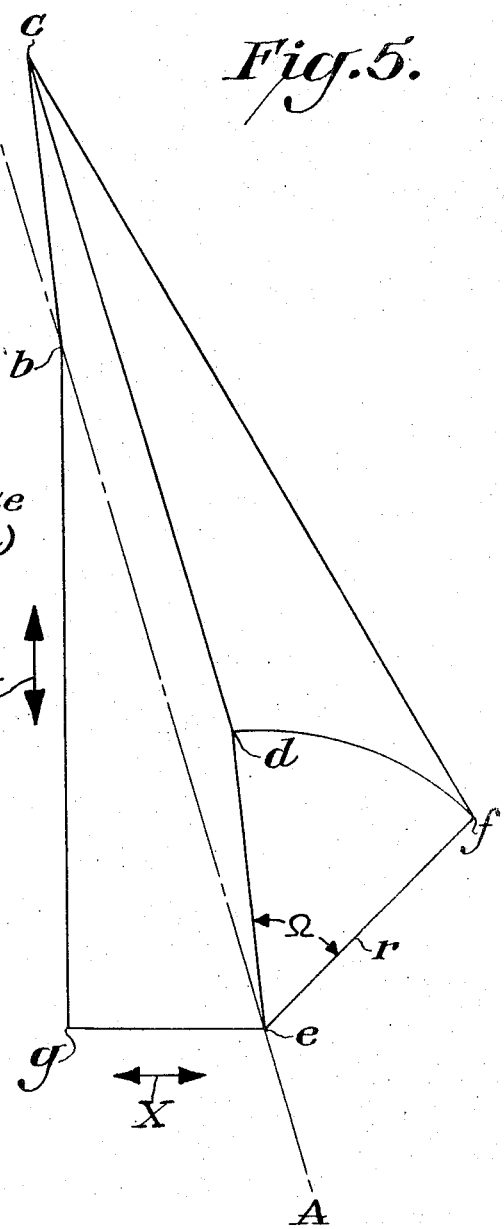

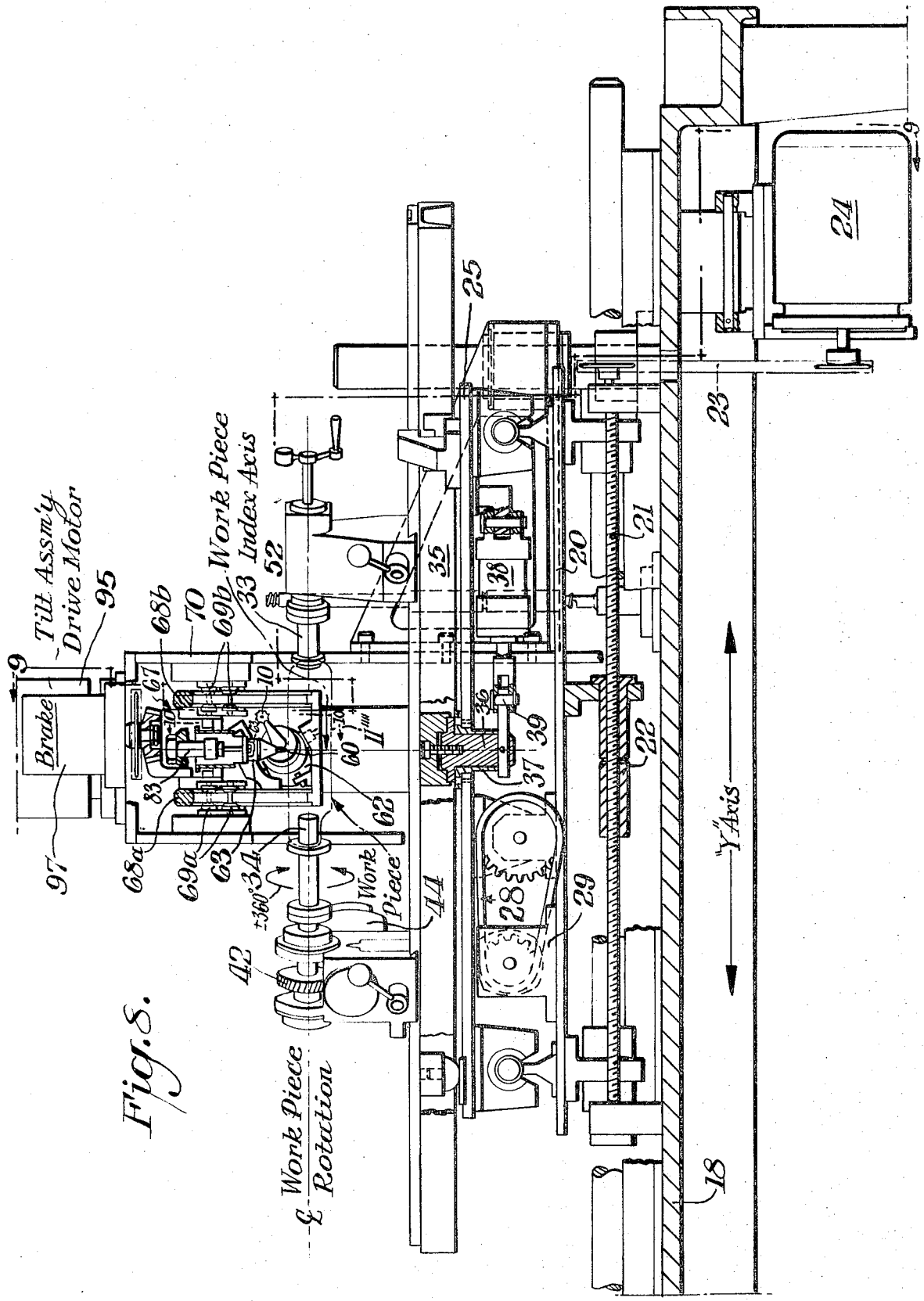

Fig. 9.

Checkered Surface

Checkered Surface

"b" lines — uniform
"b" lines — projected
line $a_1$ line $a_1$
end of line
end of Cut

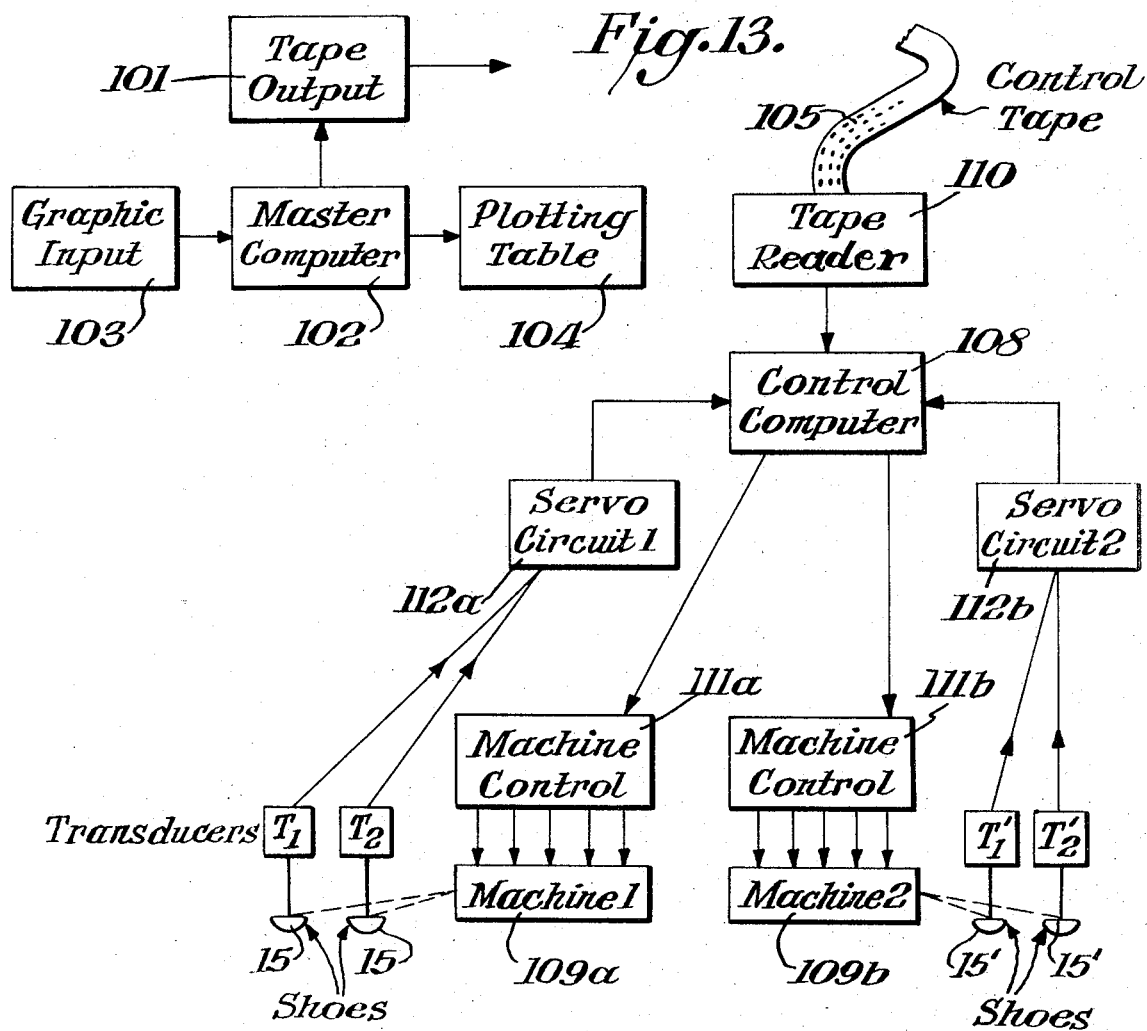

| Bit Number | 1 2 | 3 4 | 5 6 | 7 8 | 9 10 |
|---|---|---|---|---|---|
| Bit Value | 0 1 | 0 0 | 1 0 | 0 1 | 1 0 |
| Motor Number | 1 | 2 | 3 | 4 | 5 |
| Motor Increment | -1 | 0 | +1 | -1 | +1 |

N/C CHECKERING – DATA REDUCTION PROGRAM FLOW CHART

START OF MAIN PROGRAM + 27 LINES

```
READ    PATTERN ORIGIN OFFSETS
        PATTERN SCALE FACTORS

CHARACTERISTIC NUMBERS FOR SPECIAL
          SURFACES SUCH AS A CYLINDER
```

STATEMENT 1902 + 4 LINES

```
READ LOCATION OF STARTING POINT

CALL SUBROUTINE CONV TO ADJUST FOR PATTERN ORIGIN,
  SPECIAL SURFACE (E.G. CYLINDER)
```

STATEMENT 11

(1) →
```
CALL SUBROUTINE CRIT TO READ IN A SEQUENCE OF
  POINTS REPRESENTING A CUT, OR A SEGMENT OF A CUT
  TERMINATED WHEN ONE OF THE VARIABLES PASSES THRU
  A MAXIMUM OR A MINIMUM. CRIT COMPUTES LENGTH OF
  CUT.
```

11+2

( WERE MORE POINTS AVAILABLE? ) —NO→ [ CLOSE OUTPUT FILE AND STOP ]

YES

81+4

(2) →
```
CALL SUBROUTINE PANDS1 TO DETERMINE POINT AND SLOPE
  WITH RESPECT TO CUT LENGTH (FOR EACH AXIS AT
  EACH END OF CUT SEGMENT) WHICH ARE CONSISTENT
  WITH THE DETECTION OF A MAXIMUM OR MINIMUM IN
  EITHER X OR Y AND ARE CONTINOUS WITH THE PREVIOUS
  SEGMENT OF CURRENT CUT, IF ANY.
```

954+2

```
COMPUTE NORMAL (POLYNOMIAL) CUBIC COEFFICIENTS IN
  WHICH EACH VARIABLE (AXIS) IS CONSIDERED A
  FUNCTION OF THE CUT SEGMENT LENGTH.
  U = 100. (LENGTH/TOTAL LENGTH)
```

CALL SUBROUTINE ERRCHK TO DETERMINE IF THE
POLYNOMIAL COEFFICIENTS DEFINE CURVES WHICH
ADEQUATELY MATCH THE DATA POINTS.

903+2

WERE ERRORS EXCESSIVE? —YES→ SUBDIVIDE SEGMENT (IN ERRCHK) → ②

40+2

CALL SUBROUTINE COONS
　START OF COONS SUBROUTINE + 26

IF AT START OF (INITIAL SEGMENT OF) CUT, GENERATE A
　TOOL-UP MOTION, MOTION FROM THE END OF THE PREVIOUS CUT
　TO THE START OF THIS CUT, AND A TOOL-DOWN MOTION.
　PUNCH IN PAPER TAPE BY CALLING SUBROUTINE PC.

(COONS) 756+2 (p. A-9)

CONVERT COEFFICIENTS FOR CUBIC POLYNOMIAL TO CUBIC
　DIFFERENCE COEFFICIENTS (BASIS NO. STEPS = 100)

(COONS) 60+6

ADJUST NUMBER OF STEPS AS NECESSARY TO OBTAIN DESIRED
　RESOLUTION IN ACTUAL MACHINE OPERATION AND/OR COMPLY
　WITH RESTRICTIONS AND PRECISION IMPOSED BY MACHINE
　CONTROL COMPUTER PROGRAM. IF A CHANGE IS MADE IN
　NUMBER OF STEPS, RECOMPUTE THE CUBIC DIFFERENCE
　COEFFICIENTS.

(COONS) 25+3 (p. A-11)

CALL SUBROUTINE PC TO PUNCH ENTIRE BLOCK INTO
　PAPER TAPE.

RECONSTRUCT THE CUT SEGMENT FROM THE CUBIC DIFFERENCE
　COEFFICIENTS, CALLING SUBROUTINE VECT (p. A-22) TO
　PLOT THE RECONSTRUCTED CURVE POINTS.

RETURN TO ① FIG. 17A.

FIG. 17B

**THE TAPE READING PROGRAM IS ALTERED TO SEARCH FOR THE BEGINNING OF THE TAPE, AND, WHEN FOUND, EXIT TO THE "START" OF THE BACKGROUND PROGRAM.

MCW = MOTOR CONTROL WORD 3,843,875

NUMERICAL CONTROL CHECKERING SYSTEM

CROSS-REFERENCE TO RELATED APPLICATION

The invention of this Application is in the same general field as Application Ser. No. 141,136, filed on May 7, 1971, property of the same assignee, which relates to a numerically controlled engraving machine system.

The invention is described with particular reference to the simulation of manual checkering patterns for wood firearm grips by a machine process; however, it is nevertheless applicable to the generation or regeneration of an extensive number of intricate patterns. Thus, the process has utility in laying down decorative patterns for a wide variety of products, including printing rolls for wall paper, playing cards or the like, and also, cut glassware.

The invention is especially applicable to numerically controlled machinery embodying power-driven tools, particularly those of the multi-axis drive type, and has important advantages as regards reduction in the amount of control tape required, plus increased production rate. Generally, this invention employs two computation sequences, which are usually best conducted by two separate conventional computers: (1) a digital computer for generating a control tape numerically representative of the checkering pattern to be produced and (2) a digital control computer for controlling a multi-axis inscribing tool to regenerate the checkering pattern stored on the control tape.

DRAWINGS

Figure 1D:
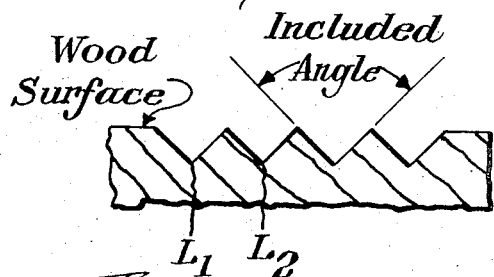
Figure 1A:
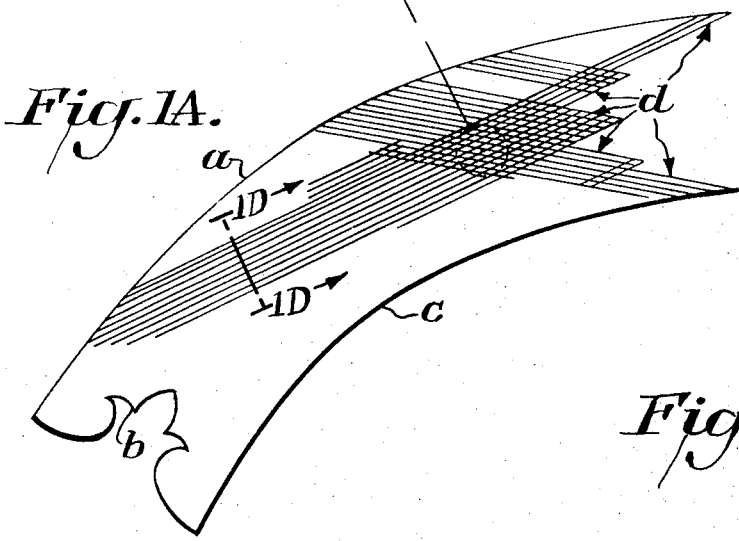
Figure 1C:
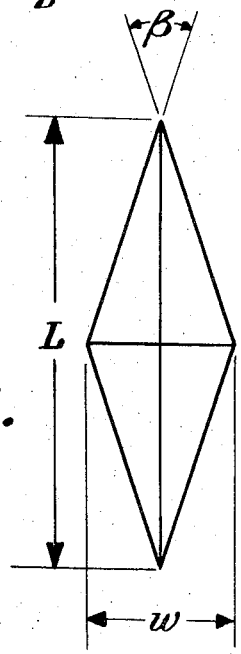
Figure 2A:
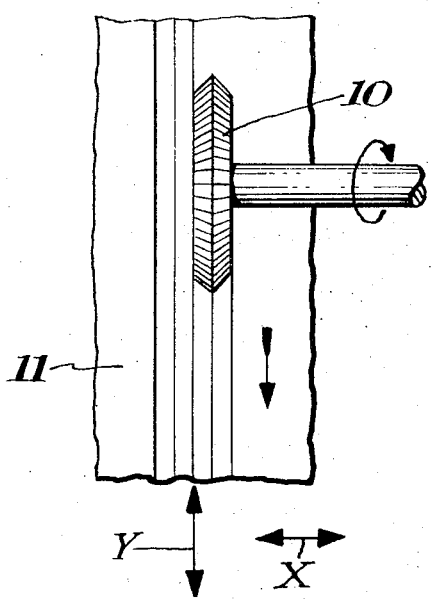
Figure 2B:
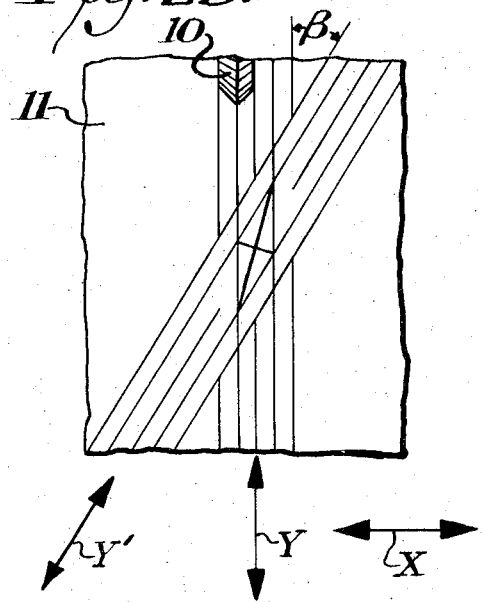
Figure 3:
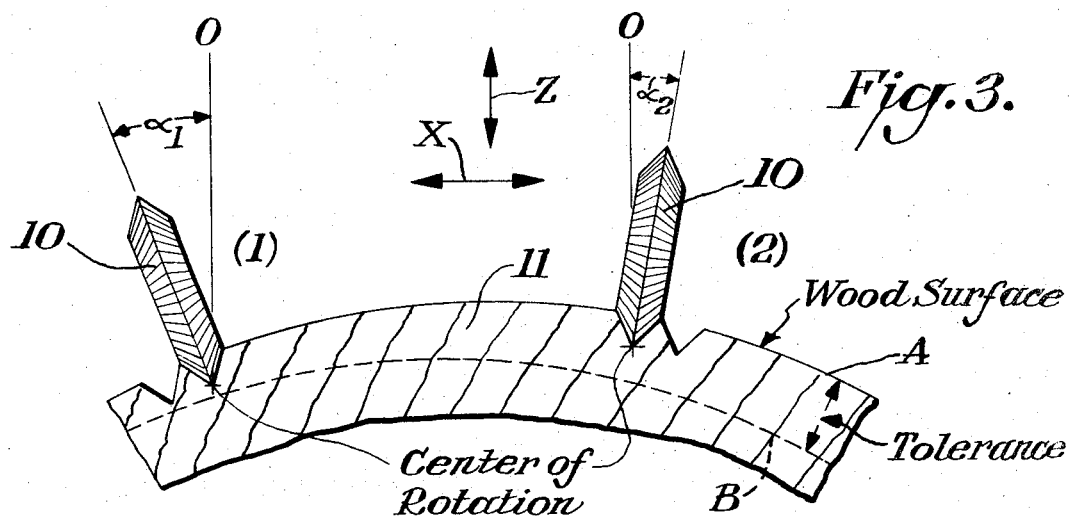
Figure 6:
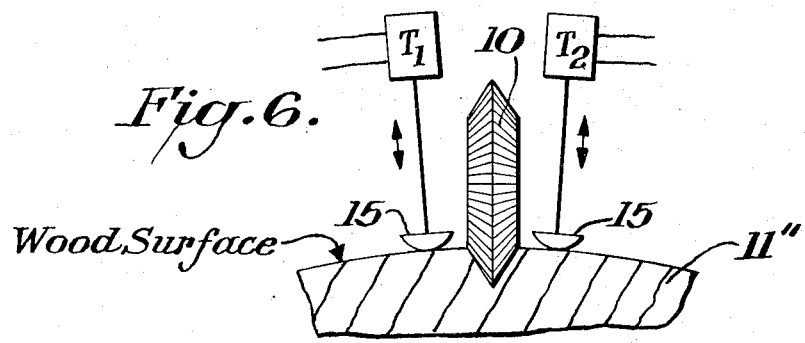
Figure 7:
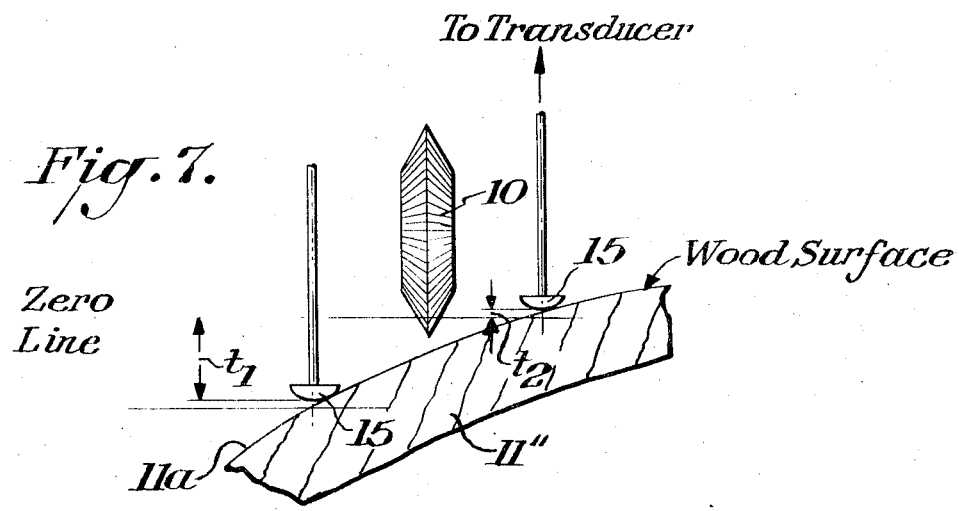
Figure 10:
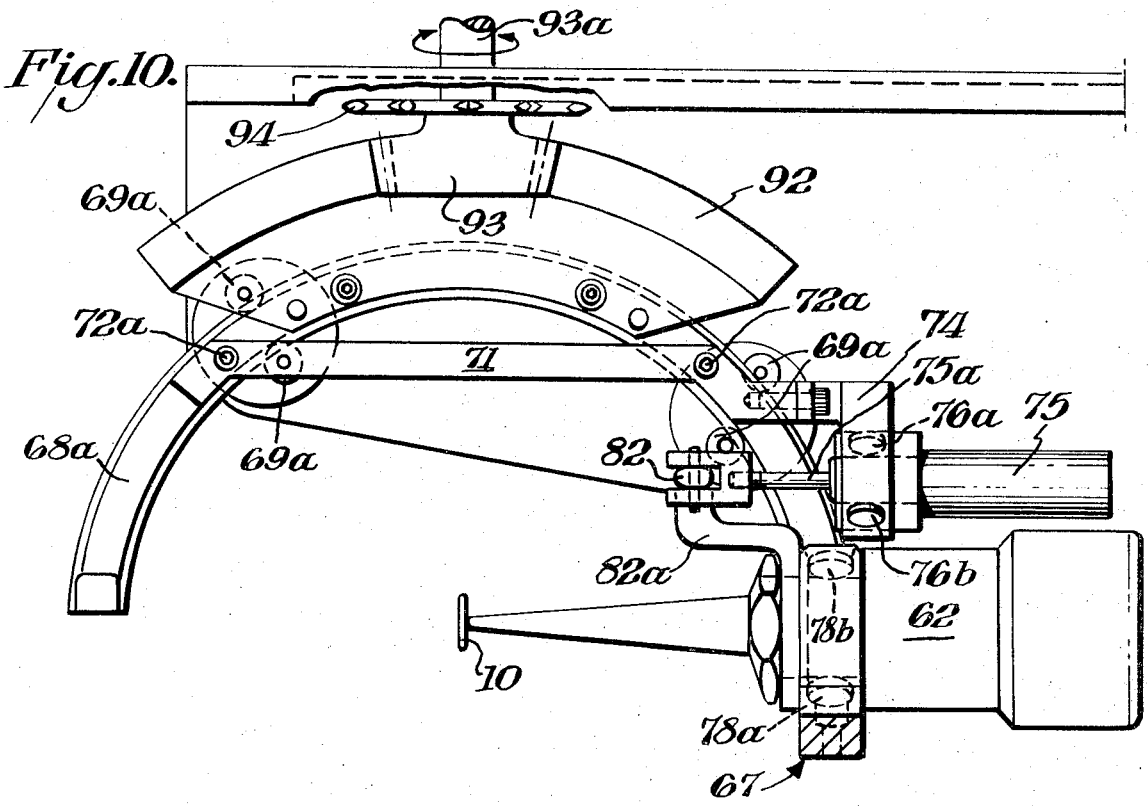
Figure 11:
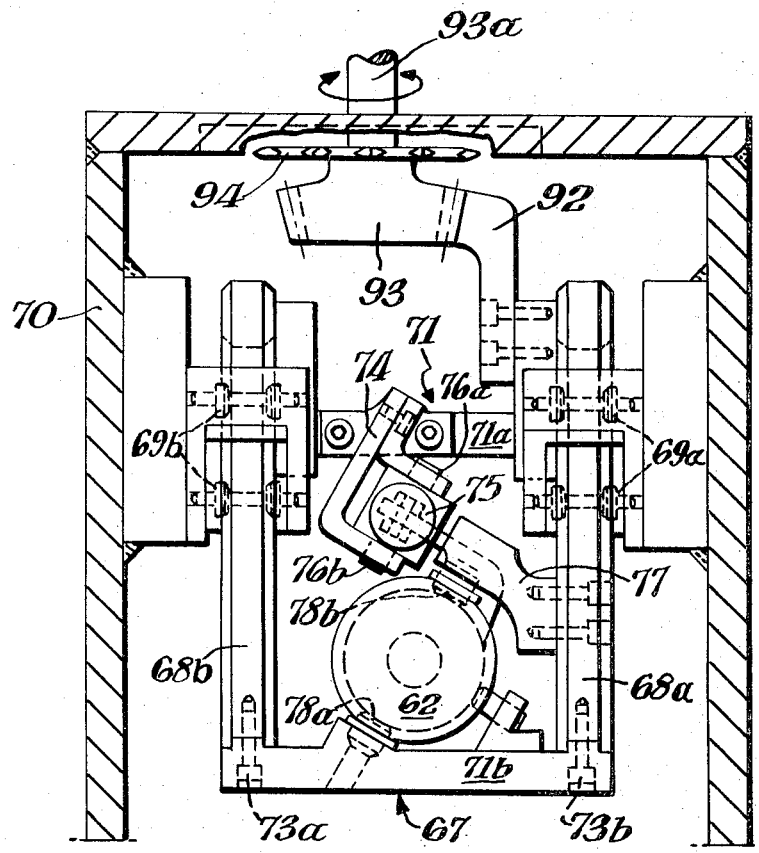
Figure 12A:
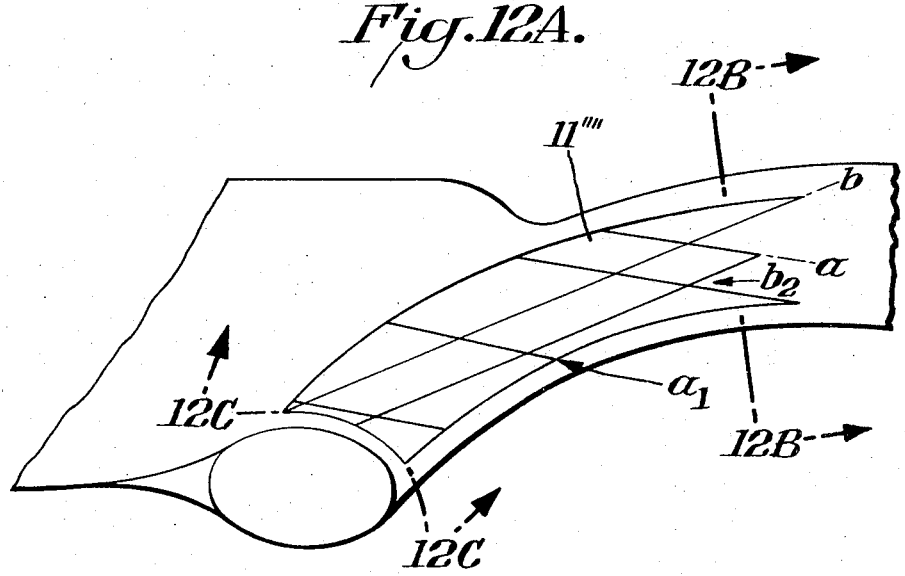
Figure 12B:
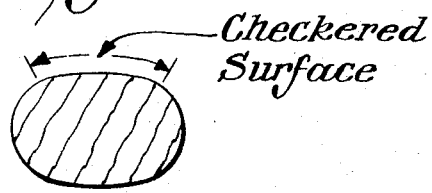
Figure 12C:
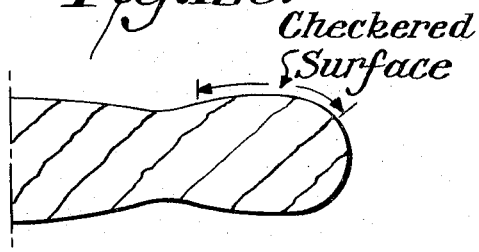
Figure 12D:
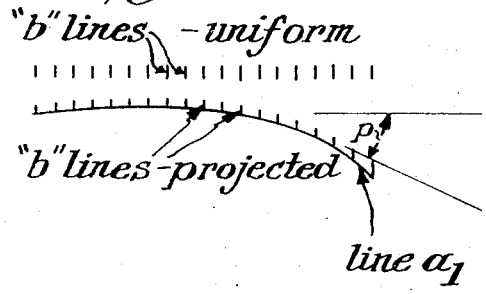
Figure 12E:
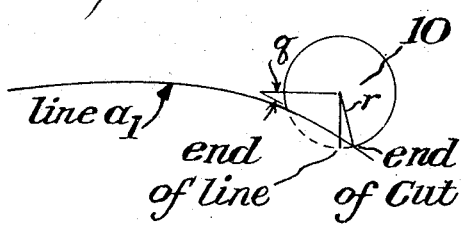
Figures 14A, 14B:
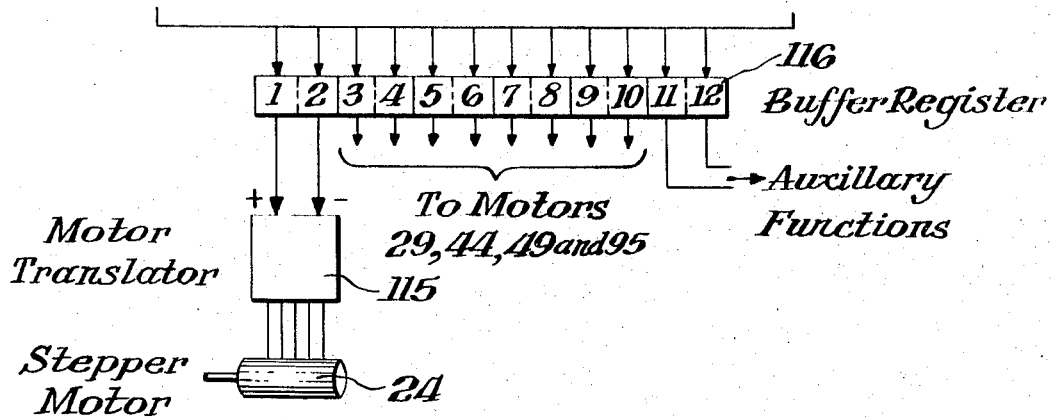
Figure 15A:
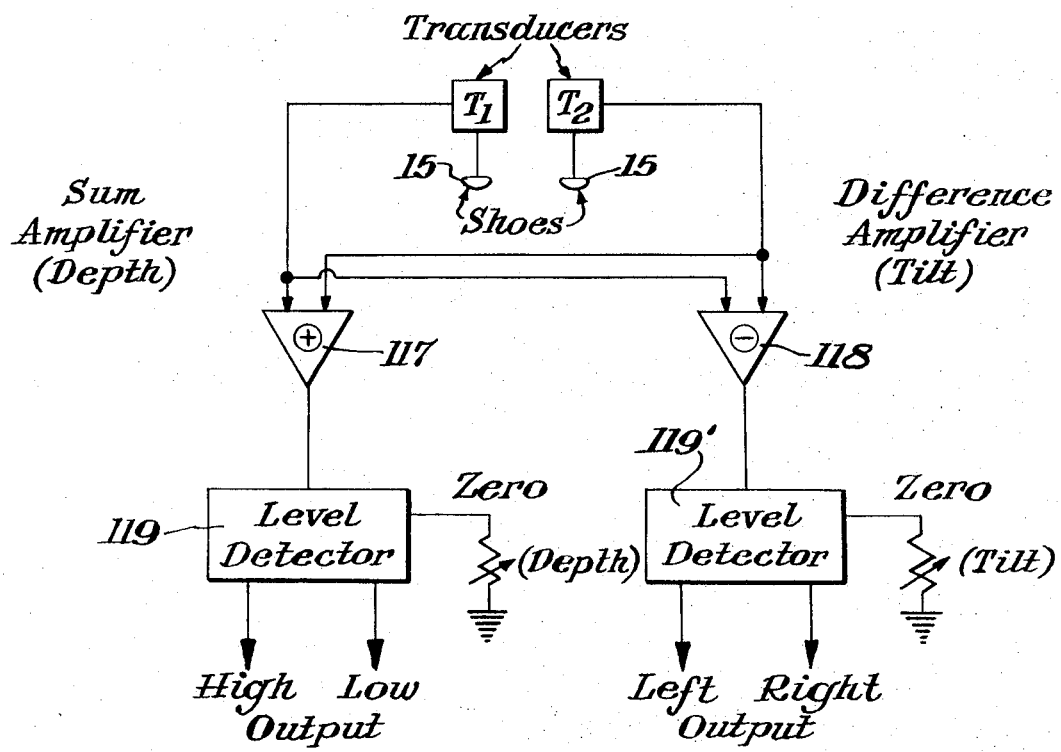
Figure 15B:
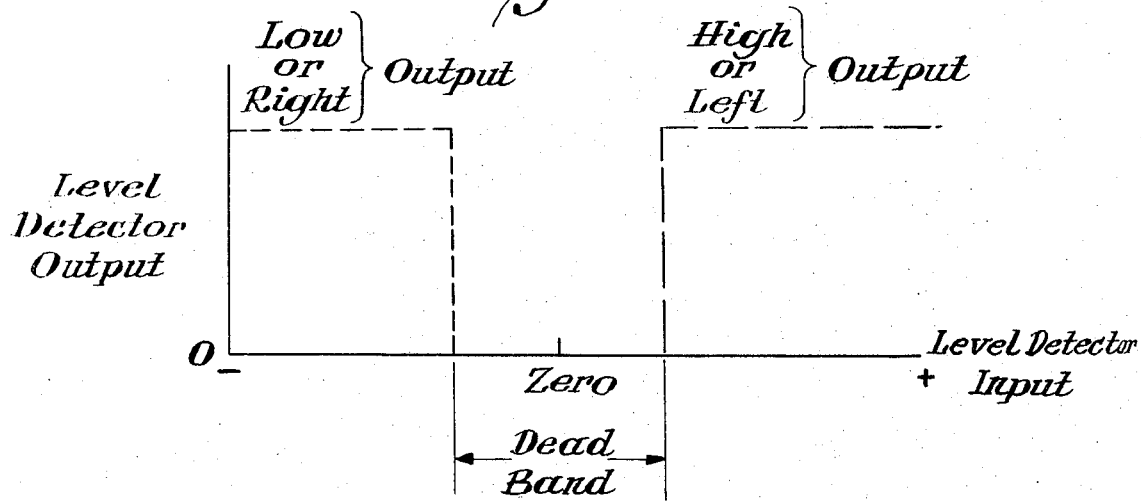

The following schematic and diagrammatic drawings are illustrative of the method and apparatus of this invention, in which:

FIG. 1A, a plan view, shows a typical checkering pattern as applied to firearm grips, FIG. 1B is an enlarged inset view of a localized portion of the checkering pattern of FIG. 1A, FIG. 1C is a plan geometrical representation of a typical diamond inscribed by checkering, FIG. 1D is a cross-sectional view taken on line 1D—1D, FIG. 1A, FIG. 2A is a fragmentary plan view of a rotary cutter employed in this invention in the course of cutting one set of parallel grooves in the planar surface of a firearm grip, FIG. 2B is a fragmentary plan view of a rotary cutter employed in this invention in the course of cutting a second set of parallel grooves offset angularly from the first set shown in FIG. 2A to create a diamond pattern, FIG. 3 is a fragmentary diagrammatic end view in cross-section of two different cuts in the course of completion in a wood work piece having an arcuate profile, illustrating the necessity for inclining the rotary cutter at different angles with respect to the vertical to obtain uniform pattern formation, FIG. 4 is a plan view representation of the approximately cylindrically formed wood fore-end grip of a shotgun illustrating the multiple motion components required to obtain the correct relative motions between a circular cutter and the work piece to impart a checkered pattern, FIG. 5 is a diagrammatic representation of the displacement of any given point on the work piece of FIG. 4 during the checkering thereof, FIGS. 6 and 7 are side elevation views of a work piece in section illustrating a method for sensing the position and angle of the surface as a basis for Z depth and $\alpha$ tilt servo control, FIG. 8 is a partially broken front elevation view of a preferred apparatus for effecting checkering according to this invention, FIG. 9 is a partially broken end elevation view of the apparatus of FIG. 8 taken on line 9—9, FIG. 8, FIG. 10 is a section taken on line 10—10, FIG. 8, with the toothed cutter motor indexed to operating position, FIG. 11 is a section taken on line 11—11, FIG. 9, with the toothed cutter motor indexed to operating position, FIG. 12A is a perspective view of the hand grip portion of a firearm stock showing the boundary lines together with representative checkering lines of a typical checkered pattern, FIG. 12B is a section taken on line 12B—12B, FIG. 12A, FIG. 12C is a section taken on line 12C—12C, FIG. 12A, FIG. 12D is a diagrammatic representation of the projected locations of uniformly spaced $b$ lines onto the curved surface through line $a_1$ for the hand grip shown in FIG. 12A, FIG. 12E is a diagrammatic representation of the terminal position of the cutter with respect to the work piece in inscribing an $a$ line in the hand grip of FIG. 12A, FIG. 13 is a schematic arrangement diagram for apparatus according to this invention as used for the simultaneous control of a plurality of machine tools, FIG. 14A is a detail schematic representation of the buffer interposed between the control computer and a machine controlled in FIG. 13, FIG. 14B is a table relating bit significance to control achieved for the multiple controlled machine arrangement of FIG. 13, FIG. 15A is a schematic detail of the transducer-amplifier arrangement for depth and tilt control for a single controlled machine in the arrangement of FIG. 13, FIG. 15B is a schematic representation of response characteristics for the paired level detectors in a single controlled machine in the arrangement of FIG. 13, FIG. 16 is a schematic representation of the $x, y$ coordinate system overlying the work surface of a wooden gun component, FIGS. 17A and 17B, in recited continuation constitute the Data Reduction Program Flow Chart for N/C Checkering according to this invention, and FIGS. 18A–18D in the sequence recited constitute the Checkering Machine Control Computer Flow Chart according to this invention.

INTRODUCTION

Hand-cut checkering has been used traditionally to provide a firm hand-grip on the wooden portions of firearms and to enhance product appearance. Although many substitutes have been employed for hand-checkering stocks used on low to moderate-priced sporting arms, the high quality market requires precisely formed decorative patterns, firm hand grips, and a surface finish which shows grain pattern continuity, all of which have hitherto been obtained only by expertly cut hand checkering.

The term "checkering", as used in the firearms arts, refers to a combined functional and decorative treatment of a wood surface, usually in those regions requiring a firm grip, "regular" checkering consisting of a regular geometric pattern of elongated equilateral pyramids formed by two sets of parallel V-grooves (or lines) inclined at an acute angle to one another. The border, or boundary, of the checkered area can be simply the outermost one of the basic generating lines, or can be an arbitrary line or groove forming a decorative border. "Skip-line" checkering is a variation which comprises regular checkering altered, for example, by the omission of every fourth line of each set.

A typical checkering pattern suitable for a rifle or shotgun pistol grip is illustrated in plan in FIG. 1A, only a representative number of generating lines being shown for clarity.

FIG. 1B, an inset view denoted by the enclosing circle on FIG. 1A, is an enlarged plan view of the pyramidal pattern, whereas FIG. 1C is a further enlarged view of an individual pyramid, or "diamond", as the upraised regularities are usually referred to.

FIG. 1D is a section taken on line 1D—1D, FIG. 1A, showing the cross-sectional shapes of the individual cuts.

The general characteristics of a checkering pattern are as follows:
1. Line spacing, i.e., the separation between the parallel lines ($L_1$, $L_2$, FIG. 1D) is usually given as number of lines per inch. Extreme values range from 16 to 30 lines per inch; however, commonly used values are 20–24 lines per inch.
2. Included angle of the cut (FIG. 1D) can vary from about 60° to about 90°, with 90° most commonly used.
3. Diamond ratio is the length (L) to width (w) ratio of the elongated pyramid or diamond (FIG. 1C). This determines the acute angle $\beta$ between the two sets of generating lines; i.e., $\beta = 2 \tan^{-1} w/L$. In practice this ratio can vary from about 2.5:1 to 3.5:1, with approximately 3:1 being most commonly used.
4. Border — FIG. 1A illustrates several types of boundaries or borders used in typical patterns. Lines $a$ and $c$ follow essentially the shape of the stock, whereas line $b$ is a purely decorative border. The group of boundary lines collectively denoted $d$ are the outermost lines of the two basic generating line sets, these forming what is commonly termed a "point pattern".

The selection of the parameters for a given pattern depends on the desired use of the firearm, the grade and quality of the wood, the relative weight accorded to the functional versus decorative properties, and the cost of production. The values hereinbefore cited as common represent, usually, the best compromise for wood of medium to good quality, with extremes, such as very fine checkering, utilized only on high-priced custom-made arms, using extremely high-grade wood.

The characteristic parameters listed can be combined to define mathematically a checkering pattern on, for example, a plane surface, as follows, assuming the use of straight lines:
1. specify the line spacing;
2. specify the included angle between generating line sets, or the diamond ratio;
3. specify line end points, i.e., the border.

The foregoing defining parameters can be extended, at least approximately, to the surfaces of three-dimensional shapes, such as cylinders or certain other surfaces on which the "flat" pattern may be "wrapped around" the surface without "wrinkles". For example, the straight line of the flat pattern will become a helix on the surface of a right circular cylinder. It can be generalized further that the "straight" line of a checkering pattern can be defined as the line generated by the edge of a flexible rule applied closely to the surface to be checkered.

The ideal checkering pattern as applied to an actual gunstock surface then requires that:
1. all lines are straight, in accordance with the flexible rule criterion;
2. all lines in one generating set are parallel to all other lines in the same set;
3. the angles of intersection of all lines of one generating set with all lines of the other generating set are equal;
4. as a consequence of the three foregoing requirements, all diamonds are equal in size and shape.

Given those geometric surfaces on which it is possible to fulfill the four requirements supra, and if all geometric dimensions are known, it is theoretically possible to perform the entire checkering operation by conventional milling techniques, using either conventional machines or numerically-controlled machines. In practice, however, the actual surfaces of firearm stocks are combinations of complex curves, so that compromise in the ideal criteria must be made in manual layout and checkering. The use of conventional machining methods is completely impractical, because of the involved mathematics necessary to program the machine and the complex tool or workpiece motions necessary to conduct the operations. In addition to the complex shapes, the actual dimensions of stocks are not known to the precision required for conventional machining methods. Tolerances of up to ±0.030 inch are common and perfectly acceptable in all functional requirements of the as-received stock, and it is normally not economically feasible to use closer tolerances. However, since typically, the depth of a checkering line is 0.025 inch, or less, it is obvious again that conventional machining practice is unsuitable for checkering.

Accordingly, in order to realize the economies of automatic machining operations as applied to checkering, and still produce a product having all of the essential qualities of hand checkering, it was necessary to provide, according to this invention:
1. a machine tool (and work support) supplying the necessary relative motions between the cutter and the work-piece;
2. control functions for the machine tool (and work support), including a combination of feed-forward numerical control with feed-back servo control;
3. an electronic controller combining the control functions of 2;
4. mathematical methods and computer programming for accomplishing the control functions of 2 through the agency of 3.

The configuration for the machine tool, including the necessary relative motions between the cutter and the work-piece, can best be understood by consideration, in detail, of the types of surfaces upon which checkering is to be performed, and this geometric analysis can conveniently be classified into two major categories.

1. Approximately Flat Work-piece — A typical example is checkering applied to the sides of the pistol grip of a firearm. A checkering pattern, drawn on a flat horizontal surface, can be projected vertically onto the grip surface with only a small degree of pattern distortion. All checkering cuts can be made from above the checkered surface, with the piece rigidly clamped so that the surface is approximately horizontal. The pattern can be defined mathematically as a pattern on a plane, suitably modified to fit the actual curvature of the surface.

2. Approximately Cylindrical Work Piece — An example is firearm fore-end checkering. A pattern drawn on a flat sheet, can be figuratively wrapped around the surface, where it will fit with only a small distortion. In this case, the work piece is rotated under the cutter in order to reach all portions of the pattern. The pattern can be defined mathematically as a pattern on a right-circular cylinder (possibly derived from a plane), and suitably modified to fit the actual surface.

There will, of course, be occasions in which a combination of the two basic configurations will be necessary, e.g., in an "all-around" pistol-grip pattern.

THE DETAILED INVENTION

The cutting configuration for the approximately flat surfaces of work pieces of category 1 supra is shown schematically in FIGS. 2A and 2B. In FIG. 2A, a plan view, the cutter 10 of this invention, which is a power-driven rotary V-profile toothed cutter, is shown in contact with the wood surface of a work-piece 11 at a proper depth preselected to cut a single checkering line set pattern. In this operation, cutter 10 is not traversed but work-piece 11 is fed in the downward direction denoted the Y axis in FIG. 2A. At the termination of the cut, the work piece and cutter are momentarily disengaged from one another and work-piece 11 is moved laterally along the X-axis an amount equal to the line spacing, after which the work piece and cutter are again engaged to make another cut. After the first set of lines has been cut, as in FIG. 2A, the work piece is repositioned, as in FIG. 2B, so that the old Y direction (denoted Y') is offset angularly from the setup of FIG. 2A by the diamond angle $\beta$. The cutting operation now proceeds with Y motion providing the feed and X direction indexing the line spacing, until the pattern is completed.

FIG. 3 is a cross-section of the operation of FIG. 2A wherein the work-piece has a typical surface curvature A. When making the cuts at (1), the plane of the cutter 10 is tilted to the left of vertical by an angle $\alpha_1$ to maintain the cut normal to the surface. The cuts at position (2) require a different angle of tilt, $\alpha_2$. Accordingly, an additional machine motion must be provided, this constituting the cutter tilt, $\alpha$, in order to compensate for surface curvature. It is desirable, though not essential, to effect this motion from a center of rotation located at the lowest point of cutter 10, as indicated.

A vertical motion, denoted Z in FIG. 3, is obviously necessary to permit the cutter to be raised free of the work-piece 11 at the end of each cut. This vertical motion is also required during the cutting period to maintain proper depth of cut as the contour A of the surface varies. In addition to the vertical variation in any one work-piece, it is essential that tolerance variation from work-piece to work-piece be accommodated. The nominal piece surface B, denoted in dotted line representation in FIG. 3, illustrates a typical dimensional tolerance variation.

The machine motion requirements for the category 1 approximately flat surfaces can thus be summarized as follows:

1. Y axis — longitudinal feed.
2. X axis — lateral spacing.
3. Z axis — vertical motion.
4. $\alpha$ axis — cutter tilt.

Of these four axes, or machine motions, the Y and X axes can be controlled on a preprogrammed basis, as from tape. The Z axis and the $\alpha$ axis must be controlled by a follow-up servo control based on sensing the actual location and angle of the surface at the position of the cut. In addition, preprogrammed control must be provided for these axes for line spacing, initial positioning and other incidentals.

The second major category of checkered surface is illustrated schematically in plan view in FIG. 4. The work-piece, 11', is, typically, a firearm fore-end, approximately cylindrical in shape. It is mounted between centers 14, 14' at opposite ends, with provision for rotation $\Omega$ of the work-piece under positive (tape) control around the axis 14, 14'. The other axes of motion illustrated in FIG. 4, denoted X and Y, are the same as hereinbefore described with reference to FIGS. 2A and 2B, and are also positively controlled.

For ease in understanding the required machine motions for category 2, it can be assumed that workpiece 11' is a right circular cylinder. Each checkering line 12, then, is a helix, and the helix angle (i.e., the angle between the cylinder axis and the projection of a tangent to any portion of the helix) is equal to one-half the diamond angle $\beta$. In order to scribe this helix on the work piece (i.e., if a scriber is substituted for cutter 10), it is necessary to move work-piece 11' under the scriber in a longitudinal direction along the work-piece 11' axis 14, 14', and simultaneously rotate work-piece 11'. In the actual case, with cutter 10 in place, the plane of the cutter must, of course, be inclined to the axis of rotation of work-piece 11' by one-half the diamond angle $\beta$.

Referring to FIG. 4, the required motions are shown by the arrows, i.e., work-piece 11' is translated along the axis of rotation 14, 14' and is simultaneously rotated in a counterclockwise direction. These motions are obtained by directly rotating the work-piece 11 around the 14, 14' or $\Omega$ axis and simultaneously moving the work piece along axes Y and X in a preselected ratio so that the resultant motion is along the work piece axis 14, 14'. Since this axis is inclined to the Y axis by one-half of the diamond angle $\beta$, the ratio of X velocity ($V_x$) to Y velocity ($V_y$) can be written:

$$V_x/V_y = \tan \beta/2,$$

where $\beta$ = the diamond angle.

Since the $w/L$ ratio of the pattern diamonds = tan ($\beta/2$), the velocity ratio is $1/D$, where $D$ = the diamond ratio.

The required speed of rotation can be determined from the diagram of FIG. 5, in which is shown a portion of the work piece rotating about centers A—A, and with Y and X motions in directions as shown. During a given time interval, the combined Y and X drives furnish a resultant motion of the work piece along its axis through the distance $eb$ and the $\Omega$ (work piece rotation) drive rotates the work piece (counterclockwise) through the angle $\Omega$. If the cutter 10 is initially at point $c$, during the given time interval a checkering cut will be made along the line $cf$, such that:

1. $<dcf = \beta/2$, where $\beta$ = diamond angle.
2. and $cd/df = D$ = the diamond ratio.

For these conditions to be true,

3. $v_{df} = (1/D) v_{cd}$, where $v_{df}$ = the resultant velocity along line $df$ and
$v_{cd}$ = the resultant velocity along line $cd$.
$= v_{be}$ and $v_{be}$ = the resultant velocity along line $be$.
But 4. $v_{be} = \sqrt{v_{bg}^2 + v_{ge}^2}$
$= \sqrt{V_y^2 + V_x^2}$
5. $V_x = V_{y/D}$ Therefore $v_{df} = (1/D) \sqrt{V_y^2 + (V_y^2/D^2)}$
6. $= (1/D) V_y \sqrt{1 + (1/D^2)}$ But $df = (\Omega/360)(2\pi r)$ where $r$ = the radius of the workpiece at cut location and 7. $v_{df} = (v_\Omega /360)(2\pi r)$ where $v_\Omega$ = rotational velocity of work-piece in degrees/sec.

From 6 and 7,

8. $v_\Omega = (360/2\pi r)(V_y/D) \sqrt{1 + 1/D^2}$

This expression establishes a relationship between the instantaneous work-piece rotation velocity and the master (Y) feed rate in terms of the diamond ratio (D) and the radius of the work-piece 11' at the point of cutting.

The vertical (Z) and tilt ($\alpha$) motions are, of course, required to automatically adjust cutter depth and tilt to correspond to surface contours, i.e., for predetermined orientation of the tool with respect to the work surface of the work piece.

The machine motions required for the approximately cylindrical work of category 2 can now be summarized as:

1. Y — Longitudinal
2. X — Lateral
3. $\Omega$ — Work-piece rotation
4. Z — Vertical
5. $\alpha$ — Tilt The interrelationship between these motions is much more complex than for the category 1 approximately flat work-piece case. The feed is now a composite of X, Y and $\Omega$ motions, with X and Y normally driven at constant velocity with a fixed ratio, and with $\Omega$ related to X, Y and the work-piece radius. Line spacing is accomplished by $\Omega$ motion alone, but the amount of rotation is also a function of radius. The functions of Z and $\alpha$ are identical with those of the category 1 case. Accordingly, the practical machine configuration suitable for the checkering of either category, or combinations of both at will, is achieved by including all five of the motions essential for the more complex category 2 production.

SERVO CONTROL

FIG. 6 illustrates schematically a method for sensing the position and angle of the surface as a bias for the Z and $\alpha$ servo control. A pair of small shoes 15, mounted so as to move freely in a near-vertical direction, are positioned on each side of cutter 10 closely adjacent thereto. The shoes operate position transducers, denoted $T_1$ and $T_2$, which can each typically constitute small axially movable core transformers, such as Model 24DCDT-050-B12 marketed by the Hewlett Packard Company. Thus, each transducer furnishes an electrical signal output proportional to the displacement of the shoes 15 from their normal zero positions. During the cutting operation, the shoes rest on the surface of the work-piece 11'', one on each side of cutter 10.

Referring to FIG. 7, the sensing combination is used to furnish signals for the control of both the cutter 10 depth (Z) and the cutter tilt ($\alpha$). The depicted positions of shoes 15 with respect to surface 11a of workpiece 11'' are chosen one above and one below the zero line of cutter 10, which is drawn at the correct cut depth and tilt with relation to the cutter. The displacements of the two shoes 15 from this zero line are denoted $t_1$ and $t_2$, respectively.

If the algebraic sum of the two displacements is calculated:

$$\Delta Z = t_1 + t_2$$

where $\Delta Z$ is proportional to the error in depth. Also, if the algebraic difference is calculated:

$$\Delta \alpha = t_1 - t_2$$

and $\Delta \alpha$ will be proportional to the error in tilt angle. If both of these quantities, $\Delta Z$ and $\Delta \alpha$, are reduced to zero by the action of the servos controlling axes Z and $\alpha$, respectively, and this action is performed continuously throughout the cut, then cutter 10 will remain in the correct position relative to surface 11a, despite curvature, normal variation within tolerance or other surface anomalies.

MACHINE CONFIGURATION

A preferred design of apparatus for checkering according to this invention is that detailed in FIGS. 8 and 9.

Here a machine bed 18 is provided with a Y-axis carriage 20 carrying the ways of an X-axis carriage 25.

Y-axis motion is furnished through lead screw 21 coupled to carriage 20 through ball nut 22, lead screw 21 being power-rotated through cable chain drive 23 connecting with drive motor 24.

Similarly, X-axis motion is furnished through lead screw 26 coupled to carriage 25 through ball nut 27, lead screw 26 being power-rotated through cable chain drive 28 connecting with drive motor 29.

The work-piece 11'''', in this case a shotgun fore end, represented in broken outline, is mounted between centers 33 and 34 carried by a cradle 35. The cradle is rotatably supported on an integral vertical pin 36 journaled in vertical sleeve bearing 37 carried by X-axis carriage 25. Cradle 35 can be indexed to any preselected angular position defined by appropriate location of its swing-limiting stop pins, and thereafter locked in place by a fluid-powered cylinder 38 secured to pin 36 through crank arm 39.

Work-piece 11'''' is driven in rotation by worm wheel 42 of head stock 34 engaging with worm 43 via motor 44, thereby furnishing the $\Omega$ motion.

The superstructure comprises a support arm, denoted generally at 48 overhanging the work piece, which is power-driven vertically (to provide Z-axis motion) by drive motor 49 connected by drive chain 50 and sprocket 51 to vertical lead screw 52 engaging with a ball nut 53 integral with support arm 48. Precision vertical travel is insured by upright guide rod 56 integral with bed 18, which is slidably engaged with a ball bushing disposed within support arm 48. A thrust bearing 57 mounted on bed 18 carries the considerable load of support arm 48 and its appurtenances hereinafter described.

For best efficiency it is preferred to fit the apparatus with two alternately operable cutting tools: (1) a rotary cutter 10 shown in work-contacting position in FIG. 9 and (2) a router 60 shown in work-contacting position in FIG. 8. The tools are preferably pneumatically powered, high-speed commercially available types, rotary cutter 10 typically being driven at about 60,000 r.p.m. by its motor 62 whereas router 60 can be driven at 200,000 r.p.m. by its motor 63.

The $\alpha$ tilt axis motion is obtained by supporting both cutting tools on a common arcuately-movable head, denoted generally at 67 (see FIGS. 10 and 11 particularly, which omit, however, transducers $T_1$ and $T_2$). Head 67 is provided with a pair of semi-circularly formed rotatable tracks 68a and 68b, which are interposed between radially opposed pairs of free-running guide rollers 69a and 69b, respectively, journaled in bearings carried by yoke 70 disposed outboard from support arm 48.

The interconnecting structure of head 67 comprises the motor assembly bridge, denoted generally at 71, which is attached transversely between tracks 68a and 68b by machine screws, such as 72a, 72a and 73a, 73b.

The upper transverse member 71a of bridge 71 supports air cylinder bracket 74 carrying air cylinder 75, which is journaled therein by trunnions 76a, 76b. Similarly, cutter drive motor 62 is supported between the lower transverse member 71b and an inwardly disposed boss 77 through trunnions 78a, 78b. A clevis connection 82 connects the piston 75a of air cylinder 75 with clevis arm 82a encircling cutter drive motor 62, so that extension of piston 75a swivels drive motor 62 on its trunnions to work-engaging position, shown in FIG. 9, whereas retraction of piston 75a swivels drive motor 62 and cutter 10 to laterally withdrawn position, shown in FIG. 8. Router indexing air cylinder 83 (FIGS. 8 and 9) is reversely synchronized with the cutter tool motor 62 indexing to bring the router tool 60 into engagement with the work-piece 11′′′′ in cutting relationship as portrayed in FIG. 8, and to withdraw the router tool from cutting relationship as portrayed in FIG. 9.

Referring to FIG. 9 particularly, oppositely inclined transducers $T_1$ and $T_2$ comprise transformer pick-up coils 86a, 86b, through the centers of which pass armature rods 87a, 87b, these rods being steadied within linear bearings 88a, 88b carried by depending support arms 89a, 89b screw-attached to bridge 71. With this construction the sensing foot portions 15 contact the surface of work-piece 11′′′′ closely adjacent the cutting tools, but on opposite sides thereof, for purposes of $\alpha$ angular guidance and Z depth control with respect to the work piece surface presented as hereinbefore described.

Head 67 and its appurtenances rotates as a unit under drive by gear sector 92, bolted to the inside of track 68a, through engagement of pinion 93 driven by chain-and-sprocket assembly 94 via tilt motor 95.

In the interests of safety, it is important that head 67 be locked against any undesired movement in the event of power supply interruption to tilt motor 95. Accordingly, there is provided a fail-safe magnetic brake, denoted generally at 97, which is connected to the upper end of support shaft 93a of pinion 93, not further detailed. Magnetic brake 97 is interlocked with the power supply circuit of tilt motor 95, so that there is insured a positive lock of head 67 in the event of power less to motor 95.

Since ball nut drive 53 is possessed of very low friction, which would not lock support arm 48 and its appurtenances against wind-down rotation in the event of power loss by Z axis drive motor 49, a second fail-safe magnetic brake similar to 97, but not detailed in the drawings, is provided for arm 48 vertical locking service.

To facilitate numerical operational control as hereinafter described, all of the drive motors are pulse-actuated stepper motors, the following commercial types, all manufactured by U.S.M. Corporation, being suitable: drive motors Y-axis (24), Z-axis (49) and tilt (95) being model HDM-1600-800-4, whereas X-axis (29) and $\Omega$ axis (44) can be HDM-150-800-4.

LINE PATTERN TRANSFER

The foregoing description of apparatus and checkering patterns has been limited to relatively geometrically simple cases wherein the work-piece 11′′′′ surfaces are either flat or cylindrical. In the latter instances, the basic line pattern can be drawn on paper and effectively projected onto flat surfaces, or wrapped around cylindrical surfaces. In most practical work, however, the resultant pattern on the wood exhibits distortions which must be corrected through the control system in order to meet acceptable checkering quality standards.

Typical distortions of this kind are illustrated in FIGS. 12A–D, inclusive, which depict a pistol-grip point pattern. FIGS. 12B and 12C indicate the widths of the respective checkered areas for the two sectional regions taken on lines 12B—12B and 12C—12C, respectively, of FIG. 12A.

Referring to FIG. 12A, the checkering pattern is composed of the two sets of lines, $a$ and $b$. A cross-section lengthwise of line $a_1$ (FIG. 12D) illustrates a typical pattern distortion resulting from a simple projection of a flat pattern onto the curved grip surface. Here the uniform spacing of the $b$ lines one from another on a plane, when projected downwards to the curved stock surface, no longer shows a uniform spacing. In fact, the separation between adjacent $b$ lines increases by a factor $1/\cos p$, where $p$ is the angle of inclination of the work surface from the horizontal. This tends to cause a curvature near the center of $b$ lines in the vicinity of $a_1$, FIG. 12A. Acceptable correction for this effect can be incorporated in the control program by suitable manipulation of the X lateral motion in conjunction with the Y feed motion.

A second type of geometric distortion is illustrated in FIG. 12E. Here the same longitudinal section at line $a_1$ is depicted, this time in connection with the cutting of $a$ lines. The position of cutter 10 is shown schematically with its center disposed directly above the end of line $a_1$. As shown, however, the actual cut will be short in the "downhill" direction by an amount equal to $r \sin q$, where $r$ is the cutter radius and $q$ is the inclination of the surface from the horizontal. This distortion can be eliminated by extending the programmed length of each line in the Y (feed direction) by an appropriate amount.

Similar types of distortion can appear in cylindrical checkering, depending on the deviation of the actual wood work piece surface from "ideal". For example, some local portions of the checkered surface may appear conical or ellipsoidal. Then, since it is desirable to synchronize the X and Y motions as hereinbefore described to maintain motion of the work piece along its axis, the distortion correction is inserted as a preselected deviation of the work piece rotation $\Omega$ from the simple relationship of inverse proportionality to radius.

The mathematical methods and computer programming relating to distortion correction are hereinafter taught in greater detail.

Border cut line patterns present somewhat unique problems because they are not straight and can assume almost any curved shape on the work surface, as particularly illustrated in FIG. 1A. Usually, although not always, border cuts can be of approximately the same cross-section as the checkering lines.

Advantageously, border lines are best cut by use of a perpendicularly mounted V-type router tool 60, FIGS. 8 and 9. Actually, a router is a much less efficient cutter than the rotary cutter 10 used on the checkering lines; however, it is especially adapted to achieve the sharply curved lines of borders. In any case, router tools 60 are controlled by the same shoe sensors and servo control system used to control depth and tilt, and the program required for both checkering and border control intermittently is of the essentially conventional contour type.

CONTROL SYSTEM

A complete operating system according to this invention is portrayed schematically in FIG. 13.

Here the pattern descriptive information, output as control tape 105, is preferably prepared by punch 101 responsive to master computer 102, typically either using graphic input 103 as shown, or a conventional card or tape input. Plotting table 104 provides a graphic output for pattern checking.

Machine control is effected by a second computer 108, reserved for the control function exclusively, which may control, on a time-shared basis, up to six or more individual checkering machines 109a and 109b, only two of which are shown, each provided with its own individual machine control auxiliary 111a, 111b, respectively. Programmed control information is input via tape reader 110 to control computer 108, whereas, feedback control information is input via checkering machine individual servo circuits 112a, 112b each provided with transducer pairs $T_1$, $T_2$ and $T_1'$, $T_2'$, shown as responsive to sensor shoe pairs 15,15 and 15',15', respectively.

CONTROL PROCEDURE

From the foregoing, it will be understood that control tape 105 inputs information descriptive of the pattern to be cut including the required corrective functions of nature described with reference to FIGS. 12A–12E.

The machine control equipment responsively performs the following general functions:
1. The information on tape 105 must be processed, interpreted and output in a form which can be utilized by the several checkering machine drive motors 24, 29, 44, 49 and 95.
2. The sensed information received from the servo circuits 112a and 112b must be processed and translated to motor control signals.
3. Additional miscellaneous control signals, such as, for example, the air supply to cutter drive motor 62 and router drive motor 63, as well as other information, must be furnished.

The feed back signal received by control computer 108 indicates only the existence and the direction of an error, without information regarding error magnitude or time duration. However, control can be achieved by programming various control algorithms into digital computer 108 to satisfactorily control responsive to the servo system embodying circuits 112a and 112b. Such algorithms can range from a simple on-off control through a running average technique to minimize effects of system noise to relatively sophisticated controls based on error integration. Generally speaking, the most suitable control algorithm depends upon system characteristics such as mechanical inertia, speed of moving elements and like considerations.

Before detailing the control program, description of the mechanical assembly is now completed with reference to FIGS. 14 and 15, respectively.

The output interface between control computer 108 and the several machine drive motors is portrayed schematically in FIG. 14A, only one stepper motor, Y-axis drive motor 24, being shown in the drawing.

It will be understood that a stepper motor operates by advance of one equal incremental part of a revolution responsive to each electrical impulse applied to its conventional motor translator 115, supplied in this case as a part of the control computer system. The direction of stepper motor advance is determined by applying the stepping impulse as either a forward or reverse running input via the translator. In the system of FIG. 14A, a computer word (typically, twelve bits, as indicated) is supplied as output of computer 108 through a buffer register 116 to the several translators, e.g., translator 115. Each pair of bits, through the first 10 bits, furnishes the stepping impulses for one motor, e.g., motor 24. Thus, bits 1 and 2 feed the first motor, bits 3 and 4 the second motor, etc. In practice, one of each bit pair, typically, the odd-numbered, is connected to the forward-running (+) terminal of translator 115, whereas the even-numbered bit is supplied to the reverse-running (−) terminal. The computer words are supplied from computer 108 at a preselected repetition rate maintaining desired speed operation of the motors. The order of bits in each output word will, thus, determine whether each individual motor moves one increment forward, one increment back, or not move. A typical bit configuration as illustrated in FIG. 14B, causes all five motors to operate simultaneously as indicated.

The remaining two bits, i.e., Nos. 11 and 12, can be decoded to accomplish miscellaneous machine functions, such as cutter drive motor turn-on, etc.

Control computer 108 can be one of a number of commercially available small, general purpose digital types. One such computer utilized a 12-bit word length and was available with 8,000 words of core storage, which was entirely adequate capacity for the shared time control of at least five machine tools.

Tape reader 110 was of the photoelectric type, a commercially available Model RRS1150 marketed by Remex Company proving entirely satisfactory.

The servo circuits are shown schematically in FIG. 15A. Referring again to FIG. 7 and the accompanying description, the controls for depth and tilt are based on calculations of sum and difference, respectively, of the transducer $T_1$, $T_2$ output signals. The circuits which accomplish these calculations, in the analog mode, are shown schematically in FIG. 15A.

Thus, the two servo shoes 15 are mechanically connected to the cores of the respective linear variable differential transformers (LVDT) $T_1$ and $T_2$. The transducer outputs are connected to: (1) a sum operational amplifier 117, to produce the cut depth control signal, and (2) a difference operational amplifier 118, to produce the tilt control signal. Each operational amplifier drives a level detector 119, 119', which can be supplied as part of the control computer system marketed by the Digital Equipment Corporation, the outputs of which, relative to the input, is shown in FIG. 15B. As the level detector input varies linearly throughout the range, the outputs discontinuously assume one of three conditions, i.e., High (Left) on, Low (Right) on, or both off (Zero). The relative width of the Zero zone (or dead band) can be adjusted for optimum control sensitivity. The High and Low outputs furnish interrupt signals to computer 108, indicating, in the case of signals originating in summing amplifier 117, that a correction in the position of the Z (depth) axis is required. Correspondingly, the signals originating in the difference amplifier 118 indicate that tilt ($\alpha$) corrections are required. The sensitivity of the transducer circuit combination is such that deviations large enough to actuate the necessary corrective actions are well within the applicable tolerances of both depth and tilt.

The potentiometers connected between level detectors 119 and 119' and ground are provided for predetermined selection of control values of Z (depth) and $\alpha$ (tilt), respectively.

MATHEMATICAL ANALYSIS

The mathematical and programming procedures necessary in the checkering machine control system must provide for two general tasks: (1) Preparation of control tape 105 in an off-line computer 102 and (2) Operation of machines 109a, 109b by control computer 108 using information furnished by tape 105, supplemented by feedback from servo circuits 112a and 112b.

The general principles involved in both of these tasks is described as follows, the actual programs required for each, together with their simplified flow sheets, being appended as additional teaching.

The flat pattern illustrated in FIG. 1A is chosen as representative of the geometric treatment required for all patterns. This is practicable because: (1) a simple modification of the flat patterns serves for checkering approximately flat surfaces and (2) the flat pattern can be wrapped around to form a cylinder and suitably modified for checkering an approximately cylindrical surface.

The principal characteristics of a simple flat pattern are:

1. the two sets of generating line sets, specified by the line spacing, the diamond angle $\beta$, and the line end points;
2. the border, specified by the end points of each line of the generating sets.

It is convenient for the mathematical preparation of control tape 105, and essential for machine operation, to select two separate systems of coordinate axes, one for each generating line set. For each such system, the first, or $y$, axis is parallel to the lines under consideration, whereas the second, or $x$, axis is perpendicular to the $y$ axis. Each line segment is described by just three numbers: the $x$ value and the two $y$ values, one at each end. Successive $x$ values, in the unmodified pattern, will differ from the previous $x$ value by a constant representing the line spacing.

The $y$ values representative of the border curve can be determined by manual or mechanical digitization. In some instances, it may be preferable to represent the border curves mathematically in the form of:

1. a straight line (which can, or need not, be one of the generating lines),
2. a polynomial of degree 2 or 3 (e.g., $X = a + by + cy^2 + ...$),
3. a set of parametric equations of degree 2 or 3, e.g., $$(x = a + b\mu + c\mu^2 + ...)$$
$$(y = e + f\mu + g\mu^2 + ...).$$

In general, the border curves for one set of generating lines will become the border curves for the other set of generating lines upon the following transformation, provided that the origins of the two sets of axes are coincidental.

Thus, if $x_a = f(y_a)$ is known and one requires $x_b = g(y_b)$, upon rotating through the checkering angle $\beta$ then, $x_b = y_a \sin \beta + x_a \cos \beta$ $y_b = y_a \cos \beta - x_a \sin \beta$ where $x_a$, $y_a$ and $x_b$, $y_b$ are coordinate axes for generating line sets $a$ and $b$, respectively.

The dimensional units describing the generating lines can be in any convenient form, because a final transfer to incremental motor steps is performed in control computer 108. In the case of a point pattern, in which the borders are simply the outermost lines of the generating sets, it is particularly convenient to use the length of one side of a diamond as the unit, with the coordinate axes parallel to the generating line sets.

In FIG. 16, the coordinate axes are $i$ and $j$, intersecting at the origin. The end point of each line can now be located by specifying its $i$ and $j$ coordinates. For example, the labeled corner points are located in this frame of reference as follows:

| Point | "i" | "j" |
|---|---|---|
| a | −5 | −1 |
| b | −5 | +5 |
| c | +1 | +5 |
| d | +5 | +1 |
| e | +5 | −5 |
| f | −1 | −5 |

A simple computer program can transform points in this frame of reference to "real" $x$, $y$ axes, using the following relationships:

$x_a = i s$ $y_a = j\, s/\sin \beta + i\, s/\tan \beta$ where $i, j =$ integer coordinates of points expressed in units of diamonds $\beta =$ diamond angle $s =$ distance between checkering lines $x_a, y_a$ are rectilinear coordinate axes for one set of generating lines.

The $x, y$ points for the second set of lines $(x_b, y_b)$ can be determined similarly, or by use of the coordinate rotation expression previously discussed.

The cylindrical pattern can be developed and described in the same manner as the flat pattern, remembering that any flat pattern can be wrapped around any right cylinder. For operation of the machine, however, the $y$ axis of the pattern becomes a composite function of X, Y and $\Omega$ machine motions, as hereinbefore derived, these relationships being repeated here for convenience, but in more general form:

$X = Y/D$ $\Omega = kY \sqrt{1 + (1/D^2)}$ where $\Omega, X$ and $Y$ are machine axis coordinates $r =$ work-piece radius $D =$ diamond ratio.

The modifications to the flat or cylindrical patterns to allow for deviation from the ideal case can be based on known design contours, or measurement of actual complex surfaces. In either alternative, it is convenient to express the modifications as cubic functions of the Y machine axis advances of carriage 20, which is normally taken as the independent variable.

$dY/dt = a = V_y$ $x = b + cY + dY^2 + eY^3$ $(dX/dY)(dY/dT) = (c + 2dY + 3eY^2)a$ $dX/dt = c' + d'Y + e'Y^2$

Similarly, for an approximately cylindrical pattern $d\Omega/dt = g' + h'Y + i'Y^2$ Since, $dY/dt = a = V_y$ $dX/dt = V_y/D$, from eq. 5 supra.

Tool travels with respect to the vertical (Z) and tilt ($\alpha$) axes are, in all instances, servo controlled during actual cutting and the immediate approach thereto (i.e., during "tool down" operation), but are effected by preprogrammed control otherwise.

Curves of any required form can be reproduced very accurately by cubics, provided only that long complicated curves are segmented into an appropriate number of shorter, simpler curve segments.

The mathematical concept underlying cubic equation utilization for complex line representation was developed by Professor Steven A. Coons of the Massachusetts Institute of Technology (refer Electronics Systems Laboratory Memorandum MAC-M-253 for additional details).

The data presentation via control tape 105, is in the form of a sequence of information blocks, which can be, respectively, denoted "long" blocks and "short" blocks, depending upon the quantity of data incorporated in each.

Thus, each long block contains all of the information required for reconstruction of a cubic cut, or segment of a cut, in accordance with the following format:

Sequence No.

Number of cubic difference steps required to complete the cut or cut segment.

Third difference coefficient for first machine axis (X).

Second           ''

First           ''

Third difference coefficient for second machine axis ($\Omega$).

Second difference coefficient for second machine axis ($\Omega$).

First           ''

Third difference coefficient for third machine axis (Z).

Second           ''

First           ''

Third difference coefficient for fourth machine axis ($\alpha$).

Second           ''

First           ''

Third difference coefficient for fifth machine axis (Y).

Second           ''

First           ''

End of block character.

Programming practice is best suited to the iterative utilization of a common block of coding for each of the several axes in sequence, it being understood that where some axes, such as the third machine axis (Z) and the fourth machine axis ($\alpha$) have linear algorithms, the second and third difference coefficients for these axes are always carried at zero to insure the correct axis settings while still adhering to the standard computation format.

In distinction, each short block contains the same information as a long block, except that the third and second differences are omitted, i.e., the short block defines a straight line cut or cut segment. The Sequence Number is, however, set to zero to denote a short block.

Special purpose short blocks are identified by negative (dummy) sequence numbers, a convenient system being:

−2 directs tool up

−1 directs an index to a new cut

−3 directs tool down

−4 directs a change in one or more auxiliary functions.

As regards the −4 dummy sequence number, it will be understood that the indicia on tape 105, which would otherwise be difference coefficients, are special codes adapted to turn the auxiliary functions off (00), or on (01, e.g., air-on, 10 = alternate tool border cutter, 11 = alternate bed position).

Turning now to the programming per se, the control tape 105 preparation program can, typically, be of the format detailed in full as appendix pages A1–A22, inclusive. This specific program was prepared for a master computer 102, FIG. 13, consisting of a Univac 1108; however, a General Electric 4020, or the equivalent, is equally effective.

The program flow chart for the program of appendix pages A1–A22 is detailed in FIGS. 17A and 17B, the several operational blocks thereof being cross-indexed with the program by specific instruction numerals.

Similarly, a typical control computer 108 program, in this instance for a Digital Equipment Co. PDP-8 computer, is set out as appendix pages B1–B20, inclusive, and this is detailed in the flow chart commencing in FIG. 18A, running sequentially through FIGS. 18B, 18C and 18D. Again, specific blocks of the flow chart are cross-referenced to specific instructions in the program by designations adjacent each block.

Figure 18A:
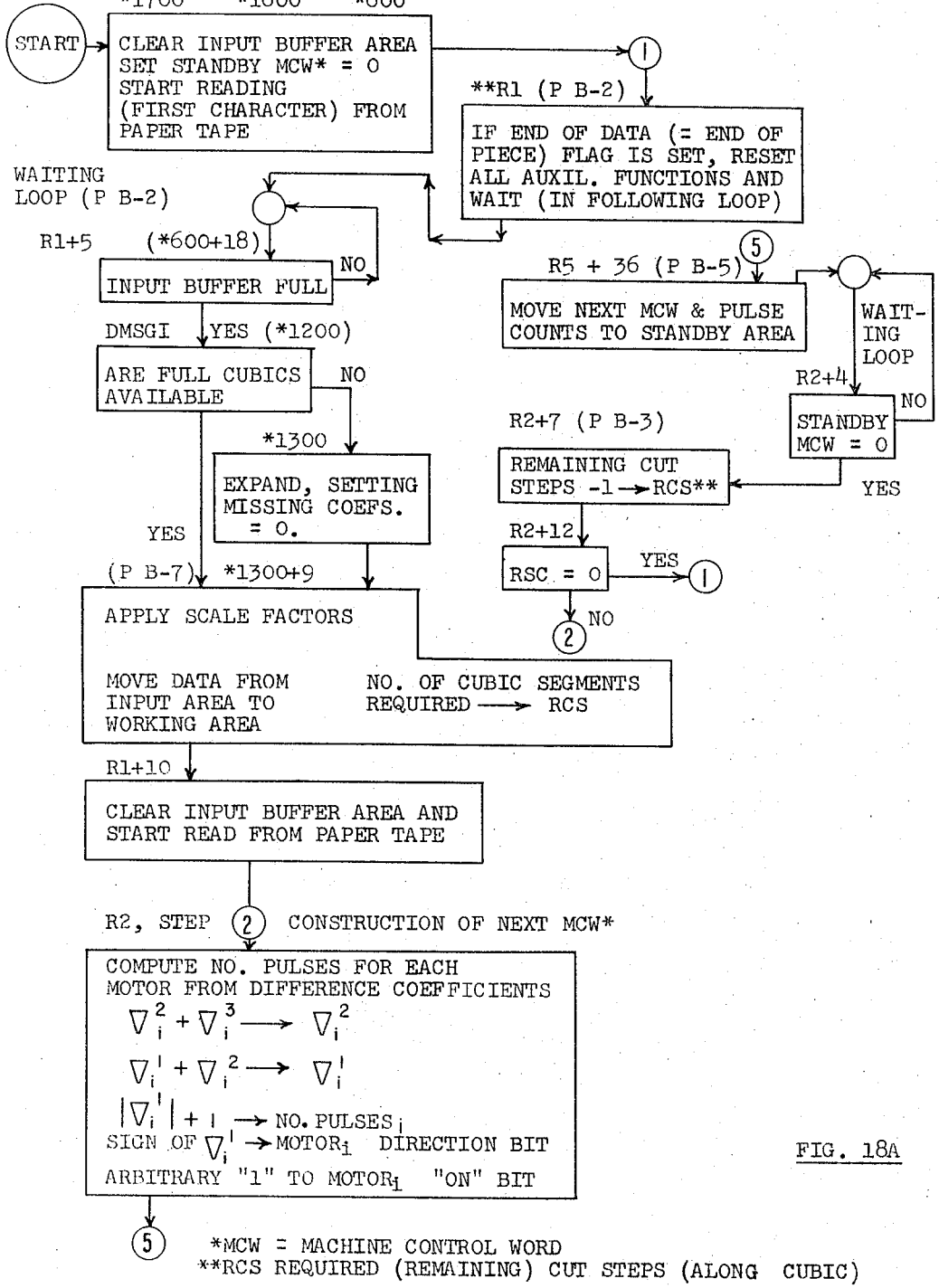
Figure 18B:
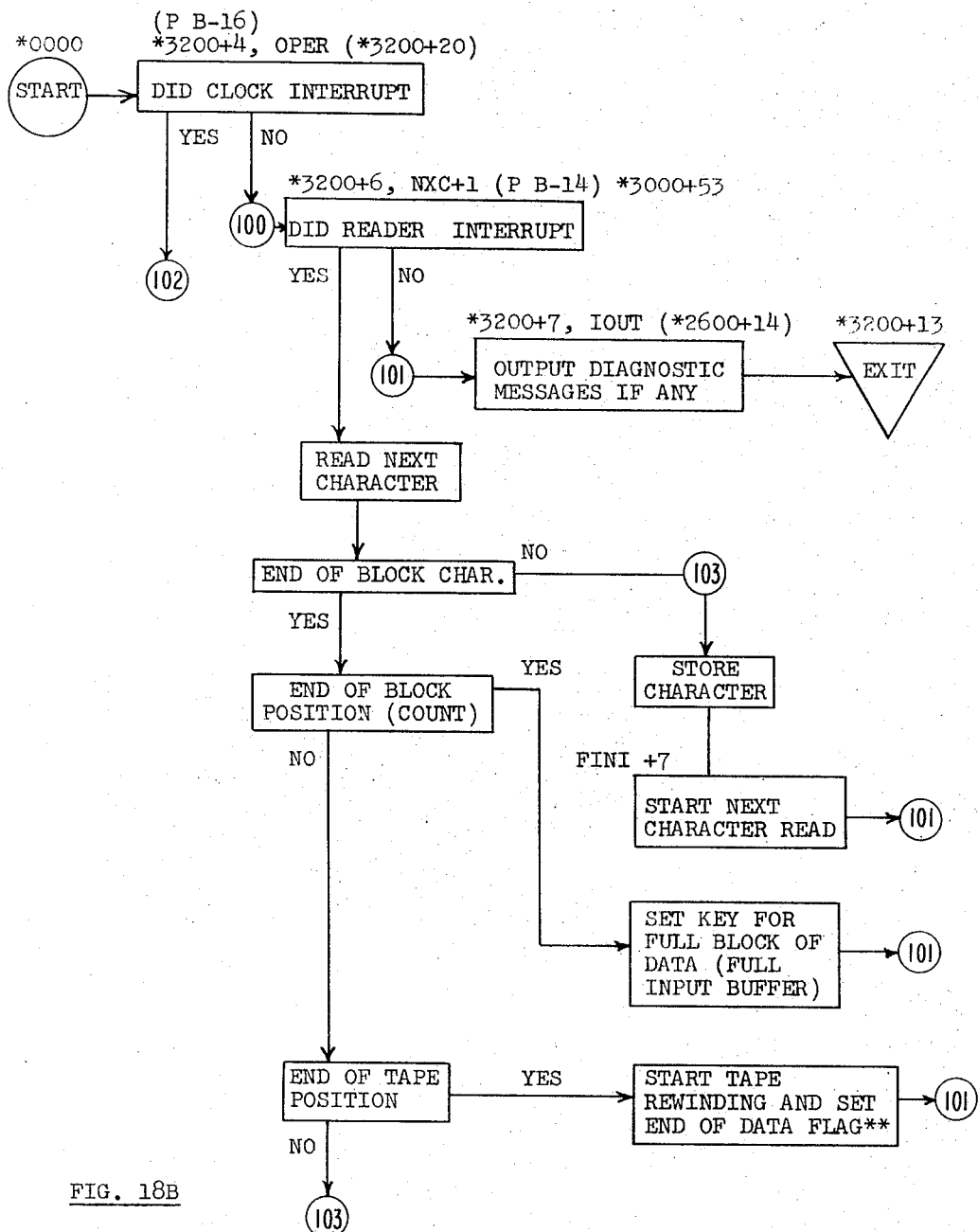

In this connection, a step along a cut consists of delivery to each drive motor a predetermined count of pulses (refer FIG. 18A, R2, STEP). This count is generally different for each drive motor and may be anything from zero to 100 or more. At the end of each time period, those motors having a positive remaining count each receive one pulse of proper sign, and the corresponding count is reduced by one, refer FIG. 18D, CNTDWN (*3200+38). The step is completed when all such counts have been reduced to zero, i.e., the number of active motors has been reduced to zero (refer FIG. 18D, CHK1).

The need to count the number of active motors at the start of the step, store this number, and later deliver it to the FOREGROUND PROGRAM storage can be avoided by the following algorithm, which makes use of the same program section which carries out the counting operations described supra.

1. Prior to starting the step, the absolute integer value of the first difference of position of each drive motor, plus an arbitrary 1, is stored as the count of pulses for that motor (refer FIG. 18A, R2 STEP).
2. At the start of the step, the number of active drive motors is set equal to the total number of drive motors, e.g., five (refer FIG. 18D, TF 2 + 4).
3. Without operating any drive motors, the individual counts are each reduced by one, thus cancelling the arbitrary addition of 1 supra. When any count equals zero, the number of active motors is reduced by one, thus correcting the number of active motors (refer FIG. 18D, TF 2 + 5, which exits to CNTDWN, same FIGURE).

Figure 18C:
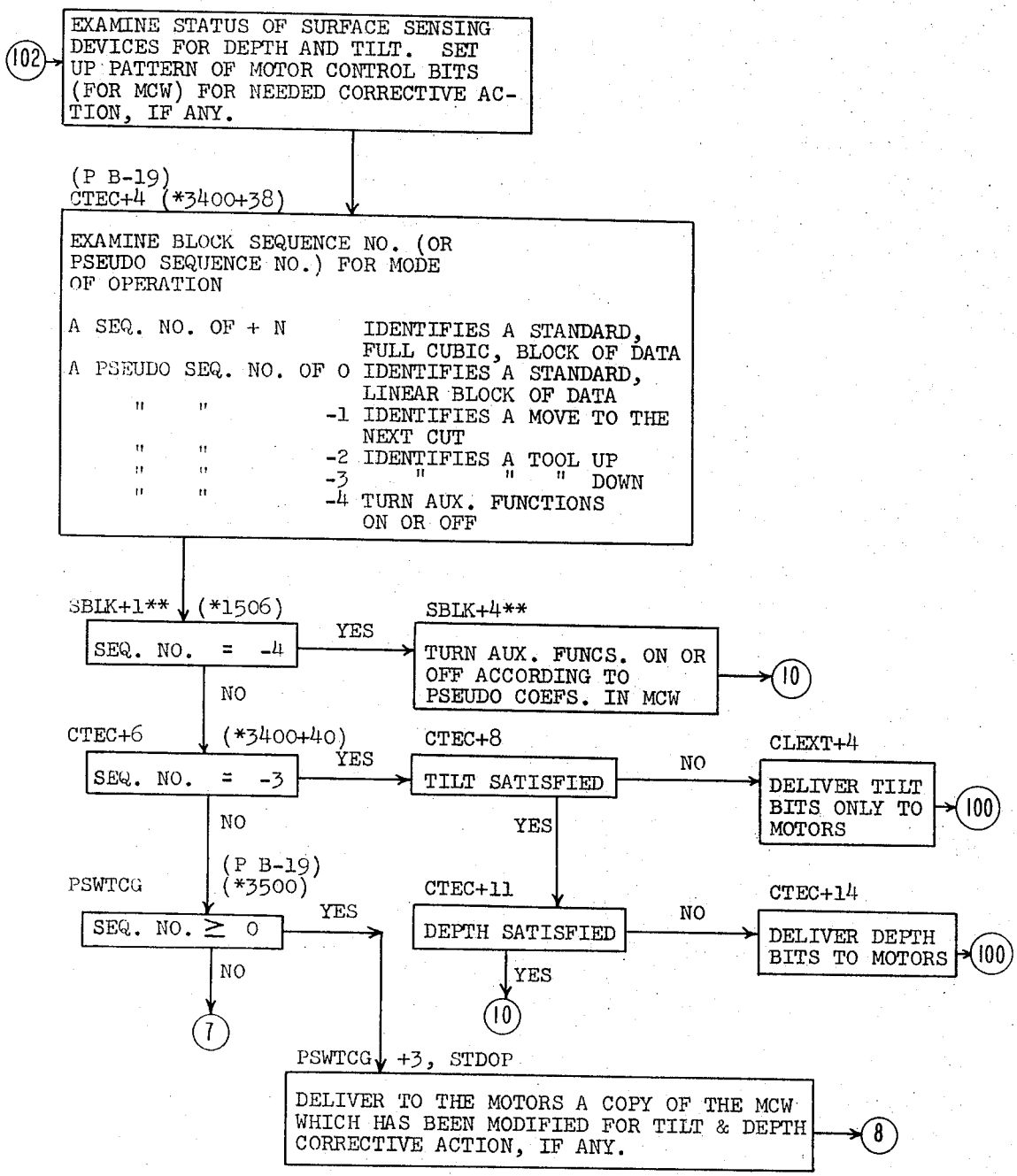
Figure 18D:
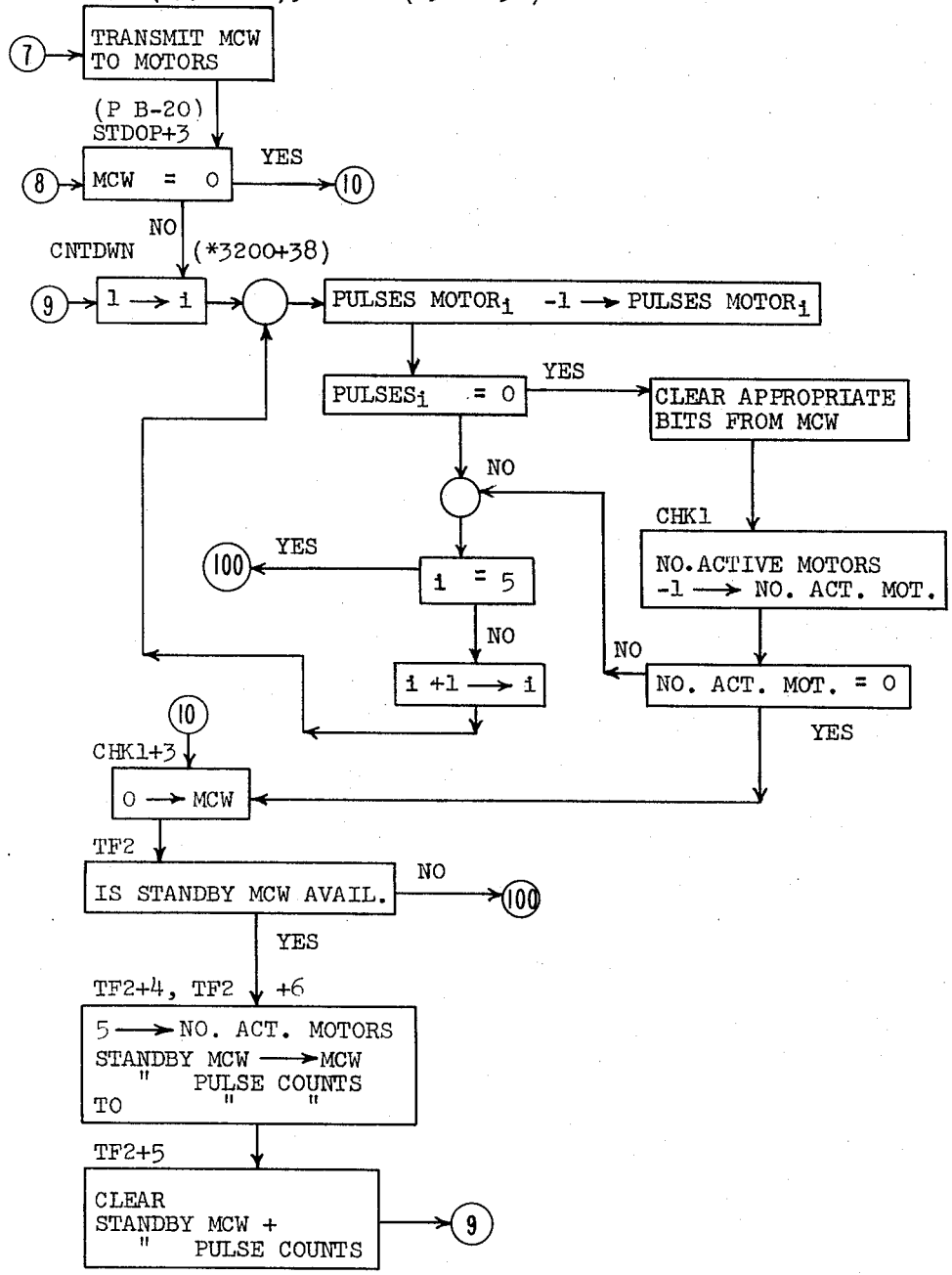

When starting to bring the tool down to the work surface (refer FIG. 18C, Seq. No. = −3), the tilt of the tool will initially be the tilt required at the end of the previous cut. This might differ from the required tilt by 60° or more. As a result of this initial error, and the relative speeds of the depth and tilt-establishing drives, it is possible to have an incorrect tool tilt when the proper depth is attained and, therefore, gouge the work piece. To prevent this, the following repetitive sequence is followed:

1. If there is a tilt error, supply to the drive motors one tilt pulse of the proper sign, and nothing more during this time period.
2. If there is no tilt error, and there is a negative depth error, indicating that the tool is too high, supply one positive depth pulse to the depth-establishing motor during this time period.
3. If there is no tilt error and the depth error is zero, or positive, the tool-down operation is complete.

After tool-down positioning is achieved, the control program will proceed to handle the next block of data from the control tape 105, which will cause the tool to advance along the work surface.

In the following Input Data Reduction Program, pages A1–A19, STRGL ("STRINGLENGTH") is used to denote CUT LENGTH as the latter term is employed in the comment cards.

```
C
C      NUMERICALLY CONTROLLED STOCK              PAGE A 1
       CHECKERING
C      INPUT DATA REDUCTION PROGRAM
C                   FORTRAN CODE
C
C      MAIN PROGRAM
       COMMON /PGP/NSECT,NARC,TAB(30,8,7)
       COMMON/SUM/SUMLGT
       COMMON/PATSP/F6
       COMMON/CUTSP/NCUT,STRLGT
       COMMON/P1/C1(5),C2(5),C3(5),C4(5)
       COMMON/ADJSTR/RWXMID,RWYMID,RWXSCL,RWYSCL,R2
       COMMON /END/ENDPT(5),XZERO(5)
       COMMON /END2/IEND
       COMMON/DPN/SLOPE(2,5),FVAL(5),HVAL(5),SLP(5),SL
       COMMON/CTM/SAVE(5),B(5),C(5),D(5),STO
       COMMON/MAIN/X(1000), Y(1000), STRGL(1000), ICRT, NOP,
     1 DTH(1000),TLT(1000),A(1000)
       COMMON /CUTN/ICUT,NU,NDIC,VEND(5)
       ICUT = 0
C      INITIALIZE STORAGE FOR ABSOLUTE POSITIONS
       KEY4 = 1
       SUMLGT = 0.0
C      PARAMETERS AND INITIAL VALUES TO BE ENTERED
C      ARE AS FOLLOWS
C       RWXMID, RWYMID=COORDINATES REPRESENTING PIVOT POINT
C      OF CARRIAGE PROJECTED ON TO PATTERN
C      RWXSCL,RWYSCL = SCALE FACTORS ( +1.0 OR −1.0 ONLY) TO
C      CONTROL GENERATION OF MIRROR IMAGE PATTERNS
C      R2 = RADIUS OF THE WORK PIECE, IF IT IS
C      A RIGHT CIRCULAR CYLINDER ROTATED ABOUT
C       ITS AXIS.
       READ(5,9123)RWXMID,RWYMID,RWXSCL,RWYSCL,R2
       WRITE(6,9122)
 9122  FORMAT('RAW X MID RAW Y MID XSCALE YSCALE',6X,
     1 10X,'R2')
       WRITE(6,9123)RWXMID,RWYMID,RWXSCL,RWYSCL,R2
 9123  FORMAT (6F10.5,10X,F10.5)
  923  FORMAT(70X,F10.5)
       READ(5,923) F6
       WRITE (6,923) F6
C      F6 = 1.0 IF THE WORK PIECE IS A CYLINDER AS ABOVE
C      F6 =2.0 IF PARAMETERS WILL BE READ DEFINING A
C      GENERAL THREE DIMENSIONAL SURFACE AS A PLURALITY OF
C      CROSS SECTIONS PERPENDICULAR TO THE AXIS OF ROTATION.
C      EACH SUCH CROSS SECTION BEING DEFINED AS A PLURALITY
C      OF CIRCULAR ARCS. THE SURFACE BETWEEN CROSS SECTIONS
C      IS TO BE INFERRED BY LINEAR INTERPOLATION (SEE
C      SUBROUTINE CONV).
```

```
C       NSECT=NO. OF CROSS SECTIONS
C       NARC=NO. OF CIRCULAR ARCS AT EACH SECTION + 1
C       TAB(I,J,K)=TABLE OF COEFICIENTS IN WHICH
C           I=THE SEQUENCE NO. OF THE SECTION
C           J=THE SEQUENCE NO. OF THE ARC
C              WITHIN THE I SECTION
C           K=THE PARAMETER NO.
C           K=1=DISTANCE OF SECTION (I) FROM THE
        ORIGIN.
C              MEASURED ALONG THE AXIS. (WILL BE
        EQUAL
C              FOR ALL ARCS WITHIN A SECTION)
C           K=2=RADIUS OF ARC(I,J)
C           K=3=XC COORDINATES OF CENTER OF
        ARC
C           K=4=ZC MEASURED SUCH THAT XC, ZC
        AND THE AXIS
C              OF ROTATION ARE MUTUALLY
        PERPENDICULAR
C           K=5= MINIMUM PATTERN X, WHICH LIES
C              ON THIS ARC,-USUALLY
C                                                       PAGE A 2
C              CORRESPONDS WITH A POINT OF
C              TANGENCY
C           K=6= MINIMUM PROJECTED X
        CORRESPONDS TO X IN 5
C           K=7= Z CORRESPONDING TO X IN 5 AND 6
C       BY PROJECTED X IS MEANT A DISTANCE MEASURED PARALLEL
C       TO THE X AXIS.
C       BY PATTERN X, IS MEANT A DISTANCE MEASURED ALONG THE
C       CURVED SURFACE OF THE WORK PIECE, AWAY FROM THE POINT
C       AT WHICH THE PROJECTED X=0
C       THE VALUES FOR K=5,6, AND 7, THO NOT NECESSARY,
C       ARE CARRIED TO SIMPLIFY THE PROGRAM, EG, IT IS NOT
C       NECESSARY TO (AGAIN) SOLVE FOR THE INTERSECTION (OR
C       POINT OF TANGENCY) OF SUCCESSIVE ARCS TO DETERMINE
C       WHICH ARC A POINT ON THE SURFACE SHOULD APPEAR UPON.
C       AFTER THE LAST REAL ARC IN EACH SECTION THERE WILL BE
C       ONE FICTITIOUS ARC. THE ONLY SIGNIFICANT VALUE FOR
C       THIS ARC WILL BE FOR K=5, WHICH WILL INDICATE AN UPPER
C       BOUND ON THE EXTENT OF THE PATTERN (PATTERN X)
        IF (F6 .LT. 1.5) GO TO 1902
        READ(5,1901) NSECT,NARC
        WRITE(6,1901) NSECT,NARC
   1901 FORMAT (4I5)
        READ (5,1900)(((TAB(I,J,K),K=1,7),J=1,NARC),I=1,NSECT)
        WRITE(6,1903)(((TAB(I,J,K),K=1,7),J=1,NARC),I=1,NSECT)
   1903 FORMAT (7F15.7)
   1900 FORMAT (7F10.5)
   1902 CONTINUE
C       ENDPT(I), I = 1,5 REPRESENTS THE ASSUMED STARTING PT
C       STORED AS THE END POINT, OF A FICTITIOUS
C       PREVIOUS CUT.
        READ (5,900) (ENDPT(I),I=1,5)
        CALL CONV(ENDPT(1),ENDPT(2),ENDPT(3),ENDPT(5))
        WRITE(6,900) (ENDPT(I),I=1,5)
        DO 17 I = 1,5
        C1(I) = ENDPT(I)
     17 XZERO(I) = ENDPT(I)
C       THE DATA DESCRIBING THE POINTS ALONG
C       A CUT ARE READ, IN SUBROUTINE CRIT, AS
C       X(I),Y(I) = PLANE COORDINATES
C       DTH(I),TLT(I),A(I)=TOOL DEPTH,TILT,AND PIECE ROTATION
C       ANGLE. THESE ARE ALWAYS ZERO EXCEPT WHEN A SPECIAL
C       RUN IS BEING MADE TO GENERATE ARBITRARY (FEED FORWARD)
C       MOTIONS FOR USE IN INITIAL POSITIONING, CLEARING
C       OBSTRUCTIONS, ETC.
C       NOTE — SUBROUTINE COONS, GENERATES — DEPTH
C       MOTION (TOOL — UP) BETWEEN CUTS. SUBROUTINE
C       CONV GENERATES PIECE ROTATION ANGLES, WHEN
C       PIECE ROTATION IS TO BE EMPLOYED (SEE PARAMETERS R2 AN
C     1 D F6 ABOVE)
    900 FORMAT (8F10.5)
        I = 80
        II = 0
        WRITE(7,32) (I,K=1,34),II,II
     32 FORMAT (34I2,2I1)
     30 DO 16 I= 1,5
     16 SAVE(I) =0.0
    955 FORMAT (100X,11HCUT NUMBER ,I5)
        IQ = 0
     11 CALL CRIT(IQ,IEND)
C       TEST FOR END OF ALL DATA
        IF (IEND .EQ. 1) GO TO 10
        NPSAVE = NOP
        NCRIT = ICRT
        NSUM = 0
C                                                       PAGE A 3
        IF (KEY4 .EQ. 2) WRITE(6,950) IQ,ICRT,NOP
    950 FORMAT(10X,3HIQ=,I2,5X,5HICRT=,I2,5X,4-
        HNOP=,I4)
     70 IF (ICRT .NE. -1) GO TO 71
        SLS = STRGL(NOP)
        NPOLD = NOP
        NOP = NPSAVE — NSUM
        NB = NOP + 1
        DO 72 I = 1,NB
```

```
           X(I) = X(NPOLD+I-1)
           Y(I) = Y(NPOLD+I-1)
           A(I) = A(NPOLD+I-1)
           DTH(I) = DTH(NPOLD+I-1)
           TLT(I) = TLT(NPOLD+I-1)
        72 STRGL(I) = STRGL(NPOLD+I-1) - SLS
        71 CONTINUE
        81 NSS = NSUM + NOP
           IF (NSS .EQ. NPSAVE) ICRT = NCRIT
C          COMPUTE RATE OF CHANGE OF EACH
           VARIABLE WITH RESPECT
C           TO CUT LENGTH, AT EACH END OF CUT OR
           CUT SEGMENT
           CALL PANDS1(IQ)
           KOUNT = 0
        90 CONTINUE
           IF(KEY4 .EQ. 1) GO TO 753
           WRITE(6,952) HVAL
           WRITE(6,953) ((SLOPE(I,J),J=1,5),I=1,2)
       753 CONTINUE
       951 FORMAT(5X,4HFVAL,11X,6E16.8)
       952 FORMAT(5X,4HHVAL,11X,6E16.8)
       953 FORMAT (5X,5HSLOPE,10X,5E16.8)
       954 FORMAT(5X,4HSTO=,E12.6)
C
C          COMPUTE NORMAL CUBIC COEFFICIENTS
           DO 14 I = 1,5
           B(I) = SLOPE(1,I)
           D(I) =
           (100.*(SLOPE(1,I)+SLOPE(2,I))-2.*HVAL(I))/
         1 1000000.
           C(I) = (HVAL(I)
           -100.*SLOPE(1,I)-1000000.*D(I))/10000.
           IF(ABS(C(I)).GT. 0.00000001 .OR. ABS(D(I)) .GT.
         1 0.0000000001) GO TO 14
           C(I) = 0.0
           D(I) = 0.0
        14 CONTINUE
           WRITE (6,902)
           WRITE (6,903) B
           WRITE (6,903) C
           WRITE (6,903) D
       902 FORMAT (10X,11HNORMAL COEF)
       903 FORMAT (10X,5E16.8)
           CALL ERRCHK
           IF (ICRT .EQ. 6) GO TO 81
           SL = STRGL(NOP)
           DO 40 I=1,5
        40 SLP(I) = SLOPE(2,I)
C
           CALL COONS(IQ)
C          TEST FOR END OF ALL DATA(SEE ALSO 11+1)
           IF (IFND .EQ. 1 ) GO TO 10
           IF (ICRT .EQ. 6) GO TO 30
           IF (ICRT .EQ. 0) GO TO 30
           IQ = 1
           NSUM = NSUM + NOP - 1
           IF (ICRT .EQ. -1) GO TO 70
           GO TO 11
        10 CALL PLOT(0.,0.,-3)
C                                              PAGE A 4
           WRITE(6,956) ICUT
       956 FORMAT(12H CUT NUMBER ,I3,15H IS
           NONEXISTENT)
           I = 128
           DO 957 K = 1,80
           CALL PC3(I)
       957 CONTINUE
           END

C
C
           SUBROUTINE CONV (X2,Y2,Z,A4)
           COMMON /PGP/NSECT,NARC,TAB(30,8,7)
           COMMON/CUTSP/NCUT,STRLGT
           COMMON/PATSP/F6
           COMMON/ADJSTR/RWXMID,RWYMID,RWXSCL,-
           RWYSCL,R2
           COMMON/CHECK/ IND,POSIT,KTOOL
C          THIS SUBROUTINE MAKES ANY NECESSARY
C          CONVERSIONS OF THE INTERMEDIATE DATA
C
C          A SIMPLE CONVERSION MIGHT BE
C          MINOR IMAGING THROUGH USE OF A
C          NEGATIVE SCALE FACTOR FOR
C          X AND Y (SEE STATEMENT 30)
C
C          GENERALLY MANDATORY CONV.
C          OPERATION IS CONVERSION
C          FROM MEASURED X,Y TO MACHINE X,Y
C
C          ADJUST ZERO OF RAW DATA TO
C          CENTER PATTERN RELATIVE TO PIVOT POINT
C          POSIT INDICATES WHETHER THE CARRIAGE IS TURNED
C          +1/2 THE CHECKERING ANGLE OR
```

```
C        -1/2 THE CHECKERING ANGLE AWAY
C        FROM BEING PARALLEL TO THE Y MOTION AXIS
C        AIND IS POSIT CORRECTED BACK TO
C        WHAT IT WAS BEFORE ADJUSTMENT FOR
C        MIRROR IMAGING
         AIND = POSIT * RWXSCL * RWYSCL
         IF (KSW .EQ. 2 ) GO TO 2
         KSW = 2
C        INITIAL POSITION (AT REST) IS CCW
         POSIT = 1.
         AIND = POSIT
         ANGLE = ATAN2(1.0,3.2)*2.0
         AN = ANGLE/2.0
         CA = COS(AN)
         SA = SIN(AN)
         TA = TAN(AN)
       2 CONTINUE
         X2 = X2 -RWXMID*CA + RWYMID*SA*AIND
         Y2 = Y2 -RWYMID*CA - RWXMID*SA*AIND
C        REVERSE DATA AXIS NOTATION TO AGREE WITH
C          MACHINE MOTION NOTATION
         WS = X2
         X2 = Y2
         Y2 = WS
C         F6 .GT. 0.5 DESIGNATES SPECIAL CASE
C         F6 .GT. 0.5 BUT .LT. 1.5 DESIGNATES RIGHT CIRCULAR
C        CYLINDER
C         F6 .GT. 1.5 DESIGNATES GENERALIZED SURFACE
         TREATED AS
C        SECTORS OF SECTIONS OF CONES
         IF (F6 .LT. 0.5) RETURN
C
C                                                PAGE A 5
C                         +-4      (D  EG   RE  ES)
C
C                            /
C                           /
C                          /
C         +X4 .                                    +Y4 (IN)
C                        /
C                       /
C                      /
C                            (  0.  0.    0)
C                     /
C
C        NOTE X4 IS LOCKED TO Y4 BY DIAMOND ANGLE/2.
C        IF THE PIECE IS A CYLINDER WHICH USES PIECE
C        ROTATION IN PLACE OF THE NORMAL X
C        CONVERT TO MACHINE AXES
C        GIVEN Y3 = DISTANCE ALONG PATTERN
C            X3 = DISTANCE AWAY FROM CENTER LINE OF PATTERN
C        CALCULATE NECESSARY PIECE ROTATION
C            TO REACH X3
C
C        NOTE. FOR X  = +1.0
C              AND R = 1.0
C                TH  = +180./PI DEGREES
C        IE SIGN OF TH AGREES WITH SIGN OF X
C
         IF (POSIT.EQ. 0.0) POSIT = 1.0
C        IF POSIT IS CLOCKWISE , POSIT IS -1.0(ELSE + 1.0)
         SAW=SA * AIND
C        CONVERT TO DIMENSIONS ALONG ROLL & AROUND
         ROLL
         X3 = X2*CA-Y2*SAW
         Y3 = Y2*CA+X2*SAW
         IF (F6 .GT. 1.5) GO TO 1999
C        THE FOLLOWING PERTAINS TO A RIGHT CIRCULAR
         CYLINDER
C        OF DIAMETER R2 WHOSE AXIS IS PARALLEL TO THE AXIS
         OF
C        ROTATION BUT BELOW IT BY THE DISTANCE CZ
         CZ = 0.
C        CONVERT TO MACHINE AXES
C        RTHETA = X3
         Y4 = Y3*CA
         X4 = Y4 * TA * POSIT
         X5 = R2 * SIN(X3/R2)
         Z5 = R2 * COS(X3/R2) - CZ
         A4 = ATAN2(X5,Z5)*180.0 / 3.1415926
         R = SQRT(X5*X5+Z5*Z5)
         IF(K2 .GT. 20) GO TO 3
         WRITE(6,908)X2,Y2,X3,Y3,R,X5,Z5,X4,Y4,A4,POSIT,SAW
     908 FORMAT (12F10.5)
         K2 = K2 + 1
       3 CONTINUE
         X2 = X4
         Y2 = Y4
         GO TO 30
C
    1999 CONTINUE
C        A MORE COMPLICATED CONVERSION FOR
C        PIECE ROTATION IS ONE IN WHICH
C        A = 17.35 DEGREES = HALF THE CHECKERING ANGLE
C        MACH. Y = MEASURED X *COS(A)
```

```
C       MACH. X = MEASURED Y *SIN(A) = MACH Y*TAN(A)
C       PIECE ROTATION = F(RADII OF WOOD)
C       AND
C       PAGE A 6
C       RADII OF WOOD = F(MEASURED X AND Y)
C
C       THIS LATTER CONV IS
C       ACTIVATED BY SETTING
C       F6 = 2.0 (IE .GT. 0.5)
C       GIVEN Y, SEARCH TABLE AND INTERPOLATE WORKING
        VALUES
C       TABLE INDICES ARE SECTION, ARC, AND ARGUMENT
C       SECTION = WHICH DISTANCE ALONG AXIS OF ROTATION
C       ARC = WHICH ARC
C       ARGU-   1 =    DISTANCE ALONG AXIS OF ROTATION
        MENT
C               2 =    RADIUS
C               3 =    X THIS CENTER-X CENTER OF ROTATION
C               4 =    Z THIS CENTER-Z CENTER OF ROTATION
C               5 =    MINIMUM PATTERN X, WHICH LIES
C                      ON THIS ARC,-USUALLY
C                      CORRESPONDS WITH A POINT OF
C                      TANGENCY WITH ANOTHER ARC
C               6 =    MIN PROJECTED X CORRESPONDING TO X IN 5
C               7 =    Z CORRESPONDING TO X IN 5 AND 6
C       SEE ALSO DESCRIPTION IN MAIN PROGRAM
        X = X3
        Y = Y3
        DO 10 I = 1,NSECT
        IF (Y .LT. TAB(I,1,1)) GO TO 12
     10 CONTINUE
        KERR = 1
        GO TO 899
     12 J = I - 1
        XMNDLD = -999.
        DY1 = Y-TAB(J,1,)
        DY2 = TAB(I,1,1)-Y
        DY3 = TAB(I,1,1)-TAB(J,1,1)
        DO 20 K = 1,NARC
        XMIND = (TAB(I,K,5) *DY1+TAB(J,K,5)*DY2)/DY3
        IF(X .LT. XMIND) GO TO 22
        XMNDLD = XMIND
     20 CONTINUE
        KERR = 2
        GO TO 899
     22 K = K-1
        IF (K .LT. 1) KERR = 3
        IF (K .LT. 1) GO TO 899
        R =(TAB(J,K,2)*DY2+TAB(I,K,2)*DY1)/DY3
        XC = (TAB(J,K,3)*DY2+TAB(I,K,3)*DY1)/DY3
        ZC = (TAB(J,K,4)*DY2+TAB(I,K,4)*DY1)/DY3
        XMIN = (TAB(I,K,6)*DY1+TAB(J,K,6)*DY2)/DY3
        ZMIN = (TAB(I,K,7)*DY1+TAB(J,K,7)*DY2)/DY3
        GAM2 = (X - XMNDLD)/R
        IF (GAM2 .LT. 0.0) KERR = 4
        IF (GAM2 .LT. -.01) GO TO 899
        IF (GAM2 .LT. -.001) WRITE(6,906)
    906 FORMAT ( ' * * * * SLIGHT MISS OF TANGENT POINT ' )
        GAM3 = ATAN2(ZMIN-ZC, XMIN-XC)
        GAM1 = GAM3 - GAM2
        XCY = R*COS(GAM1)+XC
        ZCY = R*SIN(GAM1)+ZC
        GAM = ATAN2(XCY,ZCY)
        YCY = Y*CA
        Y2 = YCY
        X2 = YCY*TA*AIND
        A4 = GAM*180./3.1415926
        IF (K2 .GT. 20 ) GO TO 30
        K2 = K2 + 1
    899 CONTINUE
C                                                    PAGE A 7
        WRITE(6,900) I,J,K,KERR
        WRITE(6,901) Y,X,YCY,XMNDLD
        WRITE (6,902) DY1,DY2,DY3,XMIN
        WRITE (6,903) R,XC,ZC,ZMIN
        WRITE (6,904) GAM2,GAM3,GAM1
        WRITE (6,905) XCY,ZCY,GAM,YCY,A4
    900 FORMAT (6H    I=,I5,5H J=,I5,5H K=,I5,6H KERR=,I5)
    901 FORMAT (5H    Y=,F10.5,5H x=,F10.5,5H YCY=,F10.5,7H X
       1 MNDLD,F10.5)
    902 FORMAT (5H DY1=,F10.5,5H DY2=,F10.5,5H DY3=,F10.5,7H
        X
       1 MIN= ,F10.5)
    903 FORMAT (5H R=,F10.5,5H XC=,F10.5,5H ZC=,F10.5,6H Z
       1 MIN=,F10.5)
    904 FORMAT (6H GAM2=,F10.5,6H GAM3=,F10.5,6H
       1 GAM1=,F10.5)
    905 FORMAT (5H XCY=,F10.5,5H ZCY =,F10.55H GAM=,F10.5,5H
        Y
       1 CY=,F10.5,5H A4=,F10.5)
        IF(KERR .GT. 0 ) STOP
     30 CONTINUE
C       SCALE VARIABLES
C       NOTE POSSIBLE SCALES ARE 1. AND -1. ONLY
        X2 = X2 / RWYSCL
        Y2 = Y2 / RWXSCL
        A4 = A4 / RWYSCL
        RETURN
        END
```

```
C      SUBROUTINE COONS(IQ)
       COMMON/SUM/SUMLGT
       COMMON/PATSP/F6
       COMMON/ADJSTR/RWXMID,RWYMID,RWXSCL,-
       RWYSCL,R2
       COMMON/COMSCL/SAVSCL
       COMMON /END/ENDPT(5),XZERO(5)
       COMMON/DPN/SLOPE(2,5),FVAL(5),HVAL(5),SLP(5),SL
       COMMON/FACTRS/SCALE(6)
C      NDIC = 1 FOR SIMPLE (LINEAR) BLOCK
C      NDIC = 2 FOR FULL CUBIC BLOCK
       COMMON/CTM/ SAVE(5),B(5),C(5),D(5),STO
       DIMENSION F(3)
       DATA (F(I),I=1,3)/65536.,4096.,256./
       DIMENSION BZ(5)
       COMMON/CHECK/ IND,POSIT,KTOOL
       COMMON/P1                                    C1(5),C2(5),C3(t),C4(5)
       COMMON/MAIN/X(1000), Y(1000), STRGL(1000), ICRT,
       NOP,
     1 DTH(1000),TLT(1000),A(1000)
       COMMON/CUTN/ICUT,NU,NDIC,VEND(5)
       COMMON /END2/IEND
       KSW = 1
       KEY4 = 2
       NU = 100
       IF(IQ.NE.0)GO TO 105
C      PICK UP TOOL & MOVE TO NEW LOCATION
       KUPDN = 0
       IF(KTOOL .EQ. 1) KUPDN = 1
       IF(ABS(SAVE(1)-C1(1)).GT. 0.0005 .OR.
     1 ABS(SAVE(2)-ENDPT(2)).GT. 0.0005 .OR.
     3 ABS(SAVE(5)-ENDPT(5)) .GT. 0.04       ) KUPDN = 1
       NU = 8
       DO 100 I=1,5
       C3(I) = 0
       C4(I) = 0
   100 C2(I) = 0
C      SET FOR SIMPLIFIED OUTPUT
       NDIC = 1
C                                                  PAGE A 8
       C2(3) = -.016
       IF (F6 .LT. 0.5) C2(3) = -0.04
C      SET FOR TOOL UP
       ISAV=ICUT
       ICUT=-2
       NU = 8
       IF(KUPDN.EQ. 1) CALL PC
       ISAV=ISAV+1
       IF(ISAV .GT. 65) ISAV = 1
C      SET FOR MOVE TO BEGINNING OF THE NEW CUT
       ICUT=-1
       DO 101 I=1,5
       ENDPT(I) = C1(I)
   101 C2(I) = (SAVE(I) — ENDPT(I))/8.0
   705 CONTINUE
       IF(KEY4 .EQ. 1) GO TO 753
       WRITE (6,907)(ENDPT(I),I=1,5)
       WRITE(6,908)(SAVE(I),I=1,5)
   907 FORMAT (' FROM '5F10.5)
   908 FORMAT (' TO '5F10.5)
   753 CONTINUE
       NU = 8
       CALL PC
C      BACK CALCULATION
       DO 712 I=1,5
       WSNU = NU
       WS = 8. * C2(I) * WSNU
   712 SAVE(I) = C1(I) + WS
       WRITE(6,908) (SAVE(I),I=1,5)
       DO 102 I = 1,5
   102 C2(I) = 0
C      CUT NO 900 SIGNIFIES THE END OF ALL DATA
       IF(NCUT .NE. 900) GO TO 758
C      IF CUT NO = 900, OUTPUT A DUMMMY BLOCK AND
C      WIND UP THE RUN.
C      NOTE THAT THE MOVE TO THE FIRST PCINT
C      OF CUT NO 900 HAS JUST BEEN GENERATED.
       NU = 8
       ICUT = -1
C      WRITE A DUMMY BLOCK
       CALL PC
       DO 714 I = 1,5
   714 C1(I) = SAVE(I)
       GO TO 16
   758 CONTINUE
C      SET FOR TOOL DOWN
C      THIS IS A DUMMY DIMENSION
       C2(3) = 0.006
       ICUT=-3
       NU = 8
       IT(KUPDN.EQ. 1) CALL PC
       ICUT=ISAV
   105 CONTINUE
C      COULD DO THIS EVERY TIME
       IF (ICRT .NE. 0) GO TO 108
       DO 107 I = 1,5
```

```
   107 ENDPT(I) = VEND(I)
   910 FORMAT (' NEXT '5F10.5)
   108 CONTINUE
C
C      INITIALIZE ABSOLUTE POSITIONS
C
       DO 10 I = 1,5
    10 C1(I)=SAVE(I)
C                                                          PAGE A 9
C
       GO TO 756
    16 CONTINUE
       IEND = 1
       DO 757 I = 1,5
   757 ENDPT(I) = XZERO(I)
   914 FORMAT('TOTAL CUT LENGTH IS 'F10.3)
       WRITE(6,914)SUMLGT
       ICRT = 0
       RETURN
   756 CONTINUE
C
C      COMPUTE COONS CUBIC COEFFICIENTS
C
   912 FORMAT(7H SLOPE    5E12.4)
   911 FORMAT(7H ORIG     5E12.4)
       IF(NOP .NF. 2 .OR.   STRGL(2) .LT. 0.2) GO TO 1701
       DO 1700 I = 1,5
       C(I) = 0.
       D(I) = 0.
       B(I) = HVAL(I)/100.
       SLOPE(1,I) = B(I)
       SLOPE(2,I) = B(I)
  1700 CONTINUE
  1701 CONTINUE
       NU = 100
       DO 11 I = 1,5
       BZ(I) = B(I)
       C2(I)=B(I)-C(I)+D(I)
       C3(I)=2.*C(I)-6.*D(I)
    11 C4(I)=6.*D(I)
C
C      B(I), C(I) AMD D(I) ARE THE NORMAL CUBIC
       COEFFICIENTS
C   1  FOR
C         1      X
C         2      Y
C         3      DEPTH
C         4      TILT
C         5      PIECE ROTATION ANGLE
C
       IF(KEY4 .EQ. 1) GO TO 754
       WRITE(6,901) C2
   901 FORMAT (10H COONS CO ,5E16.8)
       WRITE(6,900)NU,C3
       WRITE(6,900)NU,C4
   900 FORMAT( 3H NU,I7,5E16.8)
   754 CONTINUE
C      MOVE PLOT PEN TO FIRST POINT OF NEW CUT
       IF (IQ .NE. 0) GO TO 60
       IZ = 0
       CALL
       VECT(SAVE(1),SAVE(2),SAVE(5),SAVE(3),SAVE(4),KSW,
C   1  IZ)
       IZ = 1
    60 CONTINUE
C      SET FOR STANDARD OUTPUT
       NDIC = 2
       NU = 100
C      EXAMINE MAX SLOPE*FACTOR AND ADJUST NUMBER OF
       STEPS
C      IF NECESSARY
       CMAX = 0.0
       DO 20 I = 1,5
       DO 19 J = 1,2
       WS=ABS(SLOPE(J,I)*SCALE(I))
       IF(WS .GT. CMAX)CMAX =WS
C                                                          PAGE A10
    19 CONTINUE
    20 CONTINUE
       IF(KEY4.EQ.2)WRITE(6,903)CMAX
   903 FORMAT('IN COONS CMAX= ',F15.2)
       IF(ABS(C2(5))*SCALE(5) .LT. 1.0) GO TO 800
       NU = ABS(100.0 * C2(5) * SCALE(5) )
   800 AU = NU/8
       NU = AU*8
       NU = MIN(NU,225*8)
       CMAXRV = CMAX*100./FLOAT(NU)
  9093 FORMAT   (14H SL,NU,CMAXRV  ,F10.5,I5,3F10.5)
       CMAX = CMAXRV
       IF(NU.GT. 127*8) GO TO 23
    27 WS=NU
       WUI=100.0/WS
       AU = NU
       DO 22 I = 1,5
       B(I) = BZ(I)*WUI
       IF(ABS(SLOPE(1,I)).LT.0.0000000001 .AND.
```

```
    1  ABS(SLOPE(2,I)).LT.0.0000000001) GO TO 21
       IF(ABS((SLOPE(1,I)-SLOPE(2,I))/AMAX1(ABS(SLOPE(1,I)),
    1  ABS(SLOPE(2,I)))) .LT. 0.1)GO TO 21
       D(I) = (AU*WUI*(SLOPE(1,I)+SLOPE(2,I))-2.*HVAL(I))/
    1  AU**3
       C(I)=(HVAL(I)-AU*WUI*SLOPE(1,I)-AU**3*D(I))/AU**2
       GO TO 22
   21  B(I)=HVAL(I)/AU
       C(I) = 0.
       D(I) = 0.0
   22  CONTINUE
C      RECOMPUTE COONS CCEF
       DO 26 I=1,5
       C2(I)=B(I)-C(I)+D(I)
       C3(I)=2.*C(I)-6.*D(I)
   26  C4(I)=6.*D(I)
   28  DO 29 I = 1,5
       IF(ABS(C4(I))SCALE(I).GT. 0.49998) GO TO 30
       IF(ABS(C3(I))*SCALE(I).GT. 7.99985) GO TO 30
       IF(ABS(C2(I))*SCALE(I) .GT. 7.99985) GO TO 30
       AN = NU
       IF(ABS(SCALE(I)*(C3(I)+AN*C4(I))) .GT. 100.0) GO TO 30
       ANM = 1.
       IF (ABS(C4(I)) .LT. 10.**-8) GO TO 129
       IF (2 .EQ. 3) C4(I) = 5.0
       ANM = - C3(I)/C4(I) - 0.5
       IF (ANM .GT. AN) ANM = AN
       IF (ANM .LT. 0.0) ANM = 0.
  129  CONTINUE
       IF (ABS(C2(I) + ANM*C3(I) + 0.5*(ANM+1.)*ANM*C4(I))*
    1  SCALE(I) .GT. 127.9) GO TO 30
   29  CONTINUE
       IF (KEY4 .EQ. 1 ) GO TO 25
       WRITE(6,901)C2
       WRITE(6,900)ICUT,C3
       WRITE(6,900)NU,C4
       GO TO 25
   30  CONTINUE
  930  FORMAT (18H STEPS INCREASED    )
       IF(NU .GT. 245*8) STOP
       AN = NU
       NU = MIN(NU+32,NU*2)
       GO TO 707
   23  IF(CMAX .GT. 127.996/16.*255./100.*8.) GO TO 710
       IF(CMAX .GT. 127.996/16.*8.) GO TO 708
C
       IF(CMAX .GT. 7.*8.) GO TO 707
C      MAX PERMIS STEPS = (O)377 BUT NOT(O)200(=128)
  707  IF(NU .EQ. 128*8)NU=NU+8
       GO TO 27
  708  NU = 255*8
       WRITE(6,709) CMAX,NU
       GO TO 27
  709  FORMAT (' CMAX WAS =',F10.5' NU SET =',I5)
  710  WRITE(6,711)
  711  FORMAT (' XSIVE CMAX =')
       STOP
C      CALC SPACING FOR PLOTTING POINTS
   25  LMD = NU/NOP
       LM = LMD
       NUSAV=NU
       CALL PC
       WRITE(6,902) J,C1(1),C1(2),C1(3),C1(4),C1(5)
C      DATA GENERATION FROM COONS ADDITION LOOP
       NU=NUSAV
       DO 12 J=1,NU
       DO 13 I=1,5
       C3(I)=C3(I)+C4(I)
       C2(I)=C2(I)+C3(I)
   13  C1(I)=C1(I)+C2(I)
C      C2(I) = INCREMENTAL CHANGE
   70  CONTINUE
   71  CONTINUE
C      TEST FOR PLOT POINT
       IF(J .EQ. NU) GO TO 72
       IF (J .LT. LM) GO TO 12
       LM=LM+LMD
   72  CONTINUE
       WRITE(6,902) J,C1(1),C1(2),C1(3),C1(4),C1(5)
  755  CONTINUE
  902  FORMAT (1X,I6,6(3X,E16.8))
       CALL VECT(C1(1),C1(2),C1(5),C1(3),C1(4),DSW,IZ)
   12  CONTINUE
       IF (ICRT .NE. 0) GO TO 75
C      PRINT CUT NUMBER ON PLOT
       FCUT=ICUT
       FCUT = NCUT
       CSCALE = 1.0
       CALL FACTOR(CSCALE)
       B1 = C1(1) * SAVSCL
       B2 = C1(2) * SAVSCL
       CALL NUMBER (B2,B1,.1,FCUT,0.,-1)
       CSCALE = SAVSCL
       CALL FACTOR(SCALE)
   75  CONTINUE
C      SAVE ABSOLUTE POSITIONS
       DO 15 I = 1,5
   15  SAVE(I)=C1(I)
       RETURN
       END
```

PAGE A11

```
C
      SUBROUTINE CRIT(IQ,IEND)
      COMMON/ADJSTR/RWXMID,RWYMID,RWSCL,RWYSCL,R2
      COMMON/MAIN/X(1000), Y(1000), STRGL(1000), ICRT,
      NOP,
    1 DTH(1000),TLT(1000),A(1000)
      COMMON/CTM/ SAVE(5),B(5),C(5),D(5),STO
      COMMON /CUTN/ICUT,NU,NDIC,VEND(5)
      COMMON/PATSP/F6
      COMMON/CUTSP/NCUT,STRLGT
      DATA IUP/6HTOOLUP/,ISTOP/6HSTOP /
C                                                              PAGE A12
      DATA KAUX/6HAUX
      COMMON/CHECK/ I          KTOOL
      DIMENTION KS(5)
      IEND = 0
      IX = 1
      IY = 1
      ID = 1
      IT = 1
      IA = 1
      I = 0
      IF (IQ .EQ. 0) GO TO 200
C     CHECK FOR CONTINUATION
      X(1)=XX
C     CONTINUATION
C     COPY PREVIOUS LAST POINT
      Y(1)=YY
      DTH(1)=DD
      TLT(1)=TT
      A(1) = AA
      PSTRGL = SS+PSTRGL
      ZNEW = DTH(1)
      ALNEW = TLT(1)
      STRGL(1)=0.0
      I=2
      X(I) = X(NOP+1)
      Y(I) = Y(NOP+1)
      DTH(I) = DTH(NOP+1)
      TLT(I) = TLT(NOP+1)
      A(I) = A(NOP+1)
      STRGL(I)=DLS
      GO TO 32
  200 READ(5,970)NCUT,NTYPE
      IF (NCUT .GT. 0) GO TO 922
      READ(99,920) (KS(I),I=1,5),IN,IU,KT,ITO
      WRITE(6,920) (KS(I), I=1,5),IN,IU,KT,ITO
  920 FORMAT(7I10,A4,A6)
      IF(ITO .NE. KAUX) WRITE(6,923) KT,ITO
  923 FORMAT(' *** CARD SKIPPED *** KAUX=',A4,A6)
      IF ( KT .EQ. ISTOP) GO TO 700
      IF(ITO .NE. KAUX) GO TO 200
      IWS = IN
      IF(IWS .NE. 0) GO TO 919
C        THIS CARD CONTROLS AUXILIARY FUNCTIONS
      IWS = -4
      L3 = 0
      LZ = 0
      POSIT = + 1.0
      KTOOL = 1
      DO 918 I = 1,4
      IF(KS(I) .EQ. 2) KTOOL = 2)
      IF ( KS(I) .EQ.3 ) POSIT = -1.0
      IF(KS(I) .EQ. 3) L3 = I
      IF(KS(I) .EQ. 0) LZ = I
  918 KS(I) = KS(I)*64
      IF(LZ .EQ. 4) NERR = 0
      IF(RWXSCL*RWYSCL .GT. 0.0) GO TO 919
      IF(RWXSCL*RWYSCL .EQ. 0.0) STOP
C     BED POSITION CONTROLS MUST BE REVERSED
C     UNLESS LAST ZERO = 4TH (ALL = 0)
      IF (LZ .EQ. 4) GO TO 919
      POSIT = -1. * POSIT
      IF(L3 .GT. 0) GO TO 917
      IF(LZ .LT. 1) STOP
      KS(LZ) = 3*64
C                                                              PAGE A13
      GO TO 919
  917 IF(L3 .LT. 2) STOP
      KS(L3) = KS(L3-1)
      L3 = L3 - 1
      IF(L3 .GT. 1) GO TO 917
  919 CONTINUE
      IWS = 256 + IWS
      CALL PC3(IWS)
      CALL PC3(IU)
      IWS = 0
      DO 921 I=1,5
      IF( KWS .EQ. 1 ) IND = 1
      IF( KWS .EQ. 2 ) IND = 2
      KWS = KS(I)
      CALL PC3(KWS)
      CALL PC3(IWS)
  921 CONTINUE
      IWS = 128
      CALL PC3(IWS)
      I = 0
      GO TO 200
```

```
    922 CONTINUE
        PSTRGL = 0.
    970 FORMAT(3I5,F5.3,5F5.2,F8.5)
        STRLGT = STRLGT/RWXSCL
        WRITE(6,970)NCUT,NTYPE
      1 GT
     14 I = I + 1
     70 READ (5,900)X(I),Y(I),DTH(I),TLT(I),A(I),ITO
C       COMPUTE STRING LENGTH FOR THE POINT
        IF ( ITO .EQ. IUP ) GO TO 90
        IF (I .GT. 1) GO TO 30
        STRGL(I) = 0.0
        GO TO 31
     30 DLS =
        SQRT((((X(I)-XLD)/RWXSCL)**2+((Y(I)-YLD)/RWYSCL)*
      1 **2
        STRGL(I) = STRGL(I-1) + DLS
     31 CONTINUE
        XLD = X(I)
        YLD = Y(I)
        CALL CONV (X(I),Y(I),DTH(I),A(I))
    900 FORMAT (2F10.0,3F10.0,20X,A6)
    901 FORMAT(5X,I5,6E14.6)
        FI (ITO .EQ. IUP) GO TO 90
        IF (ITO .NE. ISTOP) GO TO 71
    700 CONTINUE
        WRITE(6,915)
    915 FORMAT (' PATTERN DOES NOT RETURN TO ORIGIN ')
        WRITE(6,914)SUMLGT
    914 FORMAT (' TOTAL CUT LENGTH IS 'F10.3)
        IEND = 1
        RETURN
     71 CONTINUE
C
     32 CONTINUE
        WRITE(6,910) I,X(I),Y(I),DTH(I),TLT(I),A(I),STRGL(I)
    910 FORMAT(I3,8F10.5)
        IF (IQ .NE. 0 .OR. I .NE. 1) GO TO 72
C       IQ = 0 DEFINES INITIAL SEGMENT OR ONLY SEGMENT
        SAVE(1)=X(I)
        SAVE(2)=Y(I)
        SAVE(3)=DTH(I)
        SAVE(4)=TLT(I)
        SAVE(5) = A(I)
C                                                      PAGE A14
     72 CONTINUE
C       F6 .GT. 0.5 DESIGNATES CYLINDRICAL CASE
        IF( F6 .GT. 0.5 ) GO TO 14
        IF (I .NE. 1) GO TO 60
        XCRIT = X(I)
        YCRIT = Y(I)
        DCRIT = DTH(I)
        TCRIT = TLT(I)
        ACRIT = A(I)
        GO TO 14
C       IX,IY =    1    SEARCHING FOR—
C                  2             MAXIMUM FOUND
C                  3             MINIMUM FOUND
     60 GO TO (1,2,3), IX
      1 IF (X(I)-XCRIT) 4,5,6
      4 IX = 3
        GO TO 5
      6 IX = 2
      5 XCRIT = X(I)
     17 GO TO (7,8,9), IY
      7 IF (Y(I)-YCRIT) 10,11,12
     10 IY = 3
        GO TO 11
     12 IY = 2
     11 YCRIT = Y(I)
        GO TO 80
      2 IF (X(I)-XCRIT) 50,15,15
     15 XCRIT = X(I)
        GO TO 17
      3 IF (XCRIT-X(I)) 50,15,15
      8 IF (Y(I)-YCRIT) 51,16,16
     16 YCRIT = Y(I)
        GO TO 80
      9 IF (YCRIT-Y(I)) 51,16,16
     80 IF(ABS(Y(I)-Y(I-1)) .LT. 0.2) GO TO 75
        IF(I .LE. 2) GO TO 14
        GO TO 151
     75 IF (I .NE. 3) GO TO 14
        IF (ABS(Y(I-1) - Y(I-2)) .LT. 0.2) GO TO 14
    151 ICRT = 12
        GO TO 52
        ICRT    =    0 LAST SEG., NO CRITICAL POINT
C               =    1 CRITICAL PT REACHED IN X
C               =    2 CRITICAL PT REACHED IN Y
     90 ICRT = 0
        GO TO 52
     50 ICRT = 1
        GO TO 52
     51 ICRT = 2
     52 NOP = I-1
        XCRIT = X(NOP)
        YCRIT = Y(NOP)
```

```
              DCRIT = DTH(NOP)
              TCRIT = TLT(NOP)
              XX=X(NOP)
              ACRIT = A(NOP)
              AA = A(NOP)
              YY=Y(NOP)
              DD=DTH(NOP)
              TT=TLT(NOP)
              SS = STRGL(NOP)
              SUMLGT = SUMLGT+SS
              IF(ICRT.NE.0)RETURN
              VEND(1) = X(NOP)
      C
              VEND(2) = Y(NOP)                                    PAGE A15
              VEND(3) = DTH(NOP)
              VEND(4) = TLT(NOP)
              VEND(5) = A(NOP)
              RETURN
              END

C
              SUBROUTINE CUBE(IQ,V,S1,S2)
              DIMENSION V(1000)
      C       NOTE SPECIAL MAIN
              COMMON/MAIN/X(1000), Y(1000), STRGL(1000), ICRT,
              NOP,
            1 DTH(1000),TLT(1000),AA(1000)
              DATA KOUNT/0/
              DIMENSION XYC(4),A(4,4),WX(4)
              F= 100./STRGL(NOP)
              DO 4 I = 1,4
              WX(I) = 0.
              DO 4 K = 1,4
            4 A(I,K) = 0.0
              DO 10 I = 1,NOP
              W = STRGL(I)*F
              W2 = W*W
              W3 = W2*W
              Q=V(I)
              W4 = W3*W
              W5 = W4*W
              W6 = W5*W
              Q2 = W*Q
              Q3 = W2*Q
              Q4 = W3*Q
              A(1,2) = A(1,2)+W
              A(1,3) = A(1,3)+W2
              A(1,4) = A(1,4)+W3
              WX(1) = WX(1)+Q
              A(2,4) = A(2,4)+W4
              A(3,4) = A(3,4)+W5
              A(4,4) = A(4,4)+W6
              WX(2) = WX(2)+Q2
              WX(3) = WX(3)+Q3
              WX(4) = WX(4)+Q4
           10 CONTINUE
              A(1,1) = NOP
              A(2,1)=A(1,2)
              A(3,1)=A(1,3)
              A(4,1)=A(1,4)
              A(2,2)=A(1,3)
              A(2,3)=A(1,4)
              A(3,2)=A(1,4)
              (A(3,3)=A(2,4)
              A(4,2)=A(2,4)
              A(4,3)=A(3,4)
              IF(KOUNT .GT. 10) GO TO 30
              WRITE(6,900) ((A(I,J),J=1,4),WX(I),I=1,4)
           30 CONTINUE
              DO 20 K=2,4
              DO 20 I=K,4
              F=A(I,K-1)/A(K-1,K-1)
              DO 19 J=K,4
           19 A(I,J)=A(I,J)-E*A(K-1,J)
           20 WX(I)=WX(I)-F*WX(K-1)
              A(2,1)=0.
              A(3,1)=0.
              A(3,2)=0.
              A(4,1)=0.
      C                                                           PAGE A16
              A(4,2)=0.
              A(4,3)=0.
              IF(KOUNT .GT. 10) GO TO 31
              WRITE(6,900) ((A(I,J),J=1,4),WX(I),I=1,4)
           31 CONTINUE
          900 FORMAT(5E12.4)
              DO 40 J=4,1,-1
              XYC(J)=WX(J)/A(J,J)
              IF(J .EQ. 1) GO TO 42
              J2 = J-1
              DO 38 K=1,J2
           38 WX(K)=WX(K)-A(K,J)*XYC(J)
           40 CONTINUE
           42 CONTINUE
              IF(KOUNT .GT. 10) GO TO 32
              KOUNT = KOUNT + 1
              WRITE(6,900)(XYC(J),J=1,4)
```

```
   32 CONTINUE
C     ADJUST TO PASS THRU END POINTS
      XYC(2)=XYC(2)+(V(NOP)-
      V(1))/100.-XYC(2)-100.*(XYC(3)+
    1 100.*XYC(4))
      S2 = XYC(2)+200.*XYC(3)+30000.*XYC(4)
      IF(IQ .EQ. 0) S1 = XYC(2)
C     IF(IQ .EQ. 1) S1 = OLD S2 (SEE PANDS1
  912 FORMAT (' CUBE',6F10.5)
      WRITE(6,912)(XYC(J),J=1,4),S1,S2
      RETURN
      END

C
      SUBROUTINE ERRCHK
      COMMON/ADJSTR/RWXMID,RWYMID,RWXSCL,-
      RWYSCL,R2
      COMMON/CTM/ SAVE(5),B(5),C(5),D(5),STO
      COMMON/MAIN/X(1000, Y(1000), STRGL(1000), IRCT, NOP,
    1 DTH(1000),TLT(1000),A(1000)
      COMMON/DPN/SLOPE(2,5),FVAL(5),HVAL(5),SLP(5),SL
      DATA TOLB/0.0025/
      TOLF = TOLB
      IF(ABS(SLOPE(1,1).GT.0.0001.AND.ABS(SLOPE(2,1)) .GT.
    1 0.0001) GO TO 20
      IF(ABS(SLOPE(1,2)).GT/0.0001.AND.ABS(SLOPE(2,2)) .GT.
    1 0.0001) GO TO 20
    1 20
      TOLF = TOLB/2.
   20 CONTINUE
      IF (ICRT. EQ. 6) ICRT = -1
C
C
      ERMAX = 0.0
      DO 10 I=1,NOP
      U = STRGL(I)/STRGL(NOP) * 100.
      PX = B(1)*U + C(1)*U**2 + D(1)*U**3 + X(1)
      PY = B(2)*U + C(2)*U**2 + D(2)*U**3 + Y(1)
      ERX = ABS(X(I)-PX)
      IF (R2 .GT. 0.0) ERX = ERX*3.1415926*R2/180.
      ERY = ABS(Y(I)-PY)
      ER = SQRT(ERX**2 + ERY**2)
      IF (ER .LE. ERMAX) GO TO 10
      ISAVE = I
      ERMAX = ER
   10 CONTINUE
C
      IF (ERMAX .LE. TOLF) GO TO 50
      ICRT = 6
      NOP = ISAVE
C                                                         PAGE A17
      WRITE(6,900) NOP,ERMAX
  900 FORMAT(1X,27HSUBSEGMENT PROPOSED. NOP =
     ,I3/1X,8HERMAX
    1 = ,E12.6)
      WRITE(6,601)(X(I),Y(I),B(I),C(I),D(I),I=1,2)
  601 FORMAT(' X Y B C D ',2E12.4)
   50 CONTINUE
      RETURN
      END

C
      SUBROUTINE PANDS1(IQ)
      DIMENSION SLOP2(5)
C     THIS SUBROUTINE COMPUTES THE INITIAL AND FINAL
      POINTS
C   1 AND SLOPES
      COMMON/DPN/SLOPE(2,5),FVAL(5),HVAL(5),SLP(5),SL
      COMMON/MAIN/X(1000), Y(1000), STRGL(1000), ICRT,
      NOP,
    1 DTH(1000),TLT(1000),A(1000)
C     TYPE OF SEGMENT                    KEY
C     FIRST SEG (OF MORE THAN 1)         IQ = 0
C                                        ICRT .NE. 0
C
C     INTERMEDIATE SEG                   IQ = 1
C                                        ICRT .NE. 0
C     LAST SEG (OF MORE THAN ONE)        IQ = 1
C                                        ICRT = 0
C     ONLY ONE SEG                       IQ = 0
C                                        ICRT = 0
      IF (IQ .EQ. 0) SL=STRGL(NOP)
      DO 2 I=1,5
    2 FVAL(I)=0.0
      HVAL(1) = X(NOP) - X(1)
      HVAL(2) = Y(NOP) - Y(1)
      HVAL(3) = DTH(NOP) - DTH(1)
      HVAL(4) = TLT(NOP) - TLT(1)
      HVAL(5) = A(NOP) - A(1)
      IF( .NOT.(ABS(STRGL(2)*STRGL(NOP)) .GT. 0.0))
    1 WRITE(6,900)STRGL(2),STRGL(NOP),NOP
```

```
    900 FORMAT(' POT ZERO DIV STRGL(2)=',F10.5,'
        STRGL(NOP)=',
      1 F10.5,'NOP=',I5)
        DELU=100.*STRGL(2)/STRGL(NOP)
        SLOPE(1,1) = (X(2)- X(1))/DELU
        SLOPE(1,2) = (Y(2)-Y(1))/DELU
        SLOPE(1,3) = (DTH(2)-DTH(1))/DELU
        SLOPE(1,4) = (TLT(2)-TLT(1))/DELU
        SLOPE(1,5)=(A(2) - A(1))/DELU
        IF (IQ .NE. 0) GO TO 3
        IF (NOP .LE. 2) GO TO 5
        DELU2 = 100.*(STRGL(3)-STRGL(2))/STRGL(NOP)
        IF( .NOT. ABS(DELU2) .GT. 0) GO TO 5
        SLOP2(1) = (X(3)-X(2))/DELU2
        SLOP2(2) = (Y(3) - Y(2))/DELU2
        SLOP2(3) = (DTH(3) - DTH(2))/DELU2
        SLOP2(4) = (TLT(3)-TLT(2))/DELU2
        SLOP2(5) = (A(3)-A(2))/DELU2
        DELU3 = DELU + DELU2
        DO 6 I = 1,5
      6 SLOPE(1,I)=SLOPE(1,I)-(SLOP2(I)-SLOPE(1,I))*DELU/-
        DELU3
        GO TO 5
      3 DO 4 I=1,5
      4 SLOPE(1,I)=SLP(I)*STRGL(NOP)/SL
      5 CONTINUE
        DELU=100.*(STRGL(NOP)-STRGL(NOP-1))/STRGL(NOP)
        SLOPE(2,1)=(X(NOP)-X(NOP-1))/DELU
        SLOPE(2,2)=(Y(NOP)-Y(NOP-1))/DELU
        SLOPE(2,3)=(DTH(NOP)-DTH(NOP-1))/DELU
        SLOPE(2,4)=(TLT(NOP)-TLT(NOP-1))/DELU
        SLOPE(2,5)=(A(NOP) - A(NOP-1))/DELU
        IF (ICRT .EQ. 0 .AND. NOP .LE. 2) RETURN
        IF (ICRT .EQ. 0) GO TO 9
        IF (STRGL(NOP+1) .LE. STRGL(NOP)) STOP
        DELU2 = 100.*(STRGL(NOP+1)/STRGL(NOP)-1.0)
        SLOP2(1) = (X(NOP+1)-X(NOP))/DELU2
        SLOP2(2) = (Y(NOP+1) - Y(NOP))/DELU2
        SLOP2(3) = (DTH(NOP+1)-DTH(NOP))/DELU2
        SLOP2(4) = (TLT(NOP+1)-TLT(NOP))/DELU2
        SLOP2(5) = (A(NOP+1)-A(NOP))/DELU2
        DELU3 = DELU + DELU2
        DO 7 I = 1,5
      7 SLOPE(2,I) = (SLOPE(2,I)*DELU2+SLOP2(I)*DELU)/DELU3
     11 CONTINUE
        IF (NOP .LE. 3) GO TO 12
        CALL CUBE(IQ,X,SLOPE(1,1),SLOPE(2,1))
        CALL CUBE(IQ,Y,SLOPE(1,2),SLOPE(2,2))
     12 CONTINUE
        IF (IRCT .EQ. 1) SLOPE(2,1)=0.0
        IF (ICRT .EQ. 2) SLOPE(2,2) =0.0
        RETURN
      9 DELU2 =
        (STRGL(NOP-1)-STRGL(NOP-2)*100./STRGL(NOP)
        IF( .NOT. ABS(DELU2) .GT. 0) RETURN
        DELU3 = DELU/(DELU+DELU2)
        SLOP2(1) = (X(NOP-1)-X(NOP-2))/DELU2
        SLOP2(2) = (Y(NOP-1)-Y(NOP-2))/DELU2
        SLOP2(3) = (DTH(NOP-1)-DTH(NOP-2))/DELU2
        SLOP2(4) = (TLT(NOP-1)-TLT(NOP-2))/DELU2
        SLOP2(5) = (A(NOP-1)-A(NOP- 2))/DELU2
        DO 10 I = 1, 5
     10 SLOPE(2,I)=SLOPE(2,I) - (SLOPE(2,I) - SLOP2(I))*DELU3
        GO TO 11
        END
```

PAGE A18

```
C
C     SUBROUTINE PC
C     PC AND THE SUBROUTINES IT CALLS, PC2 and PC3,
C     CAUSES THE FOLLOWING VALUES TO BE PUNCHED INTO
      THE
C     OUTPUT MEDIUM. (SEE PC3 FOR FURTHER DESCRIPTION.)
C     CUT SEQUENCE NO.
C     NO OF STEPS OF THE INDEPENDENT VARIABLE / 8
C     THREE COEFFICIENTS FOR EACH MACHINE AXIS, IF
C     A FULL CUBIC REPRESENTATION IS REQUIRED,
C     OR
C     ONE COEFFICIENT FOR EACH AXIS IF A LINEAR
C     REPRESENTATION IS ADEQUATE.
C     A SENTINEL CHARACTER EQUAL TO -0 IN THE
C     FINAL DATA CODE SYSTEM (EQUALS CHANNEL 8 IN
      PUNCHED
C     PAPER TAPE.)
C     PC3 CONVERTS A POSITIVE INTEGER OF MAXIMUM
C     VALUE 16*16-1 INTO TWO HEXADECIMAL CHARACTERS
C     TO BE PUNCHED INTO A CARD. THESE TWO CHARACTERS
C     WILL LATER BE COMBINED INTO AN EIGHT CHANNEL
C     CODE TO BE PUNCHED INTO A PAPER TAPE. TYPICAL
C     CODE TRANSFORMATIONS ARE SHOWN BELOW
C     INPUT    CARDS   TAPE
C     0        00      0000 0000
C     9        09      0000 1001
C     10       0A      0000 1010
```

```
C      17        1F         0001 1111
C      255       FF         1111 1111
       REAL IWS,NS
       COMMON/FACTRS/SCALE(6)
       DATA (SCALE(1),I=1,6)/2560.,800., 1333.33333,18.5185185
C
      1 ,22.2222222,1.0/
C      INPUT SEQUENCE IS X,Y,Z,TILT, PIECE ROTATION
C      OUTPUT SEQUENCE IS X,PR,Z,TILT,Y
       COMMON/ADJSTR/RWXMID,RWYMID,RWXSCL,-
       RWYSCL,R1,R2,CC
       IF (R2 .GT. 0.0) SCALE(1) = 3.49206349
C      NDIC = 1 FOR SIMPLE (LINEAR) BLOCK
C      NDIC = 2 FOR FULL CUBIC BLOCK
       COMMON /CUTN/ICUT,NU,NDIC,VEND(5)
       COMMON/P1/C1(5),C2(5),C3(5),C4(5)
       COMMON/P22/NW,NS,IWS(3)
       KEY 4 = 2
       KREM=0
       ISENT = 128
C      SET FOR THREE WORDS
       NWS= 3
       IF(KEY4 .EQ. 1) GO TO 753
       WRITE(6,916) ICUT,NU,NDIC,C2,C3,C4
C      TO PERMIT TRANSMISSION OF LARGER NO IT HAS BEEN
C      MADE AN EVEN MULTIPLE OF 8. DIVIDE BY 8 AND
C      RECONSTITUTE IN CONTROLLER PROGRAM.
       NUSV = NU
       NU = NU/8
       IF(NU*8-NUSV .NE. 0) WRITE(6,927)
  927  FORMAT(' NU/8 NOT AN INTEGER ')
  916  FORMAT (1X,3I4,4F8.6,F10.6,10F7.4)
  753  CONTINUE
       IF(NDIC .EQ. 2) GO TO 10
       NWS = 2
       CMAX = 0
       DO 11 I = 1,5
       IF(ABS(C2(I)*SCALE(I)).GT.CMAX)CMAX=ABS(C2(I)*-
       SCALE(I)
      1 )
   11  CONTINUE
       IF(KEY4.EQ.2)WRITE(6,917)CMAX
  917  FORMAT (' IN PC CMAX=',F20.5)
       IF(CMAX .GT. 0) GO TO 12
       WRITE(6,907)
  907  FORMAT(' IN PC, CMAX = 0.0 FOR A SIMPLE BLOCK ')
C      IF NECESSARY INCREASE NO. OF STEPS TO KEEP CMAX
C      IN BOUNDS
C      8 IS CHECKERING LIMIT
   12  IF(CMAX .LT. 6.0) GO TO 9
       AUS = NU
       NU = (CMAX + 5.999999) * AUS / 6.
       IF(NU .EQ. 128) NU = 127
       AU = NU
       DO 14 I = 1,5
   14  C2(I) = C2(I) *AUS/AU
       GO TO 9
   10  CONTINUE
       DO 7 I = 1,5
       IF(((ABS(C3(I)) .GT. 0.0)).OR. ((ABS(C4(I))
      1 .GT. 0.0))) GO TO 9
    7  CONTINUE
C      SET FOR TWO WORD
C      BACAUSE SIMPLE BLOCK WILL SUFFICE
    8  NWS = 0
    9  CONTINUE
       IF(NU .LT. 256) GO TO 15
       WRITE(6,915) NU
       IF (NWS .EQ. 3) STOP
  915  FORMAT (' XS STEPS - NU= ', I10)
       KREM = NU - 255
       NU = 255
C
C      SET FOR 1 WORD AND UNITY SCALE
   15  NW = 1
       NS = SCALE(6)
C      CUT NO IS LIMITED TO 127
C      BECAUSE
       IWS(1) = MOD(ICUT,2**7)
       IF(ICUT .LT. 0) IWS(1) = 256 + ICUT
       IF(NWS .EQ. 0) IWS(1) = 0
       IF(NWS .EQ. 0) NWS = 2
       CALL PC2
       IWS(1) = NU
       CALL PC2
       NW=NWS
       IWS(1) = C4(1)
       IWS(2) = C3(1)
       IWS(3) = C2(1)
       SET SCALE FOR X
       NS = SCALE(1)
       CALL PC2
       C4(1) = IWS(1)
       C3(1) = IWS(2)
       C2(1) = IWS(3)
       IWS(1) = C4(5)
       IWS(2) = C3(5)
       IWS(3) = C2(5)
```

```
C     SET SCALE FOR PIECE ROTATION
      NS = SCALE(5)
      CALL PC2
      C4(5) = IWS(1)
      C3(5) = IWS(2)
      C2(5) = IWS(3)
      IWS(1) = C4(3)
      IWS(2) = C3(3)
      IWS(3) = C2(3)
C     SET SCALE FOR DEPTH
      NS = SCALE(3)
      CALL PC2
      C4(3) = IWS(1)
      C3(3) = IWS(2)
      C2(3) = IWS(3)
      IWS(1) = C4(4)
      IWS(2) = C3(4)
      IWS(3) = C2(4)
C     SET SCALE FOR TILT
      NS = SCALE(4)
      CALL PC2
      C4(4) = IWS(1)
      C3(4) = IWS(2)
      C2(4) = IWS(3)
      IWS(1) = C4(2)
      IWS(2) = C3(2)
      IWS(3) = C2(2)
C     SET SCALE FOR Y
      NS = SCALE(2)
      CALL PC2
      C4(2) = IWS(1)
      C3(2) = IWS(2)
      C2(2) = IWS(3)
      NS = 1
      NS = SCALE(6)
      NW = 1
      IWS(1) = ISENT
      CALL PC2
      IF(KREM .LE. O) RETURN
C                                                    PAGE A21
      KREM = KREM - NU
      IF(KREM .GE. 0) GO TO 15
      NU = KREM + NU
      KREM = 0
      GO TO 15
      END

SUBROUTINE PC2
      REAL IWS,NS
      DIMENSION IW(3)
      COMMON/P22/NW,NS,IWS(3)
      DIMENSION SWS(3)
      COMMON /CUTN/ICUT,NU,NDIC,VEND(5)
      DIMENSION F(3)
      DATA (F(I),I=1,3)/65536.,4096.,4096./
      KEY4 = 2
      KEY4 = 1
      GO TO (1,2,3),NW
C     HANDLE SINGLE VALUE
    1 ISW4=IWS(1)*NS
      IF (IWS4 .GT. 2**8) WRITE (6,902) IWS4
      IWS4 = MOD(IWS4, 2**8)
  902 FORMAT (100X,20HPC2 RECVD XS VALVE ,I10)
      IF(IWS4.EQ. -1) IWS4 = 255
      IF(IWS4 .LT. -1) GO TO 10
   11 CONTINUE
      CALL PC3 (IWS4)
      RETURN
   10 IF(IWS4 .LT. -2**15+1) STOP
      IWS4 = IWS4+2**16
      GO TO 11
C     NW=2, HANDLE ONE VALUE AS TWO WORDS, OR,
    2 CONTINUE
C     NW=3, HANDLE THREE VALUES AS SIX WORDS (SEE 35+2)
    3 CONTINUE
      DO 33 I = 1,3
      SWS(I) = IWS(I)
      WS = IWS(I)*NS*F(I)
      IW(I) = WS+SIGN(0.5,WS)
C     WHEN THE COEFFICIENTS ARE CONVERTED TO TAPE
C     CHARACTERS (OR THEIR HEXADECIMAL EQUIVALENTS
C       FOR
C     STORAGE IN TWO CARD COLUMNS) THEY WILL OF
C       NECESSITY BE
C     TRUNCATED. RATHER THAN ACCEPT THIS ERROR, THE
C       FLOATING
C     POINT VALUES WILL BE SET EQUAL TO THE TRUNCATED
C       VALUES
C     THIS WILL RESULT IN AUTOMATIC CORRECTION FOR
C       ERROR
C     ACCUMULATION BECAUSE SUBROUTINE COONS WILL
C       USE THE
C     TRUNCATED VALUES IN REGENERATING POINTS ON THE
C       CUT
```

```
C     FOR PLOTTING AND WILL USE THE FINAL SUCH POINT AS A
C     POINT OF DEPARTURE FOR THE MOVE TO THE START OF THE
C     NEXT CUT.
      AWS = IW(I)
      WS2 = AWS/(NS*F(I))
      IF (K2 .LT. 20 .OR. I .LT. 3) GO TO 907
      K2 = K2 + 1
  907 CONTINUE
      IWS(I) = WS2
   33 CONTINUE
      IF(NW .EQ. 2) GO TO 35
      ANU = NU*8
      WS3=IWS(3)-(ANU+1.)/2.*(IWS(2)-SWS(2)+(ANU+2.)/3.-
     *(IWS
     1 (1)-SWS(1)))
      IF(KEY4.EQ.2)WRITE(6,900)ANU,IWS(1),IWS(2-
     ),IWS(3),WS3
  900 FORMAT (' PC2',I5,8F12.5)
      IWS(3) = WS3
C                                                          PAGE A22
      WS = IWS(3)*NS*F(3)
      IW(3) = WS
      AWS = IW(3)
      WS2 = AWS/(NS*F(3))
      IWS(3) = WS2
   35 CONTINUE
      DO 4 I=1,3
C     HANDLE ONLY THIRD COEF OF SIMPLE BLOCKS
      IF(NW.EQ. 2 .AND. I .NE. 3) GO TO 4
      II=IW(I)
      IF(II.NE.0) GO TO 14
      II2=0
      IWS4=0
      GO TO 6
   14 IF (IABS(II).GT. 2**15-1) GO TO 12
      IF(II+1)7,5,8
    8 II2=MOD(II,2**8)
      IWS4=(II-II2)/2**8
    6 IF(KEY4.EQ.2)WRITE(6,904)NW,NS,(IWS(K),K=1,3)-
     ,(IW(K),K
     1 =1,3),IWS4,II2
  904 FORMAT(' PC2 ',I5,4F12.6,5I6)
      CALL PC3(IWS4)
      CALL PC3(II2)
      GO TO 4
    5 II2=255
      IWS4=255
      GO TO 6
    7 II=II+2**16
      GO TO 8
    4 CONTINUE
      RETURN
   12 WRITE (6,912)II
      RETURN
  912 FORMAT (100X,15HXS NUMB IN PC2 ,I10)
      END
```

```
C
      SUBROUTINE PC3(IWS)
      DIMENSION KA (16), KK (70)
      DATA(KA (I), I = 1, 17)/ 1HO,1H1,1H2,1H3,1H4,1H5,1H6,
     1 1H7,1H8,1H9,1HA,1HB,1HC,1HD,1HE,1HF,1HG /
      IWS2=MOD(IWS,2**4)
      IWS3=(IWS-IWS2)/2**4
      IF(KK2.EQ.2) GO TO 2
      KK2=2
      KC=0
    2 KC=KC+1
      KK(KC)=KA(IWS3+1)
      KC=KC+1
      KK(KC)=KA(IWS2+1)
      IF(KC.LT.70)RETURN
      KARD = KARD + 1
      WRITE(6,900)(KK(J),J=1,70),KARD
C     WRITE(7,900)(KK(J),J=1,70),KARD
      WRITE(7,902)(KK(J),J=1,70),KARD
  900 FORMAT (1X,70A1,I10)
  902 FORMAT (70A1,I10)
      KK2=1
      RETURN
      END
C
      SUBROUTINE VECT(DX,DY,DA,DD,DT,NCODE,IZ)
      DIMENSION BUFF(1024)
      COMMON/COMSCL/SAVSCL
      IF(KSW.EQ.2)GO TO 2
C                                                          PAGE A23
      KSW=2
      CALL PLOTS(BUFF,1024,34)
      SAVSCL = SCALE
      CALL FACTOR(SCALE)
      SCALE = 2.0
```

```
        CALL PLOT(YP,XP,3)
        RETURN
     2  IF (IZ .EQ. 0) CALL PLOT (DY,DX,3)
        IF (IZ .NE. 0) CALL PLOT (DY,DX,2)
        IF(NCODE.LT.-9)CALL PLOT(0,10.0,-3)
        RETURN
        END
```

```
/
/       NUMERICALLY CONTROLLED STOCK CHECKERING            PAGE B 1
/       CHECKERING MACHINE CONTROLLER PROGRAM
/          PDP-8 COMPUTER PAL CODE
RIB=6234
RMF=6244
OPMTRS=6144
ION=6001
IOF=6002
FIXTAB
     *0
                 0                  /STORAGE FOR INTERUPTED ADDRESS
                 JMP I .+1
                 INTR
                 *7
                 5600
     *10
AI10,            0                  /AI-10    /AUTO INDEX REGISTERS
AI11,            0                  /AI-11
AI12,            0                  /AI-12    USED IN ADDRESS SETTING LOOPS
AI13,            0                  /AI-13    USED IN ADDRESS SETTING LOOPS
AI14,            0                  /AI-14
AI15,            0                  /AI-15
AI16,            0                  /AI-16
AI17,            0                  /AI-17    USED AS INPUT BUFFER POINTER
     *20
CWB,             0
CW,              0
CW2,             0
CW3,             0
WS,              0
AXIS,            0
STPS,            0
KOUTC,           OUTC
KOUTOL,          OUTOLF
KOUTO,           OUTOCT
     *40
EX1,             0                  /OPERAND STORAGE
AC1H,            0
AC1L,            0
OVER1,           0
EXP,             0                  /F.A.
HORD,            0
LORD,            0
OVER2,           0
EXP1,            0
QUOL,            0
FPAC1,           0
                 0
                 0
     *61
FLAG,            0                  /ARITHMETIC ERROR FLAG
PAUS,            0                  /FLAG FOR PAUSING AT END OF CUT
BLKTYP,          0
NBTYP,           0
BTYP2,           0
XOPC,            0                  /FOLLOWED BY BOPC,ZOPC,AOPC,YOPC
     *73
X20PC,           0
     *101
PSWITCH,         0
PSWT2,           0
     *130
DH,              200                /INDIRECT ADDRESS OF EA AXIS
                                    AREA 130
DL,              200+1
/                                                          PAGE B 2
CH,              200+2              /ETC
CL,              0
BH,              0                  /+4
BL,              0
DIH,             0                  /+6
DIL,             0
DUP,             0                  /+10
BLANK,           0                  /USED IN FLOATING PT WORK
WDH,             0                  /+12 = +10 BASE 10 OR MOTOR COUNT
WDL,             0
WCH,             0                  /+14
WCL,             0
WBH,             0                  /+16
WBL,             0
DMRH,            0                  /+20
DMRL,            0
DMIN,            0                  /+22
SUMVH,           0
SUMH,            0                  /+24 = °20 BASE 10
```

```
SUML,        0
WFAC,        0
                        /THIS AREA IS CLEARED IN START UP
        *200
XAX,         0          /XAXIS AREA
        *232
BAX,         0          /B(PIECE ROTATION) AREA
        *264
ZAX,         0          /ZAXIS AREA
        *316
AAX,         0          /A(TILT) AREA
        *350
YAX,         0          /YAXIS AREA
        *402
                        /SIXTH AXIS AREA /NOT USED
        *600
BEGIN,       CLA
             DCA CW
             DCA CW2
             6144       /TURN ON FIRST SET UP ANGLE AND
                        FIRST TOO
                        /L
             CLA CLL
             JMS I ICLI /CLEAR INPUT + START INPUT/1251
             TAD I2Z10  / SET TO TURN AIR ON EVERY TIME
             6144       /TURN ON AIR
             DCA CWB    /
             6001       ENABLE INTERRUPTS
             TAD M257
             DCA CNT
             CLA CMA
             TAD LCFR
             DCA AI10
             DCA I AI10 /
             ISZ CNT    /CLEARING LOOP
             JMP .-2
R1,          TAD.I ISWT /DETERMINE IF END OF
             RTL        /TAPE HAS BEEN REACHED
             SNL CLA
             OPMTRS     /TURN OFF ALT SET UP ANGLE AND
                        ALT TOOL
             TAD I IBUFF
             SNA CLA    /TEST FOR FULL INPUT BUFFER
             JMP .-2
             NOP        /INPUT BUFFER IS FULL
             JMS I KDMSG /CALL DATA MASS.(TRANS +
                        REARNG.)
/                                                       PAGE B 3
             JMS I ICLI /CLEAR INPUT + START REFILLING
             NOP
R2,          JMS STEP
             NOP
             JMS I KCDWD /GEN A MOTOR CONTROL WORD
                        AND MOTOR CO
                        /UNTS
             TAD CW2    /
             SZA CLA    /LOOP UNTIL STAND BY WORD
                        REMOVED
             JMP .-2
             NOP
             CLA CMA
             TAD STPS
             DCA STPS
             NOP
             TAD STPS
             SZA CLA    /TEST FOR MOTION FINISHED (RUN
                        U STEPS =
                        /0)
             JMP R2     /MOTION NOT FINISHED
             NOP
             JMP R1     /MOTION FINISHED (U = 0)
ISWT,        SWTCH
M257,        -257
ICLI,        CLI
KDMSG,       DMSGI
IBUFF,       BFF
KCDWD,       CDWD
I2Z10,       2000
STEP,        0
             CLA IAC
             DCA AXIS   /ADDRESS SETTING FOR EA AXIS
             TAD FRST   /SET FOR FIRST AXIS 200/8-DELTA
             DCA I KDH  /DELTA = 26/10 = 32/8
             TAD JM5    /-5
             DCA NAX    /SET FOR 5 AXES
             JMP .+6
NXAX,        CLA
             TAD I KDH
             TAD P32    /+26/10 +32/8
             DCA I KDH
             ISZ AXIS
             TAD LCFT
             DCA AI13
             TAD P32
             JMS I JLNAS
             JMP KDH+1
LOOP,        ISZ NAX
             JMP NXAX
             JMP I STEP
```

| | | |
|---|---|---|
| FRST, | 200 | |
| JM5, | 7773 | /MINUS 5 |
| NAX, | 0 | |
| P32, | 32 | /PLUS 26/10=/8/=CHG IN AD AND NO.LOCS |
| LCFR, | 130 | |
| CNT, | 0 | |
| JLNAS, | LNAS | |
| KDH, | DH | /ADDRESS SETTER RUN TIME |
| | CLL CLA | |
| | TAD I DL | /ADD THIRD DIF TO SECOND DIF |
| | TAD I CL | |
| | DCA I CL | |
| | RAL | |
| | TAD I DH | |
| | TAD I CH | |
| | DCA I CH | |
| | CLL | PAGE B 4 |
| | TAD I CL | /ADD SECOND TO FIRST |
| | TAD I BL | |
| | DCA I BL | |
| | RAL | |
| | TAD I CH | |
| | TAD I BH | |
| | DCA I BH | |
| | CLL | |
| | TAD I BL | /ADD FIRST TO PRIOR REMAINDER |
| | TAD I DIL | |
| | DCA I DIL | |
| | RAL | |
| | TAD I BH | |
| | TAD I DIH | |
| | DCA I DIH | |
| | CLL | /COMPUTE NEW IDEAL POSITION |
| | TAD I BL | |
| | TAD I SUML | |
| | DCA I SUML | |
| | RAL | |
| | TAD I SUMH | |
| | TAD I BH | |
| | DCA I SUMH | |
| | RAL | |
| | TAD I SUMVH | |
| | DCA I SUMVH | |
| | TAD I BH | |
| | SMA CLA | |
| | JMP I KCNTU | |
| | CMA | |
| | TAD I SUMVH | |
| | DCA I SUMVH | |
| | JMP I KCNTU | |
| KCNTU, | CNTNU | |
| *1000 | | |
| | NOP | |
| CNTNU, | TAD I DIH | /COMPUTE MOTOR PULSES ROUNDED DOWN TO INT /EGER |
| | AND MIMP | /111 111 110 000 MINUS ONE MOTOR PULSE |
| | DCA WS | |
| | TAD I DIH | |
| | AND Z814 | /000 000 001 111 |
| | DCA I DIH | |
| | CLL | |
| | TAD WS | |
| | TAD I DMRH | /ADD TO TOTAL MOTOR PULSES REMAINDER |
| | DCA I DMRH | |
| | RAL | |
| | SZA | |
| | JMS I IERR/ | OVERFLOW ERROR |
| | JMP I KLOOP | /NEXT AXIS |
| Z814, | 0017 | |
| MIMP, | 7760 | |
| IERR, | ERR | |
| KLOOP, | LOOP | |
| CDWD, | 0 | |
| | TAD NBYTYP | |
| | DCA BTYP2 | |
| | TAD XDMXH | /SET UP - MOTOR PULSES |
| | DCA KDMRH | /SET ADDRESSES |
| | TAD XDMRH | |
| | DCA XDMIN | |
| | TAD XDMIN | |
| | DCA KWS | |
| | TAD LM5 | /SET NO AXES |
| | DCA NAXES | PAGE B 5 |
| | TAD B11 | |
| | DCA BIT | |
| | TAD CWB | /BASE CODE WORD XX1111111111 |
| | TAD SS1 | |
| | DCA WWS | |
| | JMP R5 | |
| XDMXH, | XAX+20 | /LOCATION OF FIRST AXIS (X) |
| KDMRH, | 0 | / LOCATION OF CURRENT AXIS |
| XDMIN, | XAX+22 | /LOCATION OF CURRENT AXIS, INTEGER PULSES |
| KWS, | 0 | /NUMBER PULSES FOR THIS AXIS |

```
LM5,           -5
NAXES,         0
B11,           0001            / BIT 11
BIT,           0
SS1,           1252
R5,            TAD I KDMRH     /EXTRACT INTEGER PULSES
               AND M1MP2       /S8140
               DCA I KWS
               TAD I KDMRH     /STONE REMAINDER
               AND ZZ418
               DCA I KDMRH
               TAD I KWS
               CLL RTR         / RIGHT JUSTIFY
               RTR
               JMS I K2F4/     FILL SIGN
               DCA I KWS
               TAD I KWS
               SPA
               JMP .+7
               CMA             / EQUALS -DELTA -1
               DCA I KWS
               TAD WWS         / ADJ SIGN OF MOTION
               TAD BIT         /BIT IN 3 OR 5 OR 7 OR 9 OR 11
               DCA WWS
               JMP .+4
               NOP
               TAD M1          /ADD ONE NEG PULSE
               DCA I KWS
               TAD KDMRH       /SET UP FOR NEXT AXIS
               TAD PP32
               DCA KDMRH
               TAD KWS
               TAD PP32
               DCA KWS
               TAD BIT
               CLL RTL
               DCA BIT
               ISZ NAXES
               JMP R5          /RETURN FOR NEXT AXIS
       NOP/TAD C
       NOP/JMS I KOUTC
               TAD WWS  /EVERYTHING READY SO
       NOP/JMS I KOUTOL
               DCA CW2   /POST STANDBY CODE WORD
               JMP I CDWD      /EXIT
M1MP2,         7760
M1,            -1
K2F4,          F4
PP32,          32
ZZ418          0017
WWS,           0
DMSG1,         0
               TAD I KBF       / SEQ NO AND/OR BLOCK TYPE
/                                                              PAGE B 6
               JMS I IF4       / FILL SIGN POSITION/S/
               DCA NBTYP
               DCA PSWT2       /ASSUME P2 (+)
               TAD NBTYP
               SMA CLA
               JMP .+3
               CMA
               DCA PSWT2       /SET P1 (-)
               TAD NBTYP
               SPA SNA CLA
               JMP LOOP2
STSQNO,        TAD NBTYP       /STORE SEQ NO AS SEQ NO OLD
               DCA SQNOLD
               JMS I LDMSG
               JMP I DMSG1
KBF,           BF
SQNOLD,        0
LOMSG,         DMSG
LOOP2,         TAD PAUS        / WAIT IF PAUS IS SET
               SNA CLA
               JMP KBF-2
               JMP .-3
IF4,           F4
       *1200
DMSG,          0
               CLA CLL IAC
               DCA K           /ONE TO AXIS COUNTER
               TAD I IBF1      / NO OF U STEPS
               RTL             / SCALE U*8
               RAL
               DCA STPS
               TAD A1          /SET ADDRESS FOR Y AXIS DATA
               DCA BHIH
               TAD A2
               DCA DHW
               TAD A3
               JMP R111
R11,           TAD BHIH        /SET FOR A,Z,PR,X, IN THAT ORDER
               TAD M2
               DCA BHIH
               ISZ K
               TAD K
               TAD NM6
```

```
                SNA CLA
                JMP I DMSG      / EXIT
                TAD DHW
                TAD NM6
                DCA DHW
                TAD DHT
                TAD M26
R111.           DCA DHT
                TAD BHIH        /COMPLETE ADDRESS SETTING
                IAC
                DCA BHIL
                TAD PDHW
                DCA AI13
                TAD SIX
                JMS I KLNAS
                TAD PDHT
                DCA AI13
                TAD SIX
                JMS I KLNAS
                JMP C2
K,              0
/                                               PAGE B 7
M26,            -32
A1,             BF+12
A2,             BF+=            /+26 BASE 10
A3,             YAX
M2,             7776            /-2
NM6,            7772            /-6
BHIH,           0
BHIL,           0
PDHW,           DHW             /PTR TO PTR TO (FULL) INPUT
                                BUFFER SUB AR
                                / EA
PDHT,           DHT             /PTR TO PTR TO CUBIC COEF OF
                                CURRENT AXIS
DHW,            0
DLW,            0
CHW,            0
CLW,            0
BHW,            0
BLW,            0
DHT,            0
DLT,            0
CHT,            0
CLT,            0
BHT,            0
BLT,            0
SIX,            0006
KLNAS,          LNAS
IBF1,           BF+1
        *1300                   /DATA MASSAGE PROCESSING
                                SUBROUTINE
C2,             TAD NBTYP       /TEST KEY FOR ALTERNATE(STR
                                LINE) INPUT
                SMA SZA CLA     CLL
                JMP NDAT        /JMP TO TREAT NORMALLY
                TAD I BHIH      /REARRANGE + CLEAR
                CDA I BHW
                CDA I BHIH
                TAD I BHIL
                DCA I BLW
                DCA I BHIL
NDAT,           TAD I BHW       /TREAT NORMALLY WITHIN
                                BUFFER AREA
                JMS I KF4
                DCA I BHT
                TAD I BLW
                CLL
                RTL
                RTL
                DCA I BLT
                TAD I CHW
                JMS I KF4       /FILL SIGN POS(4 BITS)
                DCA I CHT
                TAD I CLW
                CLL
                RTL
                RTL
                DCA I CLT
                TAD I DHW       /
                CLL             /
                AND PP17        /
                RTR
                RTR
R RAR
                TAD I DLW
                DCA I DLT
                TAD I DHW
                RTR
                RTR
/                                               PAGE B 8
                AND PP17        /
                JMS I KF8       /FILL SIGN POS(8 BITS)
                DCA I DHT
                JMP R11         /
PP17,           0017
KF4,            F4
```

```
KF8,        F8
        *1400
                            /LIST ADDRESS SETTER USES AI12 +
                            AI13
                            /ENTER WITH COUNT IN AC, IST LOC
                            IN
                            /AI13, IST ADD IN I,AI13
                            /TO SET 100-105 TO POINT TO
                            200-205
LNAS,       0               /AC=6 100=200 AI13=100 AND AI12
                            NOT IN US
                            / E
            CMA IAC
            IAC
            SMA             /INSURE A SMALL NO OF SETTINGS
            HLT
            DCA CNT2
            CLA CMA
            TAD AI13        /ADDRESS NO1 & 1 TO ADDRESS NO
                            2
            DCA AI12
            TAD I AI12      /START OF LOOP
            CLL IAC
            DCA I AI13
            ISZ CNT2
            JMP .-4
            JMP I LNAS      /RETURN
                            /FILL FIRST 4 BITS WITH SIGN (=5TH
                            BIT)
F4,         0               /NOTE FIRST 4 BITS MUST BE ZEROS
                            /NOTE NEG NO LOOKS MORE
                            POSITIVE
            TAD S5170       /111110-0/7600
            SPA
            TAD K4180
            TAD S5170
            JMP I F4
S5170,      7600
K4180,      0400
S40115,     0020
CNT2,       0
F8,         0               /FILL FIRST 8 BITS WITH SIGN (=9TH
                            BIT)
            TAD S9130       /1-1000/7770
            SPA
            TAD S40115
            TAD S9130       /1-1000/7770
            JMP I F8
S9130,      7770
KWSI,       WSI
RWTST,      TAD I KWSI
            TAD ZTEST
            SZA CLA
            JMP KSTSEQ-3
            ISZ WSI3
            JMP I KNXC
            6356            /STOP HSR, 6 SUC. SENTINELS
                            FOUND
            JMS LISTEN
            6352            / CLEAR DONE
            JMP I KSTSEQ
            TAD WSI2
            DCA WSI3
            JMP I KNXC      /EXIT
KSTSEQ,     STSEQ
SRE,        6356            /STOP HSR
            JMS I IERRR
/                                                       PAGE B 9
WSI2,       7772
WSI3,       0
ZTEST,      7600
KNXC,       RETRN
IERRR,      4720
LISTEN,     0               / WAIT FOR CONTINUE TO BE
                            PUSHED
            IOF
            CLA CLL
            6146            /READ CLOCK AND PUSH BUTTONS
                            /*/
            RTR
            SNL CLA
            JMP .-3
            6142            / CLEAR FLAGS
            6152            / CLEAR FLAGS
            JMP I LISTEN
SBLK,       TAD BLKTYP      / TEST FOR AUX FUNCTIONS BLOCK
            TAD PP3
            SMA CLA
            JMP C5          / IS NOT AN AUX FUNCTION BLOCK
            TAD I BLKT
            JMS AUX
            TAD STOP        / TEST FOR PAUS /DONT OPER ALL
                            MOTORS FOR
                            / WARD
            SNA CLA
            ISZ PAUS        / SET TO PAUSE
            TAD I BLKT+1
```

```
                JMS AUX
                CLA CLL
                TAD I BLKT+2
                JMS AUX
                CLA CLL
                TAD I BLKT+3
                JMS AUX
                AND STOP+1
                DCA CWB
                CLA CLL
                TAD CNT3
                DCA WS2
                DCA WS6
                ISZ WS6
                JMP .-1
                ISZ WS2
                JMP .-3
                TAD ONE
                DCA STPS
                JMP I CHK3
STOP,           7253
                6000
ONE,            0001
CNT3,           7540
WS6,            0
WS2,            0
CHK3,           CHK1+3
BLKT,           204
                236
                270
                322
                354
C5,             TAD BLKTYP
                TAD PP3
                SZA CLA
                JMP I LCNTDN
                TAD ONE
                DCA STPS
/
                JMP I LCNTDN
LCNTDN,         CNTDWN
AUX,            0
                RTL
                RTL
                AND ZTEST
                OPMTRS
                JMP I AUX
MM2,            7776
PP3,            0003
        *1600
STSEQ,          6142            /CLEAR FLAGS INTERFACE 14
                6152
                6342            /CLEAR HSR FLAG AND 0 TO AC
                6343            /STEP TAPE ONCE TO RIGHT
                6341            /SKP ON FLAG
                JMP .-1
                6346            /CLEAR FLAG AND LOAD ACC
                                 FROM HSR
                JMP .+6
                NOP
                NOP
                NOP             / SPACE FOR READER ERROR
                                 CHECKING
                NOP
                NOP
                6354            / SKIP ON DONE FLAG
                JMP .-1
                6352            /CLEAR DONE FLAG (HSR)
                TAD M200
                SNA CLA
                JMP STSEQ+3
                IAC
                6143            /ENABLE CLOCK
                DCA I IBUSYS    / 1 = NOT BUSY
                TAD P10D
                DCA I P10D
                TAD P10D
                DCA I P10D+1
                TAD P10D
                DCA I P10D+2
                DCA I P10D+3
                DCA I P10D+4
                TAD P10D+5
                DCA I
                KSWTCH
                DCA I IBUSYS+1
                JMS RSTTUP      / RESET AS IF TOOL UP
                NOP
                NOP
                JMP I ISTRT
P10D,           BFO
                OPP2
                OPP3
                BFO+1
                BFO+2
                7430
KSWTCH,         SWTCH
```

PAGE B10

| | | |
|---|---|---|
| ISTRT, | BEGIN | |
| M200, | 7600 | |
| IBUSYS, | BUSYSG | |
| | PAUS | |
| | CLA CLL | /COPY LOWER HALF TO UPPER HALF |
| | TAD INIT2 | |
| | DCA Z A116 | |
| | TAD INIT1 | |
| | JMP CPY+4 | |

PAGE B11

| | | |
|---|---|---|
| / | | |
| CPY, | CLA CLL | /COPY UPPER HALF TO LOWER HALF |
| | TAD INIT1 | |
| | DCA Z A116 | /SET PICK UP |
| | TAD INIT2 | |
| | DCA Z A117 | /SET LAY DOWN |
| | TAD TST3+1 | |
| | DCA TST3 | /SET TEST |
| | TAD I Z A116 | |
| | DCA I Z A117 | |
| | ISZ TST3 | |
| | JMP .−3 | |
| *1700 | | |
| | CLA CLL | |
| | OPMTRS | / RESET AUX FUNCTIONS TO ZERO |
| | JMS I KISTEN | |
| | 6355 | / TAPE RESET PROGRAM |
| | 6347 | |
| | CLL CLA | |
| | TAD JM4 | |
| | DCA INDIC | |
| RPT, | 6341 | /SKP IF FLAG |
| | JMP .−1 | |
| | 6346 | /READ BUFFER |
| | TAD TSTV | |
| | SNA CLA | /TEST FOR SENTINEL |
| | JMP TST4 | |
| | TAD JM4 | |
| | DCA INDIC | |
| | JMP RPT | |
| TSTV, | 7600 | |
| INDIC, | 0 | |
| TST4, | ISZ INDIC | |
| | JMP RPT | |
| | 6356 | / STOP REWIND |
| | JMS I KISTEN | |
| | 6352 | / CLEAR DONE |
| | JMP I ISTSEQ | |
| JM4, | 7774 | |
| ISTSEQ, | STSEQ | |
| CR3, | 215 | |
| INIT1, | 4020 | |
| INIT2, | 20 | |
| TST3, | 0 | |
| | 4121 | /−3657 |
| KISTEN, | LISTEN | |
| JM2, | 7776 | |
| RSTTUP, | 0 | / SUBROUTINE TO RESET AS IF TOOL UP |
| | TAD .+5 | |
| | DCA BLKTYP | |
| | TAD .+3 | |
| | DCA PSWTCH | |
| | JMP I RSTTUP | |
| | 7776 | |
| *2000 | | |
| | CLA IAC | |
| | 6143 | / ENABLE CLOCK |
| | CLA | /TO COMPARE 0 THRU 2777 |
| | DCA B2 | |
| | TAD B2 | /TO COMPARE B2 THRU LIM |
| | TAD FOURM | |
| | DCA B3 | |
| | ION | |
| L1, | TAD I B2 | |
| | CIA | |

PAGE B12

| | | |
|---|---|---|
| | TAD I B3 | |
| | SZA CLA | /IF SAME(ZERO) IGNORE |
| | JMP L2 | /JUMP TO PRINT |
| L3, | ISZ B2 | |
| | ISZ B3 | |
| | TAD LIM | |
| | CIA | |
| | TAD B2 | /TEST FOR END OF RANGE |
| | SPA CLA | |
| | JMP L1 | /NOT DONE |
| | IOF | |
| | HLT | /DONE |
| FOURM, | 4000 | |
| B2, | 0 | |
| LIM, | 3600 | |
| B3, | 0 | |
| L2, | TAD I KOPP2 | /WAIT FOR COMPL. OF TYPING |
| | CIA | |

```
                TAD I KOPP3
                SZA CLA
                JMP L2         /WAIT
                TAD I KBUSYS
                SNA CLA
                JMP L2         /WAIT
                TAD B2         /LOAD BUFFER AREA
                JMS I KOUTO
                CLA
                TAD I B2
                JMS I KOUTO
                CLA
                TAD I B3
                JMS I KOUTOL
                CLA
                JMP L3
KOPP2,          OPP2
KOPP3,          OPP3
KBO,            BO
KBUSYS,         BUSYSG
         *2400
BFO,            2400           /START OF 126 CHARACTER
                               OUTPUT BUFFER
         *2576                 /FOR SENTINEL
BLL,            0              /END OF OUTPUT BUFFER
         *2600
OUTC,           0              /OUTPUT A CHAR. WHEN ROOM
                               EXISTS
                DCA I OPP3
                ISZ OPP3
                TAD OPP3       / TEST FOR ROOM IN OUTPUT
                               BUFFER
                TAD M2576
                SPA CLA
                JMP I OUTC
                TAD B0
                DCA OPP3
                JMP I OUTC
OPP2,           2400
OPP3,           2400
BO,             2400
M2576,          5202
IOUT,           0
                TSF            /SKP ON FLAG(TTP)
                JMP .+4
                6042           /CLEAR FLAG
                CLA IAC
                DCA BUSYSG     / SET NOT BUSY
                CLA CLL
/                                                PAGE B13
                TAD OPP2
                CIA
                TAD OPP3
                SNA CLA
                JMP I IOUT
                TAD BUSYSG
                SNA CLA
                JMP I IOUT     /TELETYPE(OUTPUT) IS BUSY
                TAD I OPP2     / FILL ACCUMULATOR
                TLS            / TYPE ACCUMULATOR
                ISZ OPP2
                CLA CLL
                DCA BUSYSG     /SET BUSY
                TAD OPP2
                TAD M2576
                SPA CLA
                JMP I IOUT
                TAD BO
                DCA OPP2
                JMP I IOUT     /END PART OF INTRPT ROUTINE
OUTOCT,         0
                JMS TOCT
                CLA CLL
                TAD SPACE
                JMS OUTC
                TAD NUM
                JMP I OUTOCT
SPACE,          0240
OUTOLF,         0
                JMS TOCT
                JMS CRLF
                TAD NUM
                JMP I OUTOLF
OUTCLF,         0
                JMS OUTC
                JMS CRLF
                JMP I OUTOLF
CRLF,           0
                CLA
                TAD CR
                JMS OUTC
                TAD LF
                JMS OUTC
                JMP I CRLF
CR,             0215
LF,             212
/ASSEMBLY PROGRAM TO TYPE AN OCTAL NUMBER
```

```
NUM,         0
TOCT,        0
             DCA NUM          /SAVE CONTENT OF
                              ACCUMULATOR
             TAD NUM
             CLL RAL
             DCA TEM
             TAD M4
             DCA INDX
LOOPO,       TAD TEM
             RTL
             RAL
             DCA TEM
             TAD TEM
             AND C7
             TAD C260
             JMS OUTC
             ISZ INDX
/                                                              PAGE B14
             JMP LOOPO
             TAD NUM          /RESTORE CONTENT OF
                              ACCUMULATOR
             JMP I TOCT
ERR,         0
             JMS TOCT
             CLA
             TAD E
             JMS OUTC
             TAD ERR
             JMS OUTOLF
P11,         NOP              /IDLE
             NOP
             6001             / ION
             JMP P11
E,           305              / LETTER E
TEM,         0
INDX,        0
M4,          -4
C7,          7
C260,        260
BUSYSG,      0000             /BUSY = 0, NOT BUSY = 1
             *3000
BFF,         0
BF,          0                /SEQ. NO./ — OR 0 INDIC. SHORT
                              FORM
             0                /NO STEPS/LONG FORM/SHORT
                              FORM
             0                /BF     +2       DHX       BHX
             0                /                DLX       BLX
             0                /       +4       CHX       BHB
             0                /                CLX       BLB
             0                /       +6       BHX       BHZ
             0                /                BLX       BLZ
             0                /       +10      DHB       BHA
             0                /                DLB       BLA
             0                /       +12      CHB       BHY
             0                /                CLB       BLY
             0                /       +14      BHB       POSSIBLE SENTINEL
             0                /                BLB
             0                /       +16      DHZ
             0                /                DLZ
             0                /       +20      CHZ
             0                /                CLZ
             0                /       +22      BHZ
             0                /                BLZ
             0                /        24      DHA
             0                /                DLA
             0                /        26      CHA
             0                /                CLA
             0                /        30      BHA
             0                /                BLA
             0                /        32      DHY
             0                /                DLY
             0                /        34      CHY
             0                /                CLY
             0                /        36      BHY
             0                /                BLY
             0                / POSSIBLE SENTINEL
                              /CLEAR INPUT BUFFER AND START
                              INPUT
CLI,         0                /SEQUENCE
             TAD AIBF         /CALLED AT INIT AND AFTER DATA
                              MASSAGE
             DCA A117         /SET A117
             TAD MC
             DCA WS           /SET - COUNT
             DCA I A117
             ISZ WS
/                                                              PAGE B15
             JMP .-2
             TAD A17C         /SET AUTO POINTER FOR HSR INPUT
             DCA A117
             6346             /READ HSR BUFFER AND CLEAR
                              FLAG
             6343             /STEP ONE CHARACTER TO THE
                              RIGHT
             CLA CLL
             DCA BFF
             JMP I CLI
```

```
AIBF,      BFF-1
MC,        7736         /-COUNT=-33/10/-42/8/
A17C,      BF-1
NXC,       0            /READ NEXT CHARACTER FROM
                        BUFFER IF READY
           6341         /SKIP IF CHAR. READY
           JMP I NXC    /RETURN
           CLL CLA
           6346         /NEXT CHAR. TO AC AND CLEAR
                        FLAG
           DCA WSI
SWTCH,     6354         / SKIP ON DONE FLAG/SET
                        3163/RESET 1633
           JMP .-1
           6352         /CLEAR DONE FLAG (HSR)
           TAD WSI
           JMP .+7
           NOP
           NOP
           NOP
           NOP          / SPACE FOR READER ERROR
                        CHECKING
           NOP
           NOP
           TAD TEST
           SZA CLA      /TEST FOR A SENTINEL
           JMP FINI
           TAD A117     /PATTERN IS THAT OF A SENTINEL
           TAD S1       /TEST FOR PROPER SEQUENTIAL
                        POSITION
           SNA          /FOR A SENTINEL
           JMP RSTR     /A GOOD LONG BLOCK
           SMA
           JMS I ERRR   / TOO MANY CHARACTERS
           TAD S1+1
           SNA
           JMP RSTR     / A GOOD SHORT BLOCK
           TAD S1+2
           SNA CLA
           JMP REWIND
FINI,      TAD WSI
           DCA I A117   /STORE NEW CHAR.
           CMA
           TAD A117
           TAD S1
           SMA CLA
           JMS I ERRR
           6343         /STEP TAPE ONE CHARACTER TO
                        THE RIGHT
RETRN,     JMP I NXC    /RETURN
RSTR,      ISZ BFF      /NOTE BLOCK READY FOR
                        PROCESSING
           JMP I NXC    /EXIT
S1,        7740-BFF     /3RD POS SENTINEL LOC/A117/
                        /LONG BLOCK
           24           /2ND POS SENTINEL LOC/RELATIVE
                        /SHORT BLO
                        / CK
           14           /1ST POS SENTINEL
                        LOC/RELATIVE/END OF TAP
                        / E
CLO,       0            /OUTPUT INITIALIZATION
           JMP I CLO
OUT,       0            /OUTPUT A CHARACTER STRING
           JMP I OUT    /DUMMY
TEST,      7600
/
WSI,       0                                    PAGE B16
ERRR,      ERR
REWIND,    6142         /MAKE SURE/CLEAR FLAG
           6343         /RD 1 CHAR
           6341         /SKP IF READY
           JMP .-1
           6346         /LOAD ACC
           DCA WSI
           TAD WSI
           TAD TEST     /REDUNDANT TEST
           SZA CLA
           JMP FINI     /NOT AT END
           6355         / REWIND
           TAD IRWTS-1
           DCA SWTCH
           DCA WSI
           TAD I .+4
           DCA I .+4
           6347         / READ TO LEFT / ACTUALLY
                        STARTS REWIND
           JMP I NXC    /RETURN
           WSI2
           WSI3
           JMP I IRWTS
IRWTS,     RWTST
  *3200
INTR,      DCA SAC      /SAVE ACCUMULATOR
           RAR
           DCA SL       /SAVE LINK
           6234         /RIB LOAD AC FROM INTERRUPT
                        BUFFER
```

```
              DCA SIB           /SAVE INTERRUPT BUFFER(MAY
                                NOT NEED)
              JMS OPER          /OPERATE MOTORS
              JMS I INXC        /READ CHARACTER (IF ANY)
              JMS I IIOUT       /WRITE CHARACTER (IF ANY)
              CLL CLA
              TAD SL
              RAL
              TAD SAC
              6142              /CLEAR CLOCK
              6001              /ION TURN ON INTERRUPTS
              JMP I 0000        /RETURN TO SLOW SPEED
                                PROGRAM
SAC,          0                 /STORAGE FOR ACCUMULATOR ON
                                INTERRUPT
SL,           0                 /STORAGE FOR LINK ON INTERRUPT
INXC,         NXC
SIB,          0
IIOUT,        IOUT
OPER,         0
              6152              / CLEAR OTHER INTERFACE FLAG /
                                MAY NOT NE
                                / ED
              6341              / CLEAR DONE FLAG
              6141              /SKP ON CLOCK OR PUSH BUTTONS
              JMP I OPER        /RETURN
              6146              /CLEAR AND LOAD, AC FROM
                                DEVICE
              RTR               /CLOCK BIT(11) TO BIT 0
              SMA CLA
              JMP P8
              6142              /CLEAR FLAG
              JMP I KALFA
KALFA,        ALFA
STDOP,        6144              /OPERATE MOTORS / ACC
                                CONTAINS MOTOR CON
                                / T WORD
              6152              /CLEAR OTHER CLOCK
              NOP
              AND Z2110
              SNA CLA
/                                                           PAGE B17
              JMP TF2           /THIS HAPPENS ONLY WHEN
                                WAITING
CNTDWN,       CLA CLL           /CORRECT COUNTS
              ISZ XOPC
              JMP .+5
              TAD CW
              AND MB10          /SUBTRACT BIT 10
              DCA CW            /IF OTHER MECHANISM, AND IT OUT
                                (BITS 0+1
                                / )
              JMS CHK1
              ISZ XOPC+1        / PIECE ROTATION
              JMP .+5
              TAD CW
              AND MB8           /SUBTRACT BIT 8
              DCA CW
              JMS CHK1
              ISZ XOPC+2        /ZOPC
              JMP .+5
              TAD CW
              AND MB6           /SUBTRACT BIT 6
              DCA CW
              JMS CHK1
              ISZ XOPC+3        /AOPC/TILT
              JMP .+5
              TAD CW
              AND MB4           /SUBTRACT BIT 4
              DCA CW
              JMS CHK1
              ISZ XOPC+4        /BOPC/Y
              JMP .+5
              TAD CW
              AND MB2           /SUBTRACT BIT 2 FROM (MOTOR)
                                CONTROL WORD
              DCA CW
              JMS CHK1
              JMP I OPER
CHK1,         0
              ISZ NACT          /COUNT DOWN ON NO ACTIVE AXES
              JMP I CHK1
              TAD CWB
              DCA CW            / CLEAR MOTOR CONTROL WORD
TF2,          JMS I KRSTUP      / RESET AS IF TOOL UP
              TAD CW2           /DETERMINE IF NEXT CW READY
              SNA
              JMP I OPER
              DCA CW            /SET UP NEXT CW
              DCA CW2           /CLEAR THE STAND BY CW (USE AS
                                FLAG)
              TAD I KXDMIN
              DCA XOPC
              TAD I KBDMIN
              DCA XOPC+1        / PR OPC
              TAD I KZDMIN
              DCA XOPC+2        /ZOPC
```

```
                TAD I KADMIN
                DCA XOPC+3      /AOPC/TILT
                TAD I KYDMIN
                DCA XOPC+4      / YOPC
                TAD KM5         /RESET NO ACTIVE MOTORS TO 5
                DCA NACT
                TAD BTYP2
                DCA BLKTYP
                TAD PSWT2
                DCA PSWTCH
                DCA I KDEC
                JMP I KSBLK
KDEC,           DEC
/                                                                   PAGE B18
KRSTUP,         RSTTUP
KSBLK,          SBLK
KM5,            -5
MB2,            6777
MB4,            7577
MB6,            7737
MB8,            7767
MB10,           7775
Z2110,          1777
NACT,           0
                00              /SPARE LINE
KXDMIN,         XAX+22
KBDMIN,         BAX+22
KZDMIN,         ZAX+22
KADMIN,         AAX+22
KYDMIN,         YAX+22
P8,             ISZ PAUS        /SET TO PAUSE AT END OF
                                CURRENT CUT
                SZL CLA         /SKIP IF CONTINUE NOT PRESSED
                JMP .+3
                6142            /CLEAR FLAG
                JMP I OPER
                DCA PAUS        /CLEAR PAUSE
                JMP .-3
        *3400
ALFA,           DCA XPAT        /CLEAR EXTRACTOR PATTERN
                DCA PPAT        /CLEAR PULSE PATTERN
                                / FOR NO FEED BACK SET NEXT 2
                                CARDS TO
                                / DCA DEC + JMP CTEC
                6311            /SKP ON + Z
                JMP SMZ
                TAD CDEC-2      /-Z PATTERN
                DCA PPAT
                ISZ DEC
                JMP EXT
SMZ,            6312            /SKP ON - Z
                JMP CDEC
                TAD CDEC-1      / + Z
                DCA PPAT
                CMA             /-1
                TAD DEC
                DCA DEC
EXT,            TAD CDEC-1      /SET EXTRACTOR PATTERN ZZ
                DCA XPAT
                JMP CDEC+1
                0040            /-Z
                0060            / + Z = ZZ
CDEC,           DCA DEC
                6314            /SKP ON RIGHT
                JMP SLEFT
                TAD CTEC+2      /LEFT
                TAD PPAT
                DCA PPAT
                ISZ TEC         /TEC = TEC + 1
                JMP EXT2
SLEFT,          6313            /SKP ON LEFT
                JMP CTEC
                TAD CTEC+3      /RIGHT
                TAD PPAT
                DCA PPAT
                CMA
                TAD TEC         /TEC = TEC - 1
                DCA TEC
EXT2,           TAD CTEC+3      /SET EXT PAT AA = RIGHT
                TAD XPAT
/                                                                   PAGE B19
                DCA XPAT
                JMP .+5
CTEC,           DCA TEC
                JMP .+3
                0200            /LEFT
                0300            /RIGHT = EXT PAT
                TAD BLKTYP
                TAD P3
                SZA CLA         /SKP IF TOOL DOWN
                JMP PSWTCG
                TAD TEC         / TOOL DOWN
                SZA CLA
                JMP CLEXT+4     / MOVE TILT ONLY
                TAD DEC
                SMA CLA
                JMP I KCHKP
                CMA
```

```
              AND PPAT
              TAD CWB
              6144              /OPERATE MOTORS
CLEXT,        6152              /CLEAR OTHER CLOCK
              6352              /CLEAR DONE FLAG
              CLA CLL
              JMP I KSCAN
              TAD CTEC+3
              JMP CLEXT-3
       *3500
PSWTCG,       TAD PSWTCH
              SPA CLA
              JMP P722
              TAD COUNT2
              SZA CLA
              JMP FF
              TAD PPAT
              SZA CLA
FF,           JMP FF1           /NO NEED TO INITIALIZE
FF3,          TAD .+7
              DCA .-2           /SET FF TO FF1
              TAD XPAT
              CMA
              AND CW
              TAD PPAT
              JMP I KSTDOP
              JMP FF1
              JMP FF2
FF1,          TAD .-1
              DCA FF            /SET FF TO FF2
              TAD XPAT
              AND PPAT
              TAD CWB
              DCA WS3
              TAD MNS2          /ATTEMPT TO REACH MIDDLE OF
                                 CONTROL BAND
              DCA COUNT2
FF2,          TAD WS3
              OPMTRS
              CLA CLL
              ISZ COUNT2
              JMP CLEXT
              TAD .+3
              DCA FF            /RESET FF TO FF3
              JMP CLEXT
              NOP               /THIS IS A CONSTANT FOR
                                 RESETTING
MNS2,         7776
P3,           0003
/
DEC,          0                 /DEPTH ERROR COUNT(+/-)SINCE
                                 LAST 0
TEC,          0                 /TILT ERROR COUNT
XPAT,         0
PPAT,         0
IPSWT,        PSWTCH
WS3,          0
COUNT2,       0
KSTDOP,       STDOP             /JMP TO OPMTRS, CLEAR FLAGS,
                                 COUNT DOWN
KCNTDN,       CNTDWN            /JMP TO COUNT DOWN REMAINING
                                 PULSES
KCHKP,        CHK1+3            /JMP TO PROCEDE TO NEXT BLOCK
KSCAN,        CHK1-1            /JMP TO CONTINUE INTERUPT SCAN
P722,         TAD CW
              JMP I KSTDOP      /TOOL UP OR MOVE TO NEXT CUT
              $
```

PAGE B20

What is claimed is:

1. A method of automatically inscribing a preselected design in a work piece utilizing a power-driven tool concurrently positioned relative to said work piece along a multiplicity of independent axes comprising cutting the definition lines of said design along two preselected axes lying in a common plane conforming generally to incremental portions of the work surface of said work piece responsive to a preprogrammed control input, and simultaneously positioning said tool along a predetermined depth-establishing axis for said design and along a predetermined tilt axis maintaining predetermined orientation of said tool with respect to said work surface of said work piece responsive to feedback control input.

2. A method of automatically inscribing a preselected design in a work piece having a generally planar work surface utilizing a power-driven tool concurrently actuated relative to said work piece along a multiplicity of independent axes comprising cutting the definition lines of said design by positioning said tool along two preselected axes lying in a common plane conforming generally to incremental portions of said work surface of said work piece responsive to a preprogrammed control input, and simultaneously positioning said tool along a predetermined depth-establishing axis for said design and along a predetermined tilt axis maintaining predetermined orientation of said tool with respect to said work surface of said work piece responsive to feedback control input.

3. A method of automatically inscribing a preselected design in a work piece having a curved work surface utilizing a power-driven tool concurrently actuated relative to said work piece along a multiplicity of independent axes comprising cutting the definition lines of said design by positioning said tool along two preselected axes lying in a common plane corresponding generally to the length and width definition lines of said design while rotating said work piece about its longitudinal axis to develop said design circumferentially of said work piece responsive to a preprogrammed control input, and simultaneously positioning said tool along a predetermined depth-establishing axis for said design and along a predetermined tilt axis maintaining predetermined orientation of said tool with respect to said work surface of said work piece responsive to feedback control input.

4. Apparatus for automatically inscribing a preselected design in a work piece comprising, in combination, a power-driven inscribing tool, preprogrammed control means incorporating a pattern of movement of said power-driven inscribing tool relative to said work piece along a multiplicity of independent axes including two preselected axes lying in a common plane conforming generally to incremental portions of the work surface of said work piece, feedback control means biased against said work surface of said work piece directing said power-driven inscribing tool along a predetermined depth establishing axis and a predetermined tilt axis for maintaining predetermined orientation of said tool with respect to said work surface of said work piece, and positioning means responsive to said preprogrammed control means and to said feedback control means locating said powerdriven inscribing tool in work-effecting relationship with respect to said work piece.

5. Apparatus for automatically inscribing a preselected design in a work piece according to claim 4 wherein said design is a diamond checkered inscription.

6. Apparatus for automatically inscribing a preselected design in a work piece according to claim 4 provided with power-driven spindle work support means effecting preselected displacement of said work piece with respect to said powerdriven inscribing tool as one component of relative movement between said work piece and said power-driven inscribing tool in the course of automatic inscription of said work piece.

7. Apparatus for automatically inscribing a preselected design in a work piece according to claim 4 utilizing a plurality of power-driven inscribing tools intermittently indexed into work-effecting relationship with respect to said work piece.

8. Apparatus for automatically inscribing a preselected design in a work piece according to claim 4 wherein said positioning means comprises electrical pulse-actuated stepper motors.

9. Apparatus for automatically inscribing a preselected design in a work piece according to claim 4 wherein said feedback means comprise linear variable differential transformers provided with centrally disposed axially movable armatures having sensor elements contacting the work surface of said work piece.

10. Apparatus for automatically inscribing a preselected design in a work piece according to claim 7 wherein said power-driven inscribing tools intermittently indexed into work-effecting relationship with respect to said work piece consist of a rotary cutter for inscribing generally straight lines and a router for inscribing curved boundary lines for said preselected design in said work piece.

11. Apparatus for automatically inscribing a preselected design in a work piece according to claim 9 wherein the feedback signal output of said feedback means is routed to said preprogrammed control means and incorporated in the output of said preprogrammed control means to provide complete instructions to said positioning means locating said power-driven inscribing tool in work-effecting relationship with respect to said work piece.

12. Apparatus for automatically inscribing a preselected design in a work piece comprising, in combination, a power-driven inscribing tool, preprogrammed control means incorporating a pattern of movement of said power-driven inscribing tool relative to said work piece along a multiplicity of independent axes including two preselected axes lying in a common plane conforming generally to incremental portions of the work surface of said work piece, feedback control means biased against said work surface of said work piece directing said power-driven inscribing tool along a predetermined depth establishing axis and a predetermined tilt axis for maintaining predetermined orientation of said tool with respect to said work surface of said work piece, said feedback control means delivering a feedback signal output routed to said preprogrammed control means and incorporated in the output of said preprogrammed control means to provide exclusively the work-effecting relationship depth of cut and tilt instructions to said positioning means immediately preparatory to and during actual cutting operation of said power-driven inscribing tool whereas said preprogrammed control means exclusively determines the position of said power-driven inscribing tool at all other times, said feedback control means comprising linear variable differential transformers provided with centrally disposed axially movable armatures having sensor elements contacting the work surface of said work piece, and positioning means responsive to said preprogrammed control means and to said feedback control means locating said power-driven inscribing tool in work-effecting relationship with respect to said work piece.

13. Apparatus for automatically inscribing a preselected design in a work piece according to claim 12 utilizing the sum and difference displacements of said sensor elements with respect to the zero sensor line of said inscribing tool as criteria for depth establishing axis and tilt axis orientation of said inscribing tool with respect to said work surface of said work piece.

* * * * *